US012808302B2

(12) United States Patent
Niergarth et al.

(10) Patent No.: US 12,808,302 B2
(45) **Date of Patent: *Nov. 24, 2026**

(54) GAS TURBINE ENGINE

(71) Applicant: General Electric Company, Evendale, OH (US)

(72) Inventors: Daniel Alan Niergarth, Norwood, OH (US); Jeffrey Donald Clements, Mason, OH (US); Jeffrey S. Spruill, Hillsboro, OH (US); Erich Alois Krammer, West Chester, OH (US); Matthew Kenneth MacDonald, Austin, TX (US); Scott Alan Schimmels, Miamisburg, OH (US); Andrew Philip Woodfield, Maineville, OH (US)

(73) Assignee: General Electric Company, Evendale, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/305,856

(22) Filed: Aug. 21, 2025

(65) Prior Publication Data

US 2025/0389277 A1 Dec. 25, 2025

Related U.S. Application Data

(63) Continuation-in-part of application No. 18/481,515, filed on Oct. 5, 2023, now Pat. No. 12,410,753, which (Continued)

(51) Int. Cl.

| | |
|---|---|
| ***F01D 5/28*** | (2006.01) |
| ***F02C 9/28*** | (2006.01) |
| *C22F 1/18* | (2006.01) |

(52) U.S. Cl.

CPC .................. *F01D 5/28* (2013.01); *F02C 9/28* (2013.01); *C22F 1/183* (2013.01);

(Continued)

(58) Field of Classification Search

CPC ................................................ F05D 2300/174

See application file for complete search history.

(56) References Cited

U.S. PATENT DOCUMENTS

| | | | |
|---|---|---|---|
| 2,264,297 | A | 12/1941 | Clay |
| 2,623,721 | A | 12/1952 | Harrington |

(Continued)

FOREIGN PATENT DOCUMENTS

| | | | |
|---|---|---|---|
| CA | 2787980 | A1 | 7/2011 |
| CA | 2807151 | A1 | 4/2012 |

(Continued)

OTHER PUBLICATIONS

Bae, Integrally Cored Ceramic Investment Casting Mold Fabricated by Ceramic Stereolithography, Chapter 5, A Dissertation Submitted in Partial Fulfillment of the Requirements for the Degree of Doctor of Philosophy, Materials and Engineering, 2008, pp. 102-139.

(Continued)

*Primary Examiner* — Katheryn A Malatek

(74) *Attorney, Agent, or Firm* — Dority & Manning, P.A.

(57) ABSTRACT

A gas turbine engine is provided. The gas turbine engine includes: a turbomachine having a compressor section, a combustion section, and a turbine section arranged in serial flow order, the compressor section having a high pressure compressor defining a high pressure compressor exit area ($A_{HPCExit}$) in square inches; and a component within the turbomachine, the component including a titanium alloy. The gas turbine engine defines a redline exhaust gas temperature (EGT) in degrees Celsius, a total sea level static thrust output ($Fn_{Total}$) in pounds, and a corrected specific thrust, wherein the corrected specific thrust is greater than or equal to 42 and less than or equal to 90, the corrected specific determined as follows: $Fn_{Total} \times EGT/(A_{HPCExit}^2 \times 1000)$.

20 Claims, 20 Drawing Sheets

Related U.S. Application Data is a continuation-in-part of application No. 17/978,629, filed on Nov. 1, 2022, now abandoned.

(60) Provisional application No. 63/797,483, filed on Apr. 30, 2025.

(52) U.S. Cl.
CPC .... *F05D 2220/323* (2013.01); *F05D 2220/36* (2013.01); *F05D 2300/174* (2013.01)

(56) References Cited

U.S. PATENT DOCUMENTS 2,641,540 A 6/1953 Mohling et al.
2,940,163 A 6/1960 Davies
2,968,586 A 1/1961 Vordahl
3,043,683 A 7/1962 Hix
3,069,259 A 12/1962 Margolin et al.
3,084,042 A 4/1963 Wartel et al.
3,420,055 A 1/1969 Lavash
3,528,250 A 9/1970 Johnson
3,628,885 A 12/1971 Sidenstick
3,651,645 A 3/1972 Grieb
3,765,954 A 10/1973 Tokuda et al.
3,779,007 A 12/1973 Lavash
3,813,227 A 5/1974 Tomita
4,012,012 A 3/1977 Ligler
4,064,692 A 12/1977 Johnson et al.
4,078,604 A 3/1978 Christl et al.
4,078,761 A 3/1978 Thompson
4,120,150 A 10/1978 Wakeman
4,134,758 A 1/1979 Nagai et al.
4,137,705 A 2/1979 Andersen et al.
4,254,618 A 3/1981 Elovic
4,263,786 A 4/1981 Eng
4,546,605 A 10/1985 Mortimer et al.
4,696,156 A 9/1987 Burr et al.
4,741,152 A 5/1988 Burr et al.
4,773,212 A 9/1988 Griffin et al.
4,776,536 A 10/1988 Hudson et al.
4,966,005 A 10/1990 Cowell et al.
5,024,580 A 6/1991 Olive
5,118,363 A 6/1992 Chakrabarti et al.
5,121,598 A 6/1992 Butler
5,152,146 A 10/1992 Butler
5,177,951 A 1/1993 Butler
5,203,163 A 4/1993 Parsons
5,241,814 A 9/1993 Butler
5,255,505 A 10/1993 Cloyd et al.
5,256,340 A 10/1993 Allison et al.
5,261,227 A 11/1993 Giffin, III
5,296,308 A 3/1994 Caccavale et al.
5,297,386 A 3/1994 Kervistin
5,305,616 A 4/1994 Coffinberry
5,314,106 A 5/1994 Ambroziak et al.
5,317,877 A 6/1994 Stuart
5,370,499 A 12/1994 Lee
5,387,380 A 2/1995 Cima et al.
5,392,614 A 2/1995 Coffinberry
5,402,638 A 4/1995 Johnson
5,414,992 A 5/1995 Glickstein
5,431,506 A 7/1995 Masunaga
5,511,374 A 4/1996 Glickstein et al.
5,544,700 A 8/1996 Shagoury
5,545,003 A 8/1996 O'Connor et al.
5,553,449 A 9/1996 Rodgers et al.
5,558,303 A 9/1996 Koethe et al.
5,564,492 A 10/1996 Preiss
5,615,547 A 4/1997 Beutin et al.
5,619,855 A 4/1997 Burrus
5,680,767 A 10/1997 Lee et al.
5,724,816 A 3/1998 Ritter et al.
5,782,076 A 7/1998 Huber et al.
5,792,289 A 8/1998 Morton et al.
5,802,841 A 9/1998 Maeda
5,819,525 A 10/1998 Gaul et al.
5,853,044 A 12/1998 Wheaton et al.
5,918,458 A 7/1999 Coffinberry et al.
5,961,792 A 10/1999 Nelson et al.
6,106,229 A 8/2000 Nikkanen et al.
6,110,302 A 8/2000 Gorman
6,117,612 A 9/2000 Halloran et al.
6,182,435 B1 2/2001 Niggemann et al.
6,182,458 B1 2/2001 Franklin, Jr.
6,190,465 B1 2/2001 Coutu et al.
6,228,189 B1 5/2001 Oyama et al.
6,253,554 B1 7/2001 Kobayashi et al.
6,302,191 B1 10/2001 Wickham et al.
6,347,660 B1 2/2002 Sikkenga et al.
6,415,595 B1 7/2002 Wilmot, Jr. et al.
6,488,238 B1 12/2002 Battisti
6,578,362 B1 6/2003 Coffinberry
6,584,778 B1 7/2003 Griffiths et al.
6,595,749 B2 7/2003 Lee et al.
6,726,784 B2 4/2004 Oyama et al.
6,786,985 B2 9/2004 Kosaka et al.
6,805,535 B2 10/2004 Tiemann
6,913,064 B2 7/2005 Beals et al.
6,918,974 B2 7/2005 Woodfield
6,990,797 B2 1/2006 Venkataramani et al.
6,993,913 B2 2/2006 Kobayashi et al.
7,000,404 B2 2/2006 Palmisano et al.
7,008,489 B2 3/2006 Bania
7,140,174 B2 11/2006 Johnson
7,143,581 B2 12/2006 Kobayashi et al.
7,188,464 B2 3/2007 Ackerman et al.
7,195,455 B2 3/2007 Stonitsch et al.
7,216,475 B2 5/2007 Johnson
7,231,769 B2 6/2007 Spadaccini et al.
7,260,926 B2 8/2007 Sabatino et al.
7,306,026 B2 12/2007 Memmen
7,395,657 B2 7/2008 Johnson
7,448,433 B2 11/2008 Ortiz et al.
7,452,202 B2 11/2008 Gram
7,481,214 B2 1/2009 Eilers
7,504,017 B2 3/2009 Cardarelli
7,527,475 B1 5/2009 Liang
7,533,713 B2 5/2009 Pfeifer et al.
7,575,418 B2 8/2009 Gigliotti et al.
7,601,232 B2 10/2009 Fonte et al.
7,608,131 B2 10/2009 Jensen
7,610,946 B2 11/2009 Morris et al.
7,624,592 B2 12/2009 Lui et al.
7,716,913 B2 5/2010 Rolt
7,717,676 B2 5/2010 Cunha et al.
7,753,104 B2 7/2010 Luczak et al.
7,770,381 B2 8/2010 Johnson et al.
7,836,680 B2 11/2010 Schwarz et al.
7,926,289 B2 4/2011 Lee et al.
8,015,788 B2 9/2011 Stephenson et al.
8,056,345 B2 11/2011 Norris et al.
8,066,052 B2 11/2011 Blair
8,307,662 B2 11/2012 Turco
8,479,970 B2 7/2013 Ishibashi et al.
8,506,836 B2 8/2013 Szuromi et al.
8,641,807 B2 2/2014 Thomas
8,747,055 B2 6/2014 McCune et al.
8,789,376 B2 7/2014 Coffinberry
8,851,151 B2 10/2014 Frasier et al.
8,943,827 B2 2/2015 Prociw et al.
8,955,330 B2 2/2015 Narcus et al.
8,961,114 B2 2/2015 Ruthemeyer
8,985,540 B1 3/2015 Slesinski
9,039,382 B2 5/2015 Stapleton
9,079,357 B2 7/2015 Ebert et al.
9,200,855 B2 12/2015 Kington et al.
9,410,482 B2 8/2016 Krautheim et al.
9,422,063 B2 8/2016 Diaz
9,429,072 B2 8/2016 Diaz et al.
9,458,527 B2 10/2016 Tetyukhin et al.
9,458,764 B2 10/2016 Alecu et al.
9,631,261 B2 4/2017 Fanning
9,650,147 B2 5/2017 Selechert et al.
9,677,501 B2 6/2017 Pierluissi et al.

(56) References Cited

U.S. PATENT DOCUMENTS

| | | | | |
|---|---|---|---|---|
| 9,835,035 | B2 | 12/2017 | Mueller et al. | |
| 9,845,768 | B2 | 12/2017 | Pesyna et al. | |
| 9,920,710 | B2 | 3/2018 | Dawson et al. | |
| 9,995,314 | B2 | 6/2018 | Miller et al. | |
| 10,000,826 | B2 | 6/2018 | Kosaka | |
| 10,022,790 | B2 | 7/2018 | Lee et al. | |
| 10,066,282 | B2 | 9/2018 | Thomas et al. | |
| 10,100,736 | B2 | 10/2018 | Niergarth et al. | |
| 10,119,178 | B2 | 11/2018 | Thomas et al. | |
| 10,260,419 | B2 | 4/2019 | Cerny et al. | |
| 10,280,486 | B2 | 5/2019 | Zhang et al. | |
| 10,352,243 | B2 | 7/2019 | Mizukami et al. | |
| 10,399,270 | B2 | 9/2019 | Xu et al. | |
| 10,578,028 | B2 | 3/2020 | Becker, Jr. | |
| 10,654,579 | B2 | 5/2020 | Diaz | |
| 11,351,599 | B2 | 6/2022 | Deines et al. | |
| 12,104,239 | B2 | 10/2024 | Woodfield et al. | |
| 12,410,753 | B2 * | 9/2025 | Niergarth | F02K 3/025 |
| 2001/0024000 | A1 | 9/2001 | Lee et al. | |
| 2001/0050117 | A1 | 12/2001 | Oyama et al. | |
| 2003/0211003 | A1 | 11/2003 | Kosaka et al. | |
| 2004/0089380 | A1 | 5/2004 | Woodfield | |
| 2004/0103751 | A1 | 6/2004 | Joseph et al. | |
| 2005/0109016 | A1 | 5/2005 | Ullyott | |
| 2005/0205232 | A1 | 9/2005 | Wang et al. | |
| 2007/0049418 | A1 | 3/2007 | Chern Lin et al. | |
| 2008/0006384 | A1 | 1/2008 | Memmen | |
| 2008/0080979 | A1 | 4/2008 | Brassfield et al. | |
| 2008/0110603 | A1 | 5/2008 | Fellague et al. | |
| 2008/0135722 | A1 | 6/2008 | Wang et al. | |
| 2008/0181808 | A1 | 7/2008 | Thamboo et al. | |
| 2008/0190093 | A1 | 8/2008 | Gauthier et al. | |
| 2008/0190778 | A1 | 8/2008 | Withers et al. | |
| 2008/0227566 | A1 | 9/2008 | Lin et al. | |
| 2008/0264208 | A1 | 10/2008 | Jacobsen et al. | |
| 2008/0304975 | A1 | 12/2008 | Clark et al. | |
| 2008/0310955 | A1 | 12/2008 | Norris et al. | |
| 2008/0314573 | A1 | 12/2008 | Schwarz et al. | |
| 2009/0060714 | A1 | 3/2009 | Moors | |
| 2009/0175718 | A1 | 7/2009 | Diaz et al. | |
| 2009/0188234 | A1 | 7/2009 | Suciu et al. | |
| 2009/0211273 | A1 | 8/2009 | Klewer | |
| 2009/0229812 | A1 | 9/2009 | Pineo et al. | |
| 2010/0003619 | A1 | 1/2010 | Das et al. | |
| 2010/0025001 | A1 | 2/2010 | Lee et al. | |
| 2010/0028645 | A1 | 2/2010 | Maguire et al. | |
| 2010/0068464 | A1 | 3/2010 | Meyer | |
| 2010/0068465 | A1 | 3/2010 | Su et al. | |
| 2010/0107603 | A1 | 5/2010 | Smith | |
| 2010/0139288 | A1 | 6/2010 | Rago | |
| 2010/0170262 | A1 | 7/2010 | Kaslusky et al. | |
| 2010/0192593 | A1 | 8/2010 | Brown et al. | |
| 2010/0212857 | A1 | 8/2010 | Bulin et al. | |
| 2010/0263373 | A1 | 10/2010 | Decker et al. | |
| 2010/0320089 | A1 | 12/2010 | Misra et al. | |
| 2011/0079683 | A1 | 4/2011 | Stolte et al. | |
| 2011/0088405 | A1 | 4/2011 | Turco | |
| 2011/0132562 | A1 | 6/2011 | Merrill et al. | |
| 2011/0132563 | A1 | 6/2011 | Merrill et al. | |
| 2011/0150634 | A1 | 6/2011 | Bajusz et al. | |
| 2011/0162387 | A1 | 7/2011 | Chir et al. | |
| 2011/0302928 | A1 | 12/2011 | Mudawar | |
| 2011/0310370 | A1 | 12/2011 | Rohner et al. | |
| 2011/0314835 | A1 | 12/2011 | Liu | |
| 2012/0060981 | A1 | 3/2012 | Forbes Jones et al. | |
| 2012/0067055 | A1 | 3/2012 | Held | |
| 2012/0174583 | A1 | 7/2012 | Lehar | |
| 2012/0192578 | A1 | 8/2012 | Finney | |
| 2012/0243970 | A1 | 9/2012 | Hellgren et al. | |
| 2012/0248657 | A1 | 10/2012 | Ebert et al. | |
| 2012/0297789 | A1 | 11/2012 | Coffinberry | |
| 2013/0037183 | A1 | 2/2013 | Daffos et al. | |
| 2013/0104564 | A1 | 5/2013 | Arar | |
| 2013/0164168 | A1 | 6/2013 | Tetyukhin et al. | |
| 2013/0186100 | A1 | 7/2013 | Rhoden et al. | |
| 2013/0195658 | A1 | 8/2013 | Saito et al. | |
| 2013/0224423 | A1 | 8/2013 | Mikulak et al. | |
| 2013/0247587 | A1 | 9/2013 | Lo | |
| 2013/0333855 | A1 | 12/2013 | Merrill et al. | |
| 2014/0044584 | A1 | 2/2014 | Kanou et al. | |
| 2014/0076468 | A1 | 3/2014 | Mardquardt et al. | |
| 2014/0079540 | A1 | 3/2014 | Morris et al. | |
| 2014/0182264 | A1 | 7/2014 | Weisgerber et al. | |
| 2014/0230444 | A1 | 8/2014 | Hao et al. | |
| 2014/0261922 | A1 | 9/2014 | Thomas et al. | |
| 2014/0271129 | A1 | 9/2014 | Mueller et al. | |
| 2014/0352315 | A1 | 12/2014 | Diaz | |
| 2014/0352562 | A1 | 12/2014 | Raymond, Jr. | |
| 2015/0000291 | A1 | 1/2015 | Smith et al. | |
| 2015/0037601 | A1 | 2/2015 | Blackmore | |
| 2015/0048209 | A1 | 2/2015 | Hoyt et al. | |
| 2015/0064015 | A1 | 3/2015 | Perez | |
| 2015/0068629 | A1 | 3/2015 | Kottilingam et al. | |
| 2015/0076739 | A1 | 3/2015 | Batchelder | |
| 2015/0090070 | A1 | 4/2015 | Etter et al. | |
| 2015/0093287 | A1 | 4/2015 | Pederson et al. | |
| 2015/0100607 | A1 | 4/2015 | Kobashi et al. | |
| 2015/0114611 | A1 | 4/2015 | Morris et al. | |
| 2015/0202683 | A1 | 7/2015 | Bunker | |
| 2015/0209910 | A1 | 7/2015 | Denney et al. | |
| 2015/0306657 | A1 | 10/2015 | Frank | |
| 2015/0321249 | A1 | 11/2015 | Shah et al. | |
| 2015/0321250 | A1 | 11/2015 | Xu | |
| 2015/0337730 | A1 | 11/2015 | Kupiszewski et al. | |
| 2015/0354465 | A1 | 12/2015 | Suciu et al. | |
| 2016/0038866 | A1 | 2/2016 | Gibson et al. | |
| 2016/0059302 | A1 | 3/2016 | McBrien et al. | |
| 2016/0108814 | A1 | 4/2016 | Schmitz | |
| 2016/0201684 | A1 | 7/2016 | Schwarz et al. | |
| 2016/0221262 | A1 | 8/2016 | Das et al. | |
| 2016/0298550 | A1 | 10/2016 | Kupratis et al. | |
| 2016/0326963 | A1 | 11/2016 | Yamazaki | |
| 2016/0341126 | A1 | 11/2016 | Kupratis et al. | |
| 2017/0030266 | A1 | 2/2017 | Cerny et al. | |
| 2017/0044984 | A1 | 2/2017 | Pesyna et al. | |
| 2017/0087630 | A1 | 3/2017 | Lee et al. | |
| 2017/0114721 | A1 | 4/2017 | Miller et al. | |
| 2017/0159563 | A1 | 6/2017 | Sennoun | |
| 2017/0159566 | A1 | 6/2017 | Sennoun et al. | |
| 2017/0167382 | A1 | 6/2017 | Miller et al. | |
| 2017/0184027 | A1 | 6/2017 | Moniz et al. | |
| 2017/0260905 | A1 | 9/2017 | Schmitz | |
| 2017/0268091 | A1 | 9/2017 | Woodfield et al. | |
| 2018/0029944 | A1 | 2/2018 | Subramanian et al. | |
| 2018/0161852 | A1 | 6/2018 | McCarren et al. | |
| 2018/0161853 | A1 | 6/2018 | Deines et al. | |
| 2018/0161854 | A1 | 6/2018 | Deines et al. | |
| 2018/0161855 | A1 | 6/2018 | Deines et al. | |
| 2018/0161856 | A1 | 6/2018 | Yang et al. | |
| 2018/0161857 | A1 | 6/2018 | Garay et al. | |
| 2018/0161858 | A1 | 6/2018 | Garay et al. | |
| 2018/0161859 | A1 | 6/2018 | Garay et al. | |
| 2018/0161866 | A1 | 6/2018 | Deines et al. | |
| 2018/0230822 | A1 | 8/2018 | Balsone et al. | |
| 2019/0218971 | A1 | 7/2019 | Niergarth et al. | |
| 2019/0314896 | A1 | 10/2019 | Copland et al. | |
| 2019/0359340 | A1 | 11/2019 | Pachidis et al. | |
| 2021/0108597 | A1 | 4/2021 | Ostdiek et al. | |
| 2021/0199013 | A1 | 7/2021 | Read et al. | |
| 2022/0002855 | A1 | 1/2022 | Grohowski, Jr. et al. | |
| 2022/0288673 | A1 | 9/2022 | Deines et al. | |
| 2023/0043809 | A1 * | 2/2023 | Schimmels | F28F 3/048 |
| 2023/0392247 | A1 * | 12/2023 | Woodfield | F01D 5/28 |
| 2024/0425961 | A1 | 12/2024 | Woodfield et al. | |

FOREIGN PATENT DOCUMENTS

| | | | |
|---|---|---|---|
| CA | 2947981 | C | 10/2021 |
| CN | 1603596 | A | 4/2005 |
| CN | 101104898 | A | 1/2008 |
| CN | 101576024 | A | 11/2009 |
| CN | 101597703 | A | 12/2009 |
| CN | 101967581 | A | 2/2011 |
| CN | 102078924 | A | 6/2011 |

(56) References Cited

FOREIGN PATENT DOCUMENTS

| | | | |
|---|---|---|---|
| CN | 102605211 | A | 7/2012 |
| CN | 202291247 | U | 7/2012 |
| CN | 102615403 | A | 8/2012 |
| CN | 102802834 | A | 11/2012 |
| CN | 103008558 | A | 4/2013 |
| CN | 103320670 | A | 9/2013 |
| CN | 103352175 | A | 10/2013 |
| CN | 203441604 | U | 2/2014 |
| CN | 105579688 | A | 5/2016 |
| CN | 107035528 | A | 8/2017 |
| DE | 102009039255 | A1 | 3/2011 |
| EP | 0250652 | A1 | 1/1988 |
| EP | 2359959 | A1 | 8/2011 |
| EP | 2359962 | A2 | 8/2011 |
| EP | 2992982 | A1 | 3/2016 |
| EP | 3143171 | B1 | 4/2019 |
| EP | 3514349 | A1 | 7/2019 |
| GB | 741158 | A | 11/1955 |
| GB | 782148 | A | 9/1957 |
| GB | 815975 | A | 7/1959 |
| GB | 850278 | A | 10/1960 |
| GB | 911520 | A | 11/1962 |
| GB | 939317 | A | 10/1963 |
| GB | 965585 | A | 7/1964 |
| GB | 1449134 | A | 9/1972 |
| GB | 1346433 | A | 2/1974 |
| GB | 1394449 | A | 5/1975 |
| GB | 2034822 | A | 6/1980 |
| JP | H07208200 | A | 8/1995 |
| JP | H08157987 | A | 6/1996 |
| JP | H08157988 | A | 6/1996 |
| JP | 2002/060871 | A | 2/2002 |
| JP | 2006/283062 | A | 10/2006 |
| JP | 2007/100666 | A | 4/2007 |
| JP | 2009/030140 | A | 2/2009 |
| JP | 2009/041065 | A | 2/2009 |
| JP | 2010/150624 | A | 7/2010 |
| JP | 2010/229458 | A | 10/2010 |
| JP | 2013/512783 | A | 4/2013 |
| JP | 2014/208373 | A | 11/2014 |
| JP | 2016/501139 | A | 1/2016 |
| JP | 2015/516591 | A | 6/2016 |
| JP | 2016/533905 | A | 11/2016 |
| JP | 2017/522449 | B2 | 8/2017 |
| JP | 2021/008671 | A | 1/2021 |
| KR | 2005/0026340 | A | 3/2005 |
| RU | 2256713 | C1 | 7/2005 |
| WO | WO97/03281 | A1 | 1/1997 |
| WO | WO00/32331 | A1 | 6/2000 |
| WO | WO00/51761 | A1 | 9/2000 |
| WO | WO2015/021168 | A1 | 2/2015 |
| WO | WO2015/026535 | A1 | 2/2015 |
| WO | WO2015/053846 | A2 | 4/2015 |
| WO | WO2015/112885 | A1 | 7/2015 |
| WO | WO2016/025045 | A2 | 2/2016 |

OTHER PUBLICATIONS

Baeslack III et al., Selection and Weldability of Conventional Titanium Alloys, 1993 ASM International, vol. 6, 1993, 507-523.

Guclu, Titanium and Titanium Alloy Castings, 2008 ASM International, vol. 15, 2008, 1129-1142.

Hunt, The Latest Word on Aerospace Materials, AeroMat $25^{th}$ Conference and Exposition presented by ASM International, Florida, Jun. 16-19, 2014, 1-8.

Ibrahim et al., Effect of Si-Addition as a Grain Refiner on Microstructure and Properties of Ti-6AI-4V Alloy, Transactions of Nonferrous Metals Society of China, 2013, 1863-1874.

Iijima et al., Diffusion of Silicon, Germanium and Tin in β-Titanium, Philosophical Magazine A, vol. 68, Issue 5, 1993, 901-914.

Krithivasan, Detection of Propagation of Over-Heat Sections in Supply Air Duct of Aircrafts, Honeywell Technology Solutions Lab Pvt Ltd., Dec. 6, 2011, pp. 1-6.

Kumar et al., 30 Printing of Hollow Compounds, IJRET: International Journal of Research in Engineering and Technology, vol. 4, Issue 12, 2015, pp. 18-21.

Lutjering et al., Titanium, Engineering Materials and Processes, Springer-Verlag, Berlin, 2003, 15-52.

Mikro Systems, Advanced Filtration to Improve Single Crystal Casting Yield, National Energy Technology Laboratory, Aug. 2013, pp. 1-4.

Milosev et al., The Effect of Fluoride Ions on the Corrosion Behavior of Ti Metal, and Ti6-A1-7Nb and Ti-6A1-4V Alloys in Artificial Saliva, 2013, 543-555.

Rame et al., Development of AGAT, a Third-Generation Nickel-Based Superalloy for Single Crystal Turbine Blade Applications, The Minerals, Metals & Materials Society, Superalloys 2020, pp. 31-40.

Semiatin et al., The Thermomechanical Processing of Alpha/Beta Titanium Alloys, The Journal of the Minerals, Metals & Materials Society, vol. 49, Issue 6, Jun. 1997, 33-68.

Woodfield et al., The Effect of Long-Term High Temperature Exposure on the Structure and Properties of the Titanium Alloy Ti5331S, Acta Metallurgica, vol. 36, Issue 3, 1988, 507-515.

Kurzke, "Preliminary Design", Aero-Engine Design: From State Of The Art Turbofans Towards Innovative Architectures, von Karman Institute for Fluid Dynamis, Lecture Series Mar. 2008, Mar. 2008, 82 Pages.

* cited by examiner

| HPC EXIT AREA | REDLINE EGT | SLS THRUST | CST |
|---|---|---|---|
| 29.1 | 1153 | 39262 | 53.6 |
| 27.1 | 1205 | 39258 | 64.5 |
| 28.4 | 1071 | 39292 | 52.2 |
| 26.1 | 1123 | 39288 | 64.6 |
| 24.7 | 1160 | 39285 | 74.5 |
| 26.2 | 1155 | 39262 | 66.2 |
| 27.0 | 1207 | 39257 | 64.9 |
| 27.0 | 1125 | 39289 | 60.6 |
| 24.6 | 1161 | 39285 | 75.0 |
| 29.1 | 1152 | 39262 | 53.3 |
| 28.4 | 1071 | 39292 | 52.1 |
| 27.0 | 1123 | 39287 | 60.3 |

Table 1: Exemplary Alloys (tested at 23 °C)

| Alloy Ref. | Al (wt%) | V (wt%) | C (wt%) | O (wt%) | Fe (wt%) | Si (wt%) | Cu (wt%) | Mo (wt%) | Sn (wt%) | N (wt%) | .2% YS (MPa) | UTS (MPa) | El (%) | RA (%) | Log (EL) | Log (RA) | 600 FPS Bl (mm) | 800 FPS Bl (mm) | C/R (°C/min) | Test Temp (°C) | YS Model (MPa) | UTS Model (MPa) | EL Model (%) | RA Model (%) | Bl Model (mm) |
|---|---|---|---|---|---|---|---|---|---|---|---|---|---|---|---|---|---|---|---|---|---|---|---|---|---|
| E-1 | 6.75 | 4.08 | 0.01 | 0.21 | 0.49 | 0.15 | 0 | 1.28 | 0 | 0.005 | 1122 | 1159 | 17.8 | 48.4 | 1.25 | 1.67 | 0.0 | 0.0 | 191 | 23 | 1105 | 1137 | 18.7 | 54.2 | 0.5 |
| E-2 | 6.75 | 4.08 | 0.01 | 0.21 | 0.49 | 0.15 | 0 | 1.28 | 0 | 0.005 | 1094 | 1129 | 18.7 | 50.9 | 1.27 | 1.71 | 0.0 | 0.0 | 191 | 23 | 1105 | 1137 | 18.7 | 54.2 | 0.5 |
| E-3 | 6.75 | 4.09 | 0.01 | 0.21 | 0.49 | 0.15 | 0 | 1.28 | 0 | 0.005 | 1109 | 1121 | 16.3 | 47.9 | 1.21 | 1.68 | 0.0 | 0.0 | 191 | 23 | 1105 | 1137 | 18.7 | 54.2 | 0.5 |
| E-4 | 6.74 | 4.06 | 0.03 | 0.16 | 0.54 | 0.16 | 0 | 1.32 | 0 | 0.005 | 1088 | 1130 | 17.9 | 48.9 | 1.25 | 1.69 | 0.0 | 2.2 | 191 | 23 | 1076 | 1110 | 19.1 | 56.3 | 2.6 |
| E-5 | 6.74 | 4.06 | 0.03 | 0.16 | 0.54 | 0.16 | 0 | 1.32 | 0 | 0.005 | 1087 | 1127 | 18.1 | 48 | 1.26 | 1.68 | 0.0 | 2.2 | 191 | 23 | 1076 | 1110 | 19.1 | 56.3 | 2.6 |
| E-6 | 6.65 | 4.11 | 0.03 | 0.20 | 0.5 | 0.25 | 0 | 1.25 | 0 | 0.005 | 1125 | 1160 | 17.1 | 45.5 | 1.23 | 1.66 | 0.0 | 9.9 | 191 | 23 | 1111 | 1146 | 16.6 | 46.3 | 13.7 |
| E-7 | 6.65 | 4.11 | 0.03 | 0.20 | 0.5 | 0.25 | 0 | 1.25 | 0 | 0.005 | 1127 | 1164 | 17.1 | 45.4 | 1.23 | 1.66 | 0.0 | 9.9 | 191 | 23 | 1111 | 1146 | 16.6 | 46.3 | 13.7 |
| E-8 | 6.35 | 4.09 | 0.03 | 0.16 | 0.54 | 0.26 | 0 | 1.3 | 0 | 0.004 | 1059 | 1097 | 16.9 | 50 | 1.23 | 1.70 | 0.0 | 2.2 | 191 | 23 | 1075 | 1114 | 16.9 | 47.1 | 7.5 |
| E-9 | 6.35 | 4.09 | 0.03 | 0.16 | 0.54 | 0.26 | 0 | 1.3 | 0 | 0.004 | 1031 | 1071 | 18 | 52 | 1.26 | 1.72 | 0.0 | 2.2 | 191 | 23 | 1075 | 1114 | 16.9 | 47.1 | 7.5 |
| E-10 | 6.35 | 4.09 | 0.03 | 0.16 | 0.54 | 0.26 | 0 | 1.3 | 0 | 0.004 | 1024 | 1065 | 16.2 | 48.4 | 1.21 | 1.68 | 0.0 | 2.2 | 191 | 23 | 1075 | 1114 | 16.9 | 47.1 | 7.5 |
| E-11 | 5.94 | 3.9 | 0.01 | 0.14 | 0.49 | 0.14 | 0 | 1.14 | 0 | 0.004 | 1011 | 1056 | 17.8 | 54.7 | 1.25 | 1.74 | 0.0 | 0.0 | 191 | 23 | 1003 | 1050 | 18.5 | 52.6 | 1.3 |
| E-12 | 5.94 | 3.9 | 0.01 | 0.14 | 0.49 | 0.14 | 0 | 1.14 | 0 | 0.004 | 1019 | 1062 | 18.5 | 48.9 | 1.27 | 1.69 | 0.0 | 0.0 | 191 | 23 | 1003 | 1050 | 18.5 | 52.6 | 1.3 |
| E-13 | 6.44 | 3.83 | 0.02 | 0.16 | 0.48 | 0.18 | 0 | 1.13 | 0 | 0.005 | 1042 | 1084 | 18.1 | 49.6 | 1.26 | 1.70 | 0.0 | 0.0 | 191 | 23 | 1048 | 1090 | 17.5 | 49.1 | 0.5 |
| E-14 | 6.44 | 3.83 | 0.02 | 0.16 | 0.48 | 0.18 | 0 | 1.13 | 0 | 0.005 | 1038 | 1075 | 17.8 | 53.1 | 1.25 | 1.73 | 0.0 | 0.0 | 191 | 23 | 1048 | 1090 | 17.5 | 49.1 | 0.5 |
| E-15 | 6.89 | 3.89 | 0.01 | 0.14 | 0.48 | 0.22 | 0 | 1.12 | 0 | 0.006 | 1076 | 1117 | 17.9 | 48 | 1.25 | 1.68 | 0.0 | 1.6 | 191 | 23 | 1062 | 1102 | 16.7 | 46.0 | 0.2 |
| E-16 | 6.89 | 3.89 | 0.01 | 0.14 | 0.48 | 0.22 | 0 | 1.12 | 0 | 0.006 | 1082 | 1122 | 17.4 | 47.3 | 1.24 | 1.67 | 0.0 | 1.6 | 191 | 23 | 1062 | 1102 | 16.7 | 46.0 | 0.2 |
| E-17 | 5.99 | 3.8 | 0.03 | 0.19 | 0.48 | 0.14 | 0 | 1.14 | 0 | 0.008 | 1069 | 1107 | 17.9 | 50.7 | 1.25 | 1.71 | 0.0 | 2.6 | 191 | 23 | 1042 | 1085 | 18.4 | 52.3 | 3.3 |
| E-18 | 5.99 | 3.8 | 0.03 | 0.19 | 0.48 | 0.14 | 0 | 1.14 | 0 | 0.008 | 1073 | 1114 | 17.9 | 54 | 1.25 | 1.73 | 0.0 | 2.6 | 191 | 23 | 1042 | 1085 | 18.4 | 52.3 | 3.3 |
| E-19 | 5.96 | 4.1 | 0.01 | 0.20 | 0.53 | 0.26 | 0 | 1.24 | 0 | 0.016 | 1058 | 1102 | 17.2 | 49.3 | 1.24 | 1.69 | 0.0 | 1.5 | 191 | 23 | 1081 | 1123 | 15.7 | 46.0 | 2.5 |
| E-20 | 5.96 | 4.1 | 0.01 | 0.20 | 0.53 | 0.26 | 0 | 1.24 | 0 | 0.016 | 1045 | 1089 | 17.4 | 48.8 | 1.24 | 1.69 | 0.0 | 1.5 | 191 | 23 | 1081 | 1123 | 15.7 | 46.0 | 2.5 |

*FIG. 18*

Table 2: Comparative Alloys (tested at 23 °C)

| Alloy Ref. | Al (wt%) | V (wt%) | C (wt%) | O (wt%) | Fe (wt%) | Si (wt%) | Cu (wt%) | Mo (wt%) | Sn (wt%) | N (wt%) | .2% YS (MPa) | UTS (MPa) | El (%) | RA (%) | Log (EL) | Log (RA) | 600 FPS BI (mm) | 800 FPS BI (mm) | C/R (°C/min) | Test Temp (°C) | YS Model (MPa) | UTS Model (MPa) | EL Model (%) | RA Model (%) | BI Model (mm) |
|---|---|---|---|---|---|---|---|---|---|---|---|---|---|---|---|---|---|---|---|---|---|---|---|---|---|
| C-1 | 6.12 | 3.76 | 0.03 | 0.17 | 0.21 | 0.00 | 0.00 | 0.00 | 0.00 | 0.002 | 913 | 982 | 13.3 | 37.0 | 1.12 | 1.57 | 1.7 | 0.0 | 191 | 23 | 915 | 981 | 15.6 | 39.9 | 0.0 |
| C-2 | 6.12 | 3.76 | 0.03 | 0.17 | 0.21 | 0.00 | 0.00 | 0.00 | 0.00 | 0.002 | 920 | 985 | 13.4 | 35.1 | 1.13 | 1.55 | 1.7 | 0.0 | 191 | 23 | 915 | 981 | 15.6 | 39.9 | 0.0 |
| C-3 | 6.23 | 3.88 | 0.02 | 0.19 | 0.19 | 0.43 | 0.00 | 0.00 | 0.00 | 0.002 | 1038 | 1110 | 7.8 | 15.4 | 0.89 | 1.19 | 7.8 | 26.0 | 191 | 23 | 1015 | 1084 | 9.3 | 20.5 | 19.0 |
| C-4 | 6.23 | 3.88 | 0.02 | 0.19 | 0.19 | 0.43 | 0.00 | 0.00 | 0.00 | 0.002 | 1030 | 1105 | 11.4 | 25.9 | 1.06 | 1.41 | 7.8 | 26.0 | 191 | 23 | 1015 | 1084 | 9.3 | 20.5 | 19.0 |
| C-5 | 6.21 | 3.88 | 0.02 | 0.20 | 0.20 | 0.23 | 0.00 | 0.00 | 0.00 | 0.002 | 1003 | 1069 | 11.2 | 28.6 | 1.05 | 1.46 | 0.0 | 2.9 | 191 | 23 | 984 | 1050 | 11.8 | 28.0 | 5.8 |
| C-6 | 6.21 | 3.88 | 0.02 | 0.20 | 0.20 | 0.23 | 0.00 | 0.00 | 0.00 | 0.002 | 1007 | 1070 | 12.9 | 28.3 | 1.11 | 1.45 | 0.0 | 2.9 | 191 | 23 | 984 | 1050 | 11.8 | 28.0 | 5.8 |
| C-7 | 6.08 | 3.84 | 0.03 | 0.19 | 0.21 | 0.68 | 0.00 | 0.00 | 0.00 | 0.003 | 1052 | 1121 | 2.5 | 3.7 | 0.40 | 0.57 | 17.8 | 40.2 | 191 | 23 | 1056 | 1130 | 7.0 | 14.1 | 64.9 |
| C-8 | 6.08 | 3.84 | 0.03 | 0.19 | 0.21 | 0.68 | 0.00 | 0.00 | 0.00 | 0.003 | 1067 | 1141 | 11.1 | 26.5 | 1.05 | 1.42 | 17.8 | 40.2 | 191 | 23 | 1056 | 1130 | 7.0 | 14.1 | 64.9 |
| C-9 | 6.10 | 4.08 | 0.03 | 0.19 | 0.50 | 0.49 | 0.00 | 0.49 | 0.00 | 0.011 | 1074 | 1138 | 9.1 | 17.3 | 0.96 | 1.24 | 1.3 | 13.3 | 191 | 23 | 1078 | 1134 | 11.0 | 25.2 | 35.1 |
| C-10 | 6.10 | 4.08 | 0.03 | 0.19 | 0.50 | 0.49 | 0.00 | 0.49 | 0.00 | 0.011 | 1089 | 1149 | 9.0 | 18.0 | 0.95 | 1.26 | 1.3 | 13.3 | 191 | 23 | 1078 | 1134 | 11.0 | 25.2 | 35.1 |
| C-11 | 6.33 | 3.95 | 0.03 | 0.21 | 0.22 | 0.00 | 0.00 | 0.00 | 0.00 | 0.007 | 938 | 999 | 15.0 | 39.0 | 1.18 | 1.59 | 0.0 | 0.0 | 191 | 23 | 956 | 1017 | 15.7 | 40.1 | 1.0 |
| C-12 | 6.33 | 3.95 | 0.03 | 0.21 | 0.22 | 0.00 | 0.00 | 0.00 | 0.00 | 0.007 | 921 | 981 | 17.0 | 38.4 | 1.23 | 1.58 | 0.0 | 0.0 | 191 | 23 | 956 | 1017 | 15.7 | 40.1 | 1.0 |
| C-13 | 6.64 | 4.00 | 0.03 | 0.19 | 0.22 | 0.45 | 0.00 | 0.00 | 0.00 | 0.002 | 999 | 1058 | 13.6 | 33.7 | 1.13 | 1.53 | 6.5 | 21.2 | 191 | 23 | 1041 | 1106 | 9.2 | 20.2 | 30.0 |
| C-14 | 6.64 | 4.00 | 0.03 | 0.19 | 0.22 | 0.45 | 0.00 | 0.00 | 0.00 | 0.002 | 1017 | 1076 | 13.0 | 29.4 | 1.11 | 1.47 | 6.5 | 21.2 | 191 | 23 | 1041 | 1106 | 9.2 | 20.2 | 30.0 |
| C-15 | 6.26 | 3.64 | 0.02 | 0.19 | 0.91 | 0.43 | 0.00 | 0.00 | 0.00 | 0.002 | 1098 | 1155 | 14.5 | 32.7 | 1.16 | 1.51 | 12.4 | 48.2 | 191 | 23 | 1085 | 1139 | 13.2 | 28.3 | 19.0 |
| C-16 | 6.26 | 3.64 | 0.02 | 0.19 | 0.91 | 0.43 | 0.00 | 0.00 | 0.00 | 0.002 | 1084 | 1133 | 14.6 | 35.5 | 1.16 | 1.55 | 12.4 | 48.2 | 191 | 23 | 1085 | 1139 | 13.2 | 28.3 | 19.0 |
| C-17 | 6.36 | 3.93 | 0.02 | 0.20 | 0.20 | 0.46 | 0.00 | 0.98 | 0.00 | 0.005 | 1091 | 1140 | 11.7 | 34.8 | 1.07 | 1.54 | 25.8 | 47.4 | 191 | 23 | 1092 | 1143 | 10.7 | 26.9 | 24.9 |
| C-18 | 6.36 | 3.93 | 0.02 | 0.20 | 0.20 | 0.46 | 0.00 | 0.98 | 0.00 | 0.005 | 1088 | 1139 | 11.4 | 34.4 | 1.06 | 1.54 | 25.8 | 47.4 | 191 | 23 | 1092 | 1143 | 10.7 | 26.9 | 24.9 |
| C-19 | 6.51 | 4.13 | 0.05 | 0.22 | 0.20 | 0.32 | 0.00 | 1.00 | 0.00 | 0.006 | 1094 | 1142 | 13.7 | 35.0 | 1.14 | 1.54 | 12.1 | 101.6 | 191 | 23 | 1089 | 1135 | 12.7 | 33.5 | 44.4 |
| C-20 | 6.51 | 4.13 | 0.05 | 0.22 | 0.20 | 0.32 | 0.00 | 1.00 | 0.00 | 0.006 | 1102 | 1154 | 14.1 | 36.8 | 1.15 | 1.57 | 12.1 | 101.6 | 191 | 23 | 1089 | 1135 | 12.7 | 33.5 | 44.4 |

FIG. 19

Table 3A: Comparative Alloys (tested at 23 °C)

| Alloy Ref. | Al (wt%) | V (wt%) | C (wt%) | O (wt%) | Fe (wt%) | Si (wt%) | Cu (wt%) | Mo (wt%) | Sn (wt%) | N (wt%) | .2% YS (MPa) | UTS (MPa) | El (%) | RA (%) | Log (EL) | Log (RA) |
|---|---|---|---|---|---|---|---|---|---|---|---|---|---|---|---|---|
| C-21 | 6.36 | 4.14 | 0.03 | 0.19 | 0.20 | | 0.22 | | | 0.002 | 959 | 1020 | 12.0 | 31.5 | 1.08 | 1.50 |
| C-22 | 6.36 | 4.14 | 0.03 | 0.19 | 0.20 | | 0.22 | | | 0.002 | 967 | 1028 | 14.5 | 40.6 | 1.16 | 1.61 |
| C-23 | 6.25 | 3.92 | 0.02 | 0.18 | 0.21 | 0.67 | 0.20 | | | 0.002 | 1078 | 1145 | 8.1 | 15.1 | 0.91 | 1.18 |
| C-24 | 6.25 | 3.92 | 0.02 | 0.18 | 0.21 | 0.67 | 0.20 | | | 0.002 | 1085 | 1156 | 8.3 | 15.3 | 0.92 | 1.18 |
| C-25 | 6.22 | 3.85 | 0.03 | 0.17 | 0.22 | | 1.38 | | | 0.002 | 1027 | 1089 | 8.5 | 15.6 | 0.93 | 1.19 |
| C-26 | 6.22 | 3.85 | 0.03 | 0.17 | 0.22 | | 1.38 | | | 0.002 | 1031 | 1096 | 8.2 | 15.9 | 0.91 | 1.20 |
| C-27 | 6.21 | 4.10 | 0.03 | 0.19 | 0.22 | 0.30 | 1.48 | | | 0.002 | 1075 | 1135 | 7.4 | 17.0 | 0.87 | 1.23 |
| C-28 | 6.21 | 4.10 | 0.03 | 0.19 | 0.22 | 0.30 | 1.48 | | | 0.002 | 1078 | 1144 | 9.1 | 19.0 | 0.96 | 1.28 |
| C-29 | 6.10 | 3.96 | 0.03 | 0.19 | 0.21 | | 0.78 | | | 0.009 | 984 | 1036 | 10.3 | 21.1 | 1.01 | 1.32 |
| C-30 | 6.10 | 3.96 | 0.03 | 0.19 | 0.21 | | 0.78 | | | 0.009 | 985 | 1036 | 11.7 | 24.0 | 1.07 | 1.38 |
| C-31 | 6.08 | 4.10 | 0.03 | 0.20 | 0.22 | 0.50 | 0.85 | | | 0.008 | 1091 | 1142 | 3.8 | 0.0 | 0.58 | n/a |
| C-32 | 6.08 | 4.10 | 0.03 | 0.20 | 0.22 | 0.5 | 0.85 | | | 0.008 | 1096 | 1153 | 4.2 | 6.2 | 0.62 | 0.79 |
| C-33 | 6.34 | 4.08 | 0.09 | 0.19 | 0.51 | 0.49 | | 0.51 | | 0.010 | 1101 | 1165 | 7.6 | 9.2 | 0.88 | 0.96 |
| C-34 | 6.34 | 4.08 | 0.09 | 0.19 | 0.51 | 0.49 | | 0.51 | | 0.010 | 1102 | 1164 | 8.4 | 12.1 | 0.92 | 1.08 |
| C-35 | 6.32 | 4.15 | 0.10 | 0.18 | 0.22 | | 0.87 | | | 0.007 | 1032 | 1089 | 7.3 | 12.5 | 0.86 | 1.10 |
| C-36 | 6.32 | 4.15 | 0.10 | 0.18 | 0.22 | | 0.87 | | | 0.007 | 1040 | 1094 | 9.4 | 18.1 | 0.97 | 1.26 |
| C-37 | 6.24 | 4.15 | 0.09 | 0.18 | 0.22 | 0.52 | 0.86 | | | 0.006 | 1135 | 1194 | 3.9 | 6.2 | 0.59 | 0.79 |
| C-38 | 6.24 | 4.15 | 0.09 | 0.18 | 0.22 | 0.52 | 0.86 | | | 0.006 | 1126 | 1182 | 3.8 | 6.2 | 0.58 | 0.79 |
| C-39 | 6.23 | 4.08 | 0.12 | 0.17 | 0.52 | | 0.85 | 0.50 | | 0.006 | 1064 | 1118 | 9.5 | 23.0 | 0.98 | 1.36 |
| C-40 | 6.23 | 4.08 | 0.12 | 0.17 | 0.52 | | 0.85 | 0.5 | | 0.006 | 1069 | 1120 | 13.8 | 27.2 | 1.14 | 1.43 |
| C-41 | 6.21 | 4.12 | 0.09 | 0.15 | 0.52 | 0.56 | 0.88 | 0.51 | | 0.007 | 1179 | 1233 | 3.0 | 5.8 | 0.48 | 0.76 |
| C-42 | 6.21 | 4.12 | 0.09 | 0.15 | 0.52 | 0.56 | 0.88 | 0.51 | | 0.007 | 1175 | 1230 | 4.2 | 5 | 0.62 | 0.70 |
| C-43 | 6.23 | 4.03 | 0.09 | 0.21 | 0.21 | 0.50 | | | | 0.007 | 1051 | 1122 | 10.1 | 20.2 | 1.00 | 1.31 |
| C-44 | 6.23 | 4.03 | 0.09 | 0.21 | 0.21 | 0.5 | | | | 0.007 | 1051 | 1117 | 10.2 | 23.8 | 1.01 | 1.38 |
| C-45 | 6.24 | 4.18 | 0.04 | 0.23 | 0.52 | | 0.87 | 0.54 | | 0.011 | 1027 | 1080 | 10.7 | 22.3 | 1.03 | 1.35 |
| C-46 | 6.24 | 4.18 | 0.04 | 0.23 | 0.52 | | 0.87 | 0.54 | | 0.011 | 1048 | 1102 | 11.4 | 23.1 | 1.06 | 1.36 |
| C-47 | 6.21 | 4.16 | 0.03 | 0.20 | 0.52 | 0.56 | 0.86 | 0.52 | | 0.007 | 1215 | 1273 | 3.4 | 0.0 | 0.53 | n/a |
| C-48 | 6.21 | 4.16 | 0.03 | 0.20 | 0.52 | 0.56 | 0.86 | 0.52 | | 0.007 | 1149 | 1202 | 7.2 | 10.9 | 0.86 | 1.04 |
| C-49 | 6.32 | 4.21 | 0.03 | 0.18 | 0.52 | 0.57 | 0.86 | 0.52 | 1.91 | 0.006 | 1189 | 1252 | 3.6 | 4.4 | 0.56 | 0.64 |
| C-50 | 6.32 | 4.21 | 0.03 | 0.18 | 0.52 | 0.57 | 0.86 | 0.52 | 1.91 | 0.006 | 1185 | 1245 | 4 | 10.5 | 0.60 | 1.02 |

*FIG. 20*

Table 3B: Comparative Alloys (tested at 23 °C)

| Alloy Ref. | Al (wt%) | V (wt%) | C (wt%) | O (wt%) | Fe (wt%) | Si (wt%) | Cu (wt%) | Mo (wt%) | Sn (wt%) | N (wt%) | .2% YS (MPa) | UTS (MPa) | El (%) | RA (%) | Log (EL) | Log (RA) |
|---|---|---|---|---|---|---|---|---|---|---|---|---|---|---|---|---|
| C-51 | 6.37 | 4.01 | 0.03 | 0.18 | 0.22 | 0.02 | 0.86 | | | 0.003 | 1023 | 1068 | 14.8 | 40.7 | 1.17 | 1.61 |
| C-52 | 6.37 | 4.01 | 0.03 | 0.18 | 0.22 | 0.02 | 0.86 | | | 0.003 | 1010 | 1058 | 15 | 39.6 | 1.18 | 1.60 |
| C-53 | 6.31 | 3.90 | 0.03 | 0.20 | 0.19 | 0.44 | 0.80 | | | 0.003 | 1125 | 1177 | 11.1 | 26.5 | 1.05 | 1.42 |
| C-54 | 6.31 | 3.90 | 0.03 | 0.20 | 0.19 | 0.44 | 0.80 | | | 0.003 | 1135 | 1189 | 9.4 | 28.0 | 0.97 | 1.45 |
| C-55 | 6.44 | 3.89 | 0.03 | 0.19 | 0.99 | 0.02 | 0.82 | | | 0.006 | 1081 | 1128 | 13.9 | 42.3 | 1.14 | 1.63 |
| C-56 | 6.44 | 3.89 | 0.03 | 0.19 | 0.99 | 0.02 | 0.82 | | | 0.006 | 1070 | 1122 | 13.5 | 37.8 | 1.13 | 1.58 |
| C-57 | 6.34 | 3.86 | 0.03 | 0.19 | 0.20 | 0.02 | 0.83 | 0.97 | | 0.003 | 1061 | 1104 | 15.1 | 42.7 | 1.18 | 1.63 |
| C-58 | 6.34 | 3.86 | 0.03 | 0.19 | 0.20 | 0.02 | 0.83 | 0.97 | | 0.003 | 1055 | 1100 | 12.9 | 42.6 | 1.11 | 1.63 |
| C-59 | 6.14 | 3.74 | 0.03 | 0.18 | 0.45 | 0.45 | 0.75 | 0.46 | | 0.001 | 1123 | 1175 | 12.1 | 31.5 | 1.08 | 1.50 |
| C-60 | 6.14 | 3.74 | 0.03 | 0.18 | 0.45 | 0.45 | 0.75 | 0.46 | | 0.001 | 1121 | 1172 | 12.8 | 31.5 | 1.11 | 1.50 |
| C-61 | 6.02 | 3.57 | 0.05 | 0.18 | 0.44 | 0.44 | 0.75 | 0.44 | 1.82 | 0.007 | 1158 | 1212 | 12.5 | 29.7 | 1.10 | 1.47 |
| C-62 | 6.02 | 3.57 | 0.05 | 0.18 | 0.44 | 0.44 | 0.75 | 0.44 | 1.82 | 0.007 | 1162 | 1215 | 12.6 | 28.6 | 1.10 | 1.46 |
| C-63 | 6.22 | 3.66 | 0.11 | 0.18 | 0.48 | 0.44 | 0.75 | 0.46 | | 0.005 | 1170 | 1173 | 1.4 | 2.7 | 0.15 | 0.43 |
| C-64 | 6.22 | 3.66 | 0.11 | 0.18 | 0.48 | 0.44 | 0.75 | 0.46 | | 0.005 | 1134 | 1178 | 6.0 | 13.2 | 0.78 | 1.12 |
| C-65 | 6.53 | 4.09 | 0.05 | 0.22 | 0.54 | 0.37 | 0.27 | 0.51 | | 0.007 | 1149 | 1189 | 13.1 | 31.3 | 1.12 | 1.50 |
| C-66 | 6.53 | 4.09 | 0.05 | 0.22 | 0.54 | 0.37 | 0.27 | 0.51 | | 0.007 | 1139 | 1180 | 13.8 | 36.9 | 1.14 | 1.57 |

FIG. 21

Table 4: Comparative Examples

| | Al (wt%) | V (wt%) | C (wt%) | O (wt%) | Fe (wt%) | Si (wt%) | Mo (wt%) | N (wt%) | Cu (wt%) | Pred 0.2% YS (Mpa) | Pred EL (%) | Measured 0.2% YS 111C/min | Measured 0.2% YS 333C/min | Measured UTS 111C/min | Measured UTS 333C/min | Measured %El 111C/min | Measured %El 333C/min |
|---|---|---|---|---|---|---|---|---|---|---|---|---|---|---|---|---|---|
| Comp-A | 6.715 | 3.98 | 0.014 | 0.159 | 0.178 | 0.021 | 0.003 | 0.009 | 0.004 | 938 | 15.0 | 861 | 887 | 972 | 997 | 17.0 | 19.5 |
| Comp-B | 6.943 | 4.13 | 0.026 | 0.206 | 0.21 | 0.02 | 0.002 | 0.008 | 0.002 | 987 | 15.2 | 900 | 958 | 1012 | 1057 | 17.0 | 17.0 |
| Comp-C | 7.293 | 3.918 | 0.018 | 0.201 | 0.173 | 0.031 | 0.002 | 0.387 | 0.003 | 999 | 14.8 | | | | | | |
| Comp-D | 7.573 | 3.993 | 0.019 | 0.227 | 0.195 | 0.019 | 0.002 | 0.415 | 0.003 | 1032 | 15.1 | | | | | | |
| Comp-E | 6.638 | 4.028 | 0.044 | 0.159 | 0.18 | 0.019 | 0.002 | 0.008 | 0.003 | 934 | 15.0 | | | | | | |
| Comp-F | 6.693 | 4.003 | 0.102 | 0.179 | 0.183 | 0.016 | 0.003 | 0.008 | 0.003 | 951 | 15.1 | 940 | 966 | 1074 | 1088 | 17.0 | 17.0 |
| Comp-G | 6.693 | 3.91 | 0.039 | 0.18 | 0.36 | 0.508 | 0.358 | 0.009 | 0.004 | 1082 | 9.8 | 1042 | 1069 | 1131 | 1152 | 17.0 | 16.5 |
| Comp-H | 6.423 | 3.765 | 0.082 | 0.184 | 0.443 | 0.673 | 0.465 | 0.019 | 0.758 | 1117 | 8.6 | 1202 | 1214 | 1282 | 1262 | 9.5 | 3.9 |
| Comp-I | 6.603 | 3.913 | 0.025 | 0.157 | 0.52 | 0.028 | 0.56 | 0.009 | 0.005 | 997 | 19.3 | | 947 | | 1115 | 0.0 | 19.0 |
| Comp-J | 6.61 | 3.85 | 0.074 | 0.173 | 0.455 | 0.022 | 0.495 | 0.01 | 0.77 | 999 | 18.6 | 1070 | 1101 | 1145 | 1176 | 17.0 | 11.7 |
| Comp-K | 6.683 | 3.923 | 0.014 | 0.153 | 0.175 | 0.635 | 0.003 | 0.009 | 0.002 | 1047 | 7.3 | 1006 | 1048 | 1105 | 1145 | 17.0 | 15.0 |
| Comp-L | 6.605 | 3.93 | 0.019 | 0.159 | 0.173 | 0.023 | 0.002 | 0.009 | 0.308 | 932 | 14.9 | 914 | 957 | 1005 | 1031 | 19.0 | 18.0 |
| Comp-M | 6.708 | 3.89 | 0.019 | 0.143 | 0.188 | 0.02 | 0.003 | 0.009 | 0.004 | 926 | 15.1 | 885 | 989 | 1002 | 1027 | 19.0 | 17.0 |

FIG. 22

GAS TURBINE ENGINE

CROSS-REFERENCE TO RELATED APPLICATIONS

This application is a non-provisional application claiming the benefit of priority under 35 U.S.C. § 119(e) to U.S. Provisional Application No. 63/797,483, filed Apr. 30, 2025, which is hereby incorporated by reference in its entirety. This application is also a continuation-in-part of U.S. application Ser. No. 18/481,515, filed Oct. 5, 2023, which is a continuation-in-part of U.S. application Ser. No. 17/978,629, filed Nov. 1, 2022, now abandoned. The related applications are incorporated by reference in their entireties.

FIELD

The present disclosure relates to a gas turbine engine.

BACKGROUND

A gas turbine engine typically includes a fan and a turbomachine. The turbomachine generally includes an inlet, one or more compressors, a combustor, and at least one turbine. The compressors compress air which is channeled to the combustor where it is mixed with fuel. The mixture is then ignited for generating hot combustion gases. The combustion gases are channeled to the turbine(s) which extracts energy from the combustion gases for powering the compressor(s), as well as for producing useful work to propel an aircraft in flight. The turbomachine is mechanically coupled to the fan for driving the fan during operation.

BRIEF DESCRIPTION OF THE DRAWINGS

A full and enabling disclosure of the present disclosure, including the best mode thereof, directed to one of ordinary skill in the art, is set forth in the specification, which makes reference to the appended Figs., in which:

FIG. 13 is an isometric view of a bladed disk, as an example of a turbine component suitable for use in a gas turbine engine, such as shown in FIG. 1 or FIG. 8.

FIG. 14 is a sectional view of two stages of a bladed disk showing an optional location of a weld zone, such as in the bladed disk of FIG. 13.

FIG. 18 shows data in the form of Table 1 from exemplary alloys tested at 23° C. according to the Examples.

FIG. 19 shows data in the form of Table 2 from comparative alloys tested at 23° C. according to the Examples.

FIG. 20 shows data in the form of Table 3A from comparative alloys tested at 23° C. according to the Examples.

FIG. 21 shows data in the form of Table 3B from comparative alloys tested at 23° C. according to the Examples.

FIG. 22 shows data in the form of Table 4 from comparative alloys tested at 23° C. according to the Examples.

DETAILED DESCRIPTION

Figure 1:
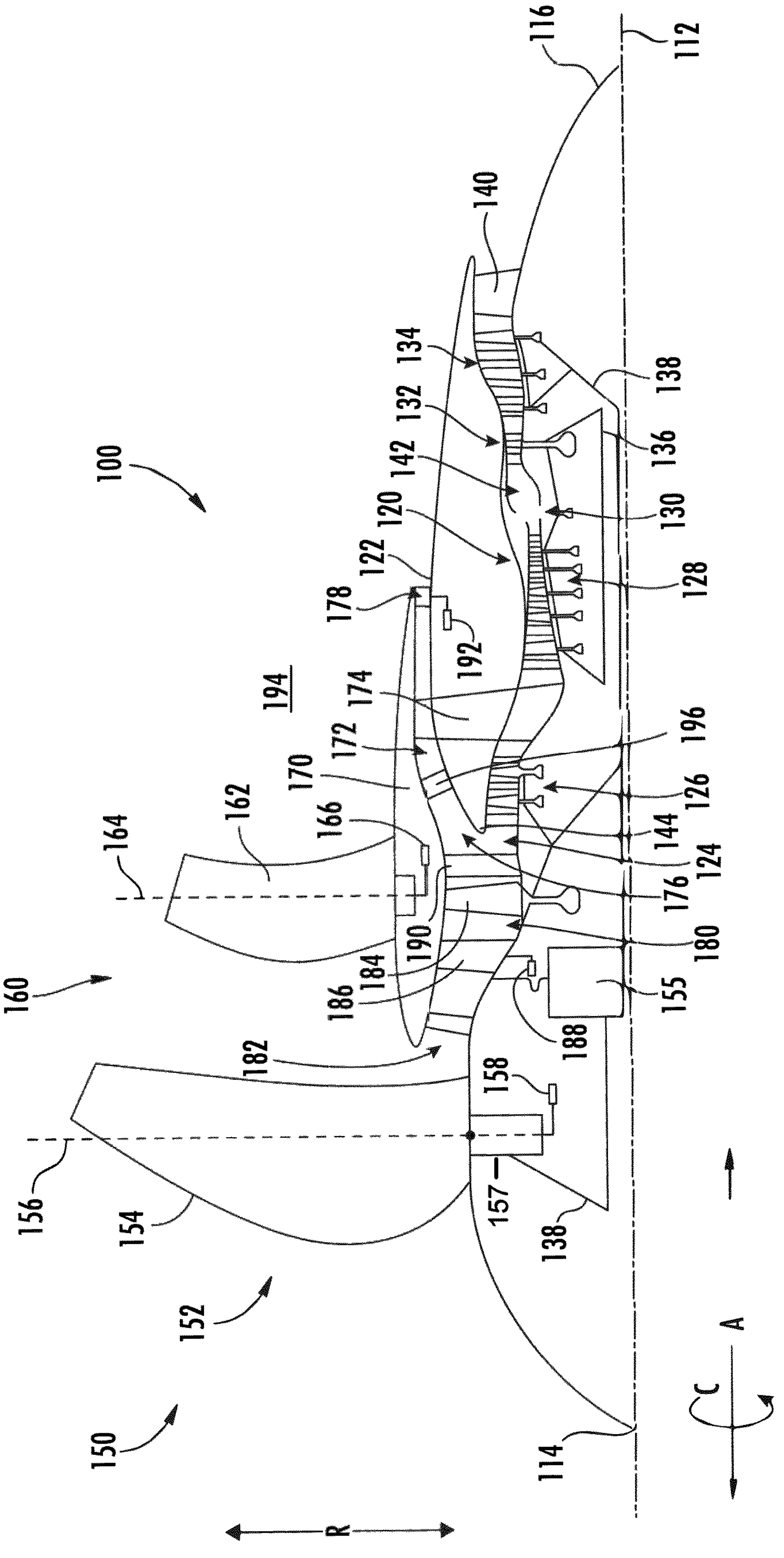
FIG. 1 is a schematic cross-sectional view of a three-stream engine in accordance with an exemplary embodiment of the present disclosure.

Reference will now be made in detail to present embodiments of the disclosure, one or more examples of which are illustrated in the accompanying drawings. The detailed description uses numerical and letter designations to refer to features in the drawings. Like or similar designations in the drawings and description have been used to refer to like or similar parts of the disclosure.

The term "cooled cooling air system" is used herein to mean a system configured to provide a cooling airflow to one or more components exposed to a working gas flowpath of a turbomachine of a gas turbine engine at a location downstream of a combustor of the turbomachine and upstream of an exhaust nozzle of the turbomachine, the cooling airflow being in thermal communication with a heat exchanger for reducing a temperature of the cooling airflow at a location upstream of the one or more components.

Figure 4:
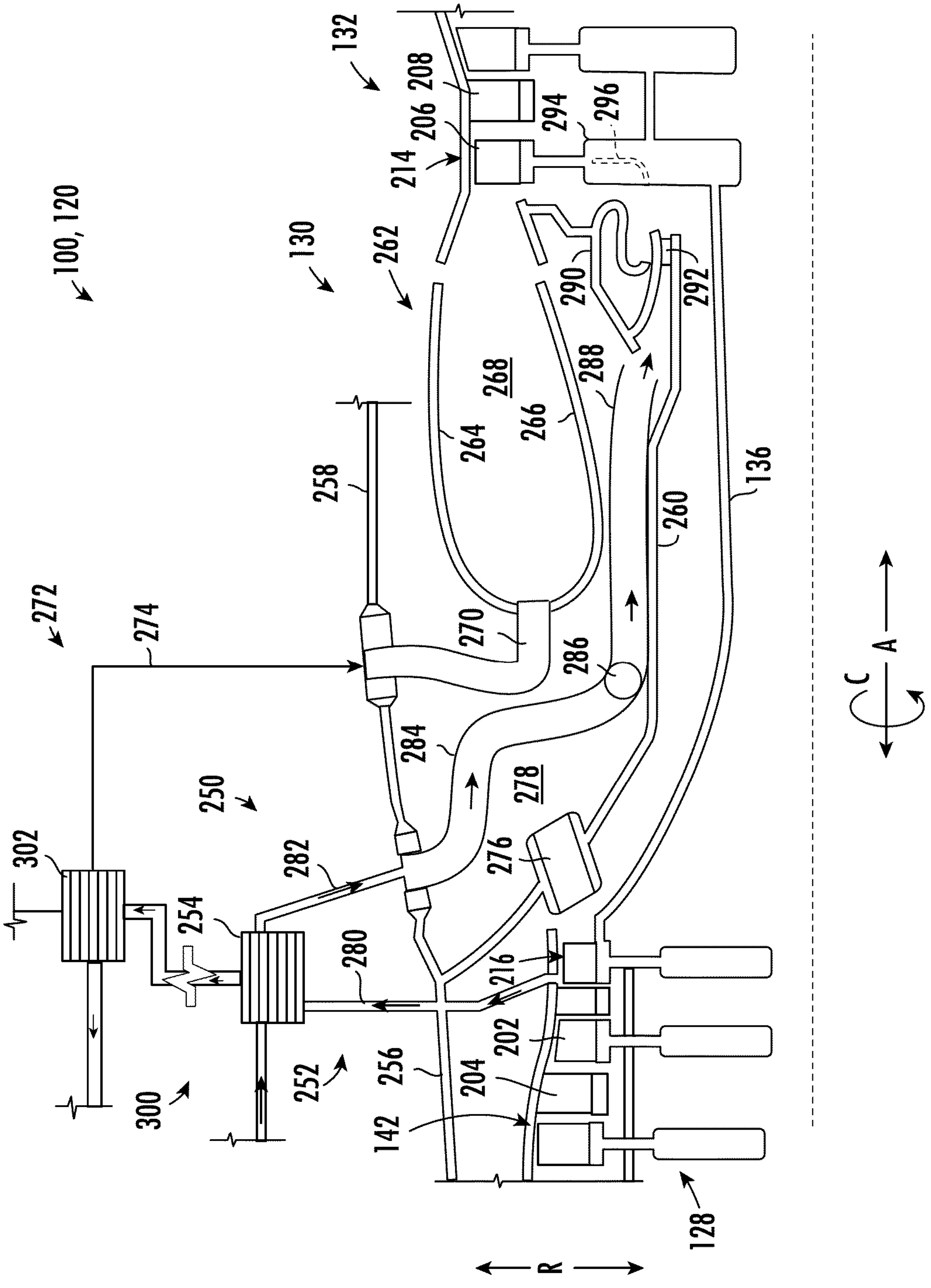
FIG. 4 is a close-up, schematic view of the exemplary three-stream engine of FIG. 1 showing the cooled cooling air system of FIG. 2.
Figure 9:
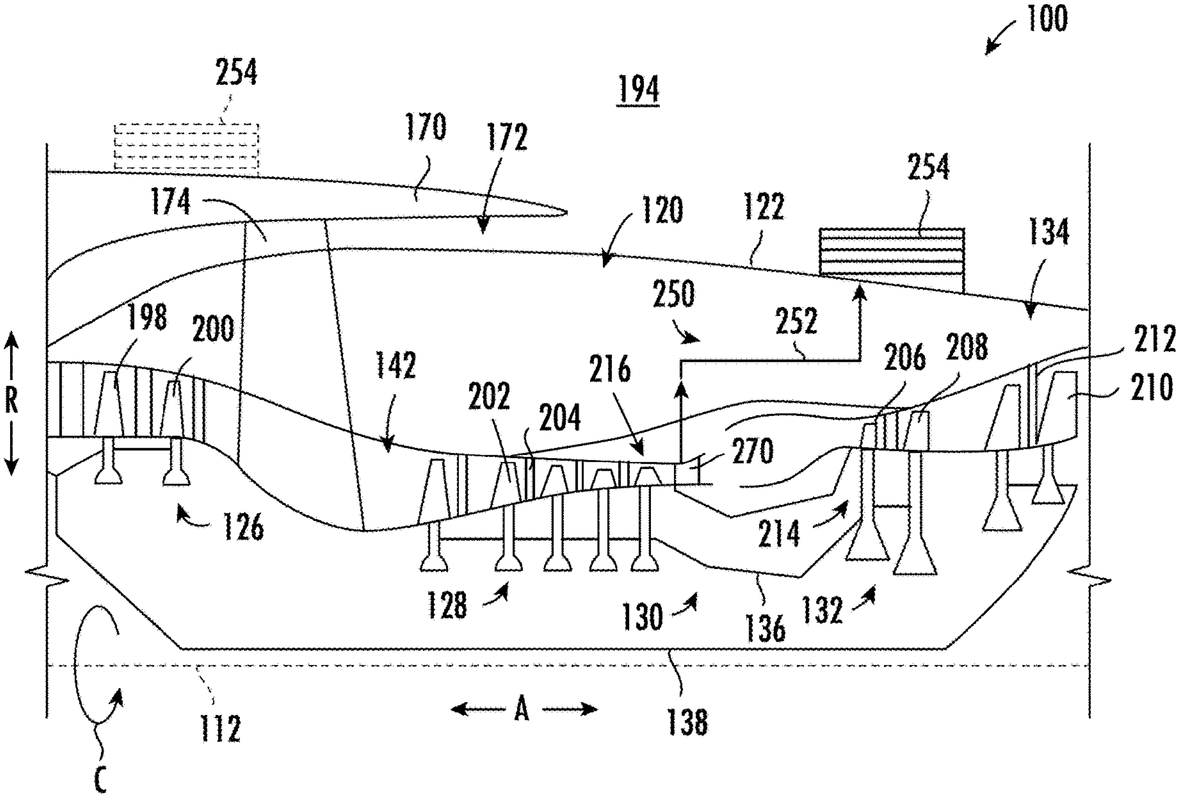
FIG. 9 is a schematic, close-up view of a gas turbine engine having a cooled cooling air system in accordance with another exemplary aspect of the present disclosure.

The cooled cooling air systems contemplated by the present disclosure may include a thermal bus cooled cooling air system (see, e.g., FIGS. 4 and 5) or a dedicated heat exchanger cooled cooling air system (i.e., a cooled cooling air system including a heat sink heat exchanger dedicated to the cooled cooling air system); a bypass heat exchanger cooled cooling air system having a heat sink heat exchanger thermally coupled to an airflow through a bypass passage (see, e.g., FIG. 9); an air-to-air cooled cooling air system (i.e., a cooled cooling air system having a heat sink heat exchanger configured to transfer heat to an airflow; see, e.g., FIG. 9); an oil-to-air cooled cooling air system (i.e., a cooled cooling air system having a heat sink heat exchanger configured to transfer heat to an oil flow); a fuel-to-air cooled cooling air system (i.e., a cooled cooling air system having a heat sink heat exchanger configured to transfer heat to a fuel flow, such as a Jet A fuel flow, a liquid hydrogen or hydrogen gas fuel flow, etc.; see, e.g., FIG. 4); or a combination thereof.

In one or more of the exemplary cooled cooling air systems described herein, the cooled cooling air system may receive the cooling air from a downstream end of a high pressure compressor (i.e., a location closer to a last stage of the high pressure compressor), an upstream end of the high pressure compressor (i.e., a location closer to a first stage of the high pressure compressor), a downstream end of a low pressure compressor (i.e., a location closer to a last stage of the low pressure compressor), an upstream end of the low pressure compressor (i.e., a location closer to a first stage of the low pressure compressor), a location between compressors, a bypass passage, a combination thereof, or any other suitable airflow source.

The word "exemplary" is used herein to mean "serving as an example, instance, or illustration." Any implementation described herein as "exemplary" is not necessarily to be construed as preferred or advantageous over other implementations. Additionally, unless specifically identified otherwise, all embodiments described herein should be considered exemplary.

As used herein, the terms "first", "second", and "third" may be used interchangeably to distinguish one component from another and are not intended to signify location or importance of the individual components.

The terms "forward" and "aft" refer to relative positions within a gas turbine engine or vehicle, and refer to the normal operational attitude of the gas turbine engine or vehicle. For example, with regard to a gas turbine engine, forward refers to a position closer to an engine inlet and aft refers to a position closer to an engine nozzle or exhaust.

The terms "upstream" and "downstream" refer to the relative direction with respect to fluid flow in a fluid pathway. For example, "upstream" refers to the direction from which the fluid flows, and "downstream" refers to the direction to which the fluid flows.

The terms "coupled," "fixed," "attached to," and the like refer to both direct coupling, fixing, or attaching, as well as indirect coupling, fixing, or attaching through one or more intermediate components or features, unless otherwise specified herein.

The singular forms "a", "an", and "the" include plural references unless the context clearly dictates otherwise.

The phrases "from X to Y" and "between X and Y" each refers to a range of values inclusive of the endpoints (i.e., refers to a range of values that includes both X and Y).

A "third stream" as used herein means a non-primary air stream capable of increasing fluid energy to produce a minority of total propulsion system thrust. A pressure ratio of the third stream may be higher than that of the primary propulsion stream (e.g., a bypass or propeller driven propulsion stream). The thrust may be produced through a dedicated nozzle or through mixing of an airflow through the third stream with a primary propulsion stream or a core air stream, e.g., into a common nozzle.

In certain exemplary embodiments an operating temperature of the airflow through the third stream may be less than a maximum compressor discharge temperature for the engine, and more specifically may be less than 350 degrees Fahrenheit (such as less than 300 degrees Fahrenheit, such as less than 250 degrees Fahrenheit, such as less than 200 degrees Fahrenheit, and at least as great as an ambient temperature). In certain exemplary embodiments these operating temperatures may facilitate heat transfer to or from the airflow through the third stream and a separate fluid stream. Further, in certain exemplary embodiments, the airflow through the third stream may contribute less than 50% of the total engine thrust (and at least, e.g., 2% of the total engine thrust) at a takeoff condition, or more particularly while operating at a rated takeoff power at sea level, static flight speed, 86 degrees Fahrenheit ambient temperature operating conditions.

Furthermore in certain exemplary embodiments, aspects of the airflow through the third stream (e.g., airstream, mixing, or exhaust properties), and thereby the aforementioned exemplary percent contribution to total thrust, may passively adjust during engine operation or be modified purposefully through use of engine control features (such as fuel flow, electric machine power, variable stators, variable inlet guide vanes, valves, variable exhaust geometry, or fluidic features) to adjust or optimize overall system performance across a broad range of potential operating conditions.

The term "takeoff power level" refers to a power level of a gas turbine engine used during a takeoff operating mode of the gas turbine engine during a standard day operating condition.

The term "standard day operating condition" refers to ambient conditions of sea level altitude, 59 degrees Fahrenheit, and 60 percent relative humidity.

The term "propulsive efficiency" refers to an efficiency with which the energy contained in an engine's fuel is converted into kinetic energy for the vehicle incorporating the engine, to accelerate it, or to replace losses due to aerodynamic drag or gravity.

The term redline exhaust gas temperature (referred to herein as "redline EGT") refers to a maximum permitted takeoff temperature documented in a Federal Aviation Administration ("FAA")-type certificate data sheet. For example, in certain exemplary embodiments, the term redline EGT may refer to a maximum permitted takeoff temperature of an airflow after a first stage stator downstream of an HP turbine of an engine that the engine is rated to withstand. For example, with reference to the exemplary engine 100 discussed below with reference to FIG. 2, the term redline EGT refers to a maximum permitted takeoff temperature of an airflow after the first stator 208 downstream of the last stage of rotor blades 206 of the HP turbine 132 (at location 215 into the first of the plurality of LP turbine rotor blades 210). In embodiments wherein the engine is configured as a three spool engine (as compared to the two spool engine of FIG. 2; see FIG. 12), the term redline EGT refers to a maximum permitted takeoff temperature of an airflow after the first stator downstream of the last stage of rotor blades of the intermediate speed turbine (see intermediate speed turbine 516 of the engine 500 of FIG. 12). The term redline EGT is sometimes also referred to as an indicated turbine exhaust gas temperature or indicated turbine temperature.

Chemical elements are discussed in the present disclosure using their common chemical abbreviation, such as commonly found on a periodic table of elements. For example, hydrogen is represented by its common chemical abbreviation H; helium is represented by its common chemical abbreviation He; and so forth.

The term "yield strength" refers to the stress at which a material begins to exhibit plastic deformation (permanent deformation) without any increase in load. It is the point on the stress-strain curve where the material transitions from elastic deformation (reversible) to plastic deformation (irreversible). 0.2% yield strength is the strength measured at 0.2% plastic strain beyond yield strength. It is easier and more reproducible to measure than the yield strength. 0.2% yield strength is an important parameter in determining the structural integrity and stability of a material under load.

The term "ultimate tensile strength" ("UTS") is the maximum stress a material can withstand before fracturing or breaking. It is the highest point on the stress-strain curve and represents the material's maximum strength under tensile loading. Once the UTS is reached, the material experiences necking (localized deformation) and ultimately fails.

The term "plastic elongation" refers to a material's ability to plastically deform under tensile stress without fracturing. It is an important mechanical property that measures the extent to which a material can be permanently deformed without breaking. Ductile materials can undergo large plastic deformation before failure, while brittle materials tend to fracture without significant deformation. Plastic elongation is typically measured as the percentage increase in length between two marks placed on the gage length prior to the test and the final distance between the two marks after the test is completed and the two fractured specimen halves are fit back together. A higher plastic elongation indicates greater ductility, as it indicates that the metal can deform significantly before fracturing. Conversely, a lower plastic elongation suggests lower ductility, meaning the metal is more brittle and prone to fracture without significant plastic deformation.

The "reduction in area" (also expressed as "% RA") refers to a measurement quantifying the extent of deformation or plastic flow that occurs in a metal specimen during mechanical testing. When a metal specimen is subjected to tensile forces, it undergoes plastic deformation in the form of elongation and reduction in cross-sectional area. The reduction in area is a measurement of the decrease in the cross-sectional area of the specimen after it fractures or fails during the testing process. The reduction in area is typically expressed as a percentage and is calculated using the following formula: Reduction in Area=[(Original cross-sectional area−Final cross-sectional area)/Original cross-sectional area]×100. A higher reduction in area indicates greater ductility, as it indicates that the metal can deform significantly before fracturing. Conversely, a lower reduction in area suggests lower ductility, meaning the metal is more brittle and prone to fracture without significant plastic deformation.

Values disclosed for 0.2% yield strength, the ultimate tensile strength, plastic elongation, and the reduction in area are measured at room temperature (i.e., 20° C. to 25° C.) according to ASTM E8/E8M, also known as the Standard Test Methods for Tension Testing of Metallic Materials. ASTM E8/E8M is a widely used standard in the field of materials testing, including for alloy characterization, that provides guidelines for conducting tension tests to determine the mechanical properties of metallic materials. In addition to ASTM E8/E8M, all the tensile tests were run at a controlled strain rate of 0.005 in/in ±0.002 in/in per minute. After the 0.2 percent yield point has been reached and the load has stabilized, the crosshead speed was 0.05±0.01 in/in of the length of the reduced section of the specimen per minute. Plastic elongation and % RA were measured using the "fit-back method" whereby fracture surfaces of the failed specimens were fit back together to measure the length change and reduced cross area needed to calculate these parameters. All tensile testing was performed on bars with a gage diameter of at least 0.14" and a gage length of at least 0.75".

The "ballistic impact resistance" refers to a material's ability to resist the penetration or deformation caused by projectiles or high-velocity impacts. It is particularly important in applications where protection against bullets, shrapnel, or other projectiles is required. Materials with high ballistic impact resistance are designed to absorb and dissipate the energy of the impact, reducing the damage caused by the projectile. The resistance to ballistic impact damage, or foreign object damage, was measured using a compressed ballistic rig firing approximately 4.45 mm diameter ball bearing Cr-steel alloy balls weighing 0.36 g and having a hardness of 55 Rockwell C at speeds ranging from approximately 182.9 meters per second to approximately 304.8 meters per second into targets of the alloys under test, with the sample thickness of 0.762 mm. The extent of damage was quantified by summing the total radial crack length for crack(s) emanating from the impact site. For avoidance of doubt, only radial crack lengths are summed, while any circumferential cracking associated with the impact site was not considered.

The term "weight percent" (abbreviated herein as wt %) refers to the concentration of the amount of a particular element in the titanium alloy. The weight percent represents the proportion of the element's weight relative to the total weight of the titanium alloy, expressed as a percentage. Weight percent is calculated by dividing the weight of the element by the total weight of the titanium alloy and multiplying the result by 100.

Generally, a turbofan engine includes a fan and a turbomachine, with the turbomachine rotating the fan to generate thrust. The turbomachine includes a compressor section, a combustion section, a turbine section, and an exhaust section and defines a working gas flowpath therethrough. A relatively small amount of thrust may also be generated by an airflow exiting the working gas flowpath of the turbomachine through the exhaust section. In addition, certain turbofan engines may further include a third stream that contributes to a total thrust output of the turbofan engine, potentially allowing for a reduction in size of a core of the turbomachine for a given total turbofan engine thrust output.

Conventional turbofan engine design practice has limited a compressor pressure ratio based at least in part on the gas temperatures at the exit stage of a high pressure compressor. These relatively high temperatures at the exit of the high pressure compressor may also be avoided when they result in prohibitively high temperatures at an inlet to the turbine section, as well as when they result in prohibitively high exhaust gas temperatures through the exhaust section. For a desired turbofan engine thrust output produced from an increased pressure ratio across the high pressure compressor, there is an increase in the gas temperature at the compressor exit, at a combustor inlet, at the turbine section inlet, and through an exhaust section of the turbofan engine.

The inventors have recognized that there are generally three approaches to making a gas turbine engine capable of operating at higher temperatures while providing a net benefit to engine performance: reducing the temperature of a gas used to cool core components, utilizing materials capable of withstanding higher operating temperature conditions, or a combination thereof.

Referring to the case of an engine that utilizes cooled cooling air for operating at higher temperatures, the inventors of the present disclosure discovered, unexpectedly, that the costs associated with achieving a higher compression by reducing gas temperatures used to cool core components to accommodate higher core gas temperatures may indeed produce a net benefit, contrary to prior expectations in the art. The inventors discovered during the course of designing several engine architectures of varying thrust classes and mission requirements (including the engines illustrated and described in detail herein) a relationship exists among the exhaust gas passing through the exhaust section, the desired maximum thrust for the engine, and the size of the exit stage of the high pressure compressor, whereby including this technology produces a net benefit. Previously it was thought that the cost for including a technology to reduce the temperature of gas intended for cooling compressor and turbine components was too prohibitive, as compared to the benefits of increasing the core temperatures.

For example, the inventors of the present disclosure found that a cooled cooling air system may be included while maintaining or even increasing the maximum turbofan engine thrust output, based on this discovery. The cooled cooling air system may receive an airflow from the compressor section, reduce a temperature of the airflow using a heat exchanger, and provide the cooled airflow to one or more components of the turbine section, such as a first stage of high pressure turbine rotor blades. In such a manner, a first stage of high pressure turbine rotor blades may be capable of withstanding increased temperatures by using the cooled cooling air, while providing a net benefit to the turbofan engine, i.e., while taking into consideration the costs associated with accommodations made for the system used to cool the cooling air.

The inventors reached this conclusion after evaluating potentially negative impacts to engine performance brought on by introduction of a cooled cooling air system. For example, a cooled cooling air system may generally include a duct extending through a diffusion cavity between a compressor exit and a combustor within the combustion section, such that increasing the cooling capacity may concomitantly increase a size of the duct and thus increase a drag or blockage of an airflow through the diffusion cavity, potentially creating problems related to, e.g., combustor aerodynamics. Similarly, a dedicated or shared heat exchanger of the cooled cooling air system may be positioned in a bypass passage of the turbofan engine, which may create an aerodynamic drag or may increase a size of the shared heat exchanger and increase aerodynamic drag. Size and weight increases associated with maintaining certain risk tolerances were also taken into consideration. For example, a cooled cooling air system must be accompanied with adequate safeguards in the event of a burst pipe condition, which safeguards result in further increases in the overall size, complexity, and weight of the system.

With a goal of arriving at an improved turbofan engine capable of operating at higher temperatures at the compressor exit and turbine inlet, the inventors have proceeded in the manner of designing turbofan engines having an overall pressure ratio, total thrust output, redline exhaust gas temperature, and the supporting technology characteristics; checking the propulsive efficiency and qualitative turbofan engine characteristics of the designed turbofan engine; redesigning the turbofan engine to have higher or lower compression ratios based on the impact on other aspects of the architecture, total thrust output, redline exhaust gas temperature, and supporting technology characteristics; rechecking the propulsive efficiency and qualitative turbofan engine characteristics of the redesigned turbofan engine; etc. during the design of several different types of turbofan engines, including the turbofan engines described below with reference to FIGS. 1 and 4 through 8 through 11, which will now be discussed in greater detail.

Referring now to FIG. 1, a schematic cross-sectional view of an engine 100 is provided according to an example embodiment of the present disclosure. Particularly, FIG. 1 provides a turbofan engine having a rotor assembly with a single stage of unducted rotor blades. In such a manner, the rotor assembly may be referred to herein as an "unducted fan," or the entire engine 100 may be referred to as an "unducted turbofan engine." In addition, the engine 100 of FIG. 1 includes a third stream extending from a location downstream of a ducted mid-fan to a bypass passage over the turbomachine, as will be explained in more detail below.

For reference, the engine 100 defines an axial direction A, a radial direction R, and a circumferential direction C. Moreover, the engine 100 defines an axial centerline or longitudinal axis 112 that extends along the axial direction A. In general, the axial direction A extends parallel to the longitudinal axis 112, the radial direction R extends outward from and inward to the longitudinal axis 112 in a direction orthogonal to the axial direction A, and the circumferential direction extends three hundred sixty degrees (360°) around the longitudinal axis 112. The engine 100 extends between a forward end 114 and an aft end 116, e.g., along the axial direction A.

The engine 100 includes a turbomachine 120 and a rotor assembly, also referred to a fan section 150, positioned upstream thereof. Generally, the turbomachine 120 includes, in serial flow order, a compressor section, a combustion section 130, a turbine section, and an exhaust section. Particularly, as shown in FIG. 1, the turbomachine 120 includes a core cowl 122 that defines an annular core inlet 124. The core cowl 122 further encloses at least in part a low pressure system and a high pressure system. For example, the core cowl 122 depicted encloses and supports at least in part a booster or low pressure ("LP") compressor 126 for pressurizing the air that enters the turbomachine 120 through core inlet 124. A high pressure ("HP"), multi-stage, axial-flow compressor 128 receives pressurized air from the LP compressor 126 and further increases the pressure of the air. The pressurized air stream flows downstream to a combustor of the combustion section 130 where fuel is injected into the pressurized air stream and ignited to raise the temperature and energy level of the pressurized air.

It will be appreciated that as used herein, the terms "high/low speed" and "high/low pressure" are used with respect to the high pressure/high speed system and low pressure/low speed system interchangeably. Further, it will be appreciated that the terms "high" and "low" are used in this same context to distinguish the two systems, and are not meant to imply any absolute speed and/or pressure values.

The high energy combustion products flow from the combustion section 130 downstream to a high pressure turbine 132. The high pressure turbine 132 drives the high pressure compressor 128 through a high pressure shaft 136. In this regard, the high pressure turbine 132 is drivingly coupled with the high pressure compressor 128. As will be appreciated, the high pressure compressor 128, the combustion section 130, and the high pressure turbine 132 may collectively be referred to as the "core" of the engine 100. The high energy combustion products then flow to a low pressure turbine 134. The low pressure turbine 134 drives the low pressure compressor 126 and components of the fan section 150 through a low pressure shaft 138. In this regard, the low pressure turbine 134 is drivingly coupled with the low pressure compressor 126 and components of the fan section 150. The LP shaft 138 is coaxial with the HP shaft 136 in this example embodiment. After driving each of the turbines 132, 134, the combustion products exit the turbomachine 120 through a turbomachine exhaust nozzle 140.

Accordingly, the turbomachine 120 defines a working gas flowpath or core duct 142 that extends between the core inlet 124 and the turbomachine exhaust nozzle 140. The working gas flowpath 142 is an annular duct positioned generally inward of the core cowl 122 along the radial direction R. The working gas flowpath 142 (e.g., the working gas flowpath through the turbomachine 120) may be referred to as a second stream.

The fan section 150 includes a fan 152, which is the primary fan in this example embodiment. For the depicted embodiment of FIG. 1, the fan 152 is an open rotor or unducted fan 152. In such a manner, the engine 100 may be referred to as an open rotor engine.

As depicted, the fan 152 includes an array of fan blades 154 (only one shown in FIG. 1). The fan blades 154 are rotatable, e.g., about the longitudinal axis 112. As noted above, the fan 152 is drivingly coupled with the low pressure turbine 134 via a hub 157 and the LP shaft 138. For the embodiments shown in FIG. 1, the fan 152 is coupled with the LP shaft 138 via a speed reduction gearbox 155, e.g., in an indirect-drive or geared-drive configuration.

Moreover, the array of fan blades 154 can be arranged in equal spacing around the longitudinal axis 112. Each fan blade 154 has a root and a tip and a span defined therebetween, and further defines a central blade axis 156. For this embodiment, each fan blade 154 of the fan 152 is rotatable about its respective central blade axis 156, e.g., in unison with one another. One or more actuators 158 are provided to facilitate such rotation and therefore may be used to change a pitch of the fan blades 154 about their respective central blades' axes 156.

The fan section 150 further includes a fan guide vane array 160 that includes fan guide vanes 162 (only one shown in FIG. 1) disposed around the longitudinal axis 112. For this embodiment, the fan guide vanes 162 are not rotatable about the longitudinal axis 112. Each fan guide vane 162 has a root and a tip and a span defined therebetween. The fan guide vanes 162 may be unshrouded as shown in FIG. 1 or, alternatively, may be shrouded, e.g., by an annular shroud spaced outward from the tips of the fan guide vanes 162 along the radial direction R or attached to the fan guide vanes 162.

Each fan guide vane 162 defines a central blade axis 164. For this embodiment, each fan guide vane 162 of the fan guide vane array 160 is rotatable about its respective central blade axis 164, e.g., in unison with one another. One or more actuators 166 are provided to facilitate such rotation and therefore may be used to change a pitch of the fan guide vane 162 about its respective central blade axis 164. However, in other embodiments, each fan guide vane 162 may be fixed or unable to be pitched about its central blade axis 164. The fan guide vanes 162 are mounted to a fan cowl 170. Notably, the engine 100 defines a bypass passage 194 over the fan cowl 170 and core cowl 122.

As shown in FIG. 1, in addition to the fan 152, which is unducted, a ducted fan 184 is included aft of the fan 152, such that the engine 100 includes both a ducted and an unducted fan which both serve to generate thrust through the movement of air without passage through at least a portion of the turbomachine 120 (e.g., without passage through the HP compressor 128 and combustion section for the embodiment depicted). The ducted fan 184 is rotatable about the same axis (e.g., the longitudinal axis 112) as the fan 152. The ducted fan 184 is, for the embodiment depicted, driven by the low pressure turbine 134 (e.g. coupled to the LP shaft 138). In the embodiment depicted, as noted above, the fan 152 may be referred to as the primary fan, and the ducted fan 184 may be referred to as a secondary fan. It will be appreciated that these terms "primary" and "secondary" are terms of convenience, and do not imply any particular importance, power, or the like.

The ducted fan 184 includes a plurality of fan blades (not separately labeled in FIG. 1) arranged in a single stage, such that the ducted fan 184 may be referred to as a single stage fan. The fan blades of the ducted fan 184 can be arranged in equal spacing around the longitudinal axis 112. Each blade of the ducted fan 184 has a root and a tip and a span defined therebetween.

The fan cowl 170 annularly encases at least a portion of the core cowl 122 and is generally positioned outward of at least a portion of the core cowl 122 along the radial direction R. Particularly, a downstream section of the fan cowl 170 extends over a forward portion of the core cowl 122 to define a fan duct flowpath, or simply a fan duct 172. According to this embodiment, the fan duct flowpath or fan duct 172 may be understood as forming at least a portion of the third stream of the engine 100.

Incoming air may enter through the fan duct 172 through a fan duct inlet 176 and may exit through a fan exhaust nozzle 178 to produce propulsive thrust. The fan duct 172 is an annular duct positioned generally outward of the working gas flowpath 142 along the radial direction R. The fan cowl 170 and the core cowl 122 are connected together and supported by a plurality of substantially radially-extending, circumferentially-spaced stationary struts 174 (only one shown in FIG. 1). The stationary struts 174 may each be aerodynamically contoured to direct air flowing thereby. Other struts in addition to the stationary struts 174 may be used to connect and support the fan cowl 170 and/or core cowl 122. In many embodiments, the fan duct 172 and the working gas flowpath 142 may at least partially co-extend (generally axially) on opposite sides (e.g., opposite radial sides) of the core cowl 122. For example, the fan duct 172 and the working gas flowpath 142 may each extend directly from a leading edge 144 of the core cowl 122 and may partially co-extend generally axially on opposite radial sides of the core cowl 122.

The engine 100 also defines or includes an inlet duct 180. The inlet duct 180 extends between an engine inlet 182 and the core inlet 124/fan duct inlet 176. The engine inlet 182 is defined generally at the forward end of the fan cowl 170 and is positioned between the fan 152 and the fan guide vane array 160 along the axial direction A. The inlet duct 180 is an annular duct that is positioned inward of the fan cowl 170 along the radial direction R. Air flowing downstream along the inlet duct 180 is split, not necessarily evenly, into the working gas flowpath 142 and the fan duct 172 by the leading edge 144 of the core cowl 122. The inlet duct 180 is wider than the working gas flowpath 142 along the radial direction R. The inlet duct 180 is also wider than the fan duct 172 along the radial direction R. The secondary fan 184 is positioned at least partially in the inlet duct 180.

Notably, for the embodiment depicted, the engine 100 includes one or more features to increase an efficiency of a third stream thrust, $Fn_{3S}$ (e.g., a thrust generated by an airflow through the fan duct 172 exiting through the fan exhaust nozzle 178, generated at least in part by the ducted fan 184). In particular, the engine 100 further includes an array of inlet guide vanes 186 positioned in the inlet duct 180 upstream of the ducted fan 184 and downstream of the engine inlet 182. The array of inlet guide vanes 186 are arranged around the longitudinal axis 112. For this embodiment, the inlet guide vanes 186 are not rotatable about the longitudinal axis 112. Each inlet guide vane 186 defines a central blade axis (not labeled for clarity), and is rotatable about its respective central blade axis, e.g., in unison with one another. In such a manner, the inlet guide vanes 186 may be considered a variable geometry component. One or more actuators 188 are provided to facilitate such rotation and therefore may be used to change a pitch of the inlet guide vanes 186 about their respective central blade axes. However, in other embodiments, each inlet guide vane 186 may be fixed or unable to be pitched about its central blade axis.

Further, located downstream of the ducted fan 184 and upstream of the fan duct inlet 176, the engine 100 includes an array of outlet guide vanes 190. As with the array of inlet guide vanes 186, the array of outlet guide vanes 190 are not rotatable about the longitudinal axis 112. However, for the embodiment depicted, unlike the array of inlet guide vanes 186, the array of outlet guide vanes 190 are configured as fixed-pitch outlet guide vanes.

Further, it will be appreciated that for the embodiment depicted, the fan exhaust nozzle 178 of the fan duct 172 is further configured as a variable geometry exhaust nozzle. In such a manner, the engine 100 includes one or more actuators 192 for modulating the variable geometry exhaust nozzle. For example, the variable geometry exhaust nozzle may be configured to vary a total cross-sectional area (e.g., an area of the nozzle in a plane perpendicular to the longitudinal axis 112) to modulate an amount of thrust generated based on one or more engine operating conditions (e.g., temperature, pressure, mass flowrate, etc. of an airflow through the fan duct 172). A fixed geometry exhaust nozzle may also be adopted.

The combination of the array of inlet guide vanes 186 located upstream of the ducted fan 184, the array of outlet guide vanes 190 located downstream of the ducted fan 184, and the fan exhaust nozzle 178 may result in a more efficient generation of third stream thrust, $Fn_{3S}$, during one or more engine operating conditions. Further, by introducing a variability in the geometry of the inlet guide vanes 186 and the fan exhaust nozzle 178, the engine 100 may be capable of generating more efficient third stream thrust, $Fn_{3S}$, across a relatively wide array of engine operating conditions, including takeoff and climb as well as cruise.

Moreover, referring still to FIG. 1, in exemplary embodiments, air passing through the fan duct 172 may be relatively cooler (e.g., lower temperature) than one or more fluids utilized in the turbomachine 120. In this way, one or more heat exchangers 196 may be positioned in thermal communication with the fan duct 172. For example, one or more heat exchangers 196 may be disposed within the fan duct 172 and utilized to cool one or more fluids from the core engine with the air passing through the fan duct 172, as a resource for removing heat from a fluid, e.g., compressor bleed air, oil or fuel.

Although not depicted, the heat exchanger 196 may be an annular heat exchanger extending substantially 360 degrees in the fan duct 172 (e.g., at least 300 degrees, such as at least 330 degrees). In such a manner, the heat exchanger 196 may effectively utilize the air passing through the fan duct 172 to cool one or more systems of the engine 100 (e.g., a cooled cooling air system (described below), lubrication oil systems, compressor bleed air, electrical components, etc.). The heat exchanger 196 uses the air passing through duct 172 as a heat sink and correspondingly increases the temperature of the air downstream of the heat exchanger 196 and exiting the fan exhaust nozzle 178.

As will be appreciated, the engine 100 defines a total sea level static thrust output $Fn_{Total}$, corrected to standard day conditions, which is generally equal to a maximum total engine thrust. It will be appreciated that "sea level static thrust corrected to standard day conditions" refers to an amount of thrust an engine is capable of producing while at rest relative to the earth and the surrounding air during standard day operating conditions.

The total sea level static thrust output $Fn_{Total}$ may generally be equal to a sum of: a fan stream thrust $Fn_{Fan}$ (i.e., an amount of thrust generated by the fan 152 through the bypass passage 194), the third stream thrust $Fn_{3S}$ (i.e., an amount of thrust generated through the fan duct 172), and a turbomachine thrust $Fn_{TM}$ (i.e., an amount of thrust generated by an airflow through the turbomachine exhaust nozzle 140), each during the static, sea level, standard day conditions. The engine 100 may define a total sea level static thrust output $Fn_{Total}$ greater than or equal to 15,000 pounds. For example, it will be appreciated that the engine 100 may be configured to generate at least 25,000 pounds and less than 80,000 pounds, such as between 25,000 and 50,000 pounds, such as between 35,000 and 45,000 pounds of thrust during a takeoff operating power, corrected to standard day sea level conditions.

Figure 2:
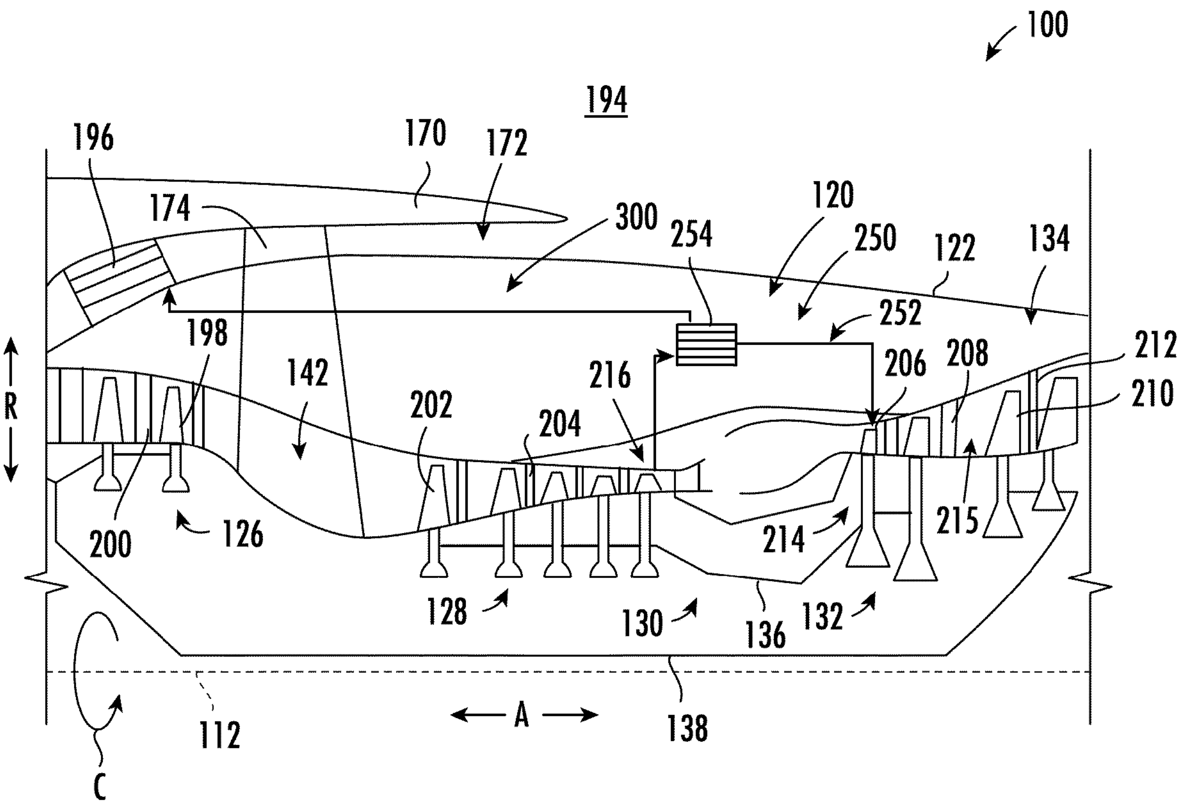
FIG. 2 is a close-up, schematic view of the exemplary three-stream engine of FIG. 1 with a cooled cooling air system in accordance with an exemplary embodiment of the present disclosure.

As will be appreciated, the engine 100 defines a redline exhaust gas temperature (referred to herein as "EGT"), which is defined above, and for the embodiment of FIG. 1 refers to a maximum permitted takeoff temperature of an airflow after the first stator 208 downstream of the last stage of rotor blades 206 of the HP turbine 132 (at location 215 into the first of the plurality of LP turbine rotor blades 210; see FIG. 2).

Referring now to FIG. 2, a close-up, simplified, schematic view of a portion of the engine 100 of FIG. 1 is provided. The engine 100, as noted above includes the turbomachine 120 having the LP compressor 126, the HP compressor 128, the combustion section 130, the HP turbine 132, and the LP turbine 134. The LP compressor 126 includes a plurality of stages of LP compressor rotor blades 198 and a plurality of stages of LP compressor stator vanes 200 alternatingly spaced with the plurality of stages of LP compressor rotor blades 198. Similarly, the HP compressor 128 includes a plurality of stages of HP compressor rotor blades 202 and a plurality of stages of HP compressor stator vanes 204 alternatingly spaced with the plurality of stages of HP compressor rotor blades 202. Moreover, within the turbine section, the HP turbine 132 includes at least one stage of HP turbine rotor blades 206 and at least one stage of HP turbine stator vanes 208, and the LP turbine 134 includes a plurality of stages of LP turbine rotor blades 210 and a plurality of stages of LP turbine stator vanes 212 alternatingly spaced with the plurality of stages of LP turbine rotor blades 210. With reference to the HP turbine 132, the HP turbine 132 includes at least a first stage 214 of HP turbine rotor blades 206.

Figure 3:
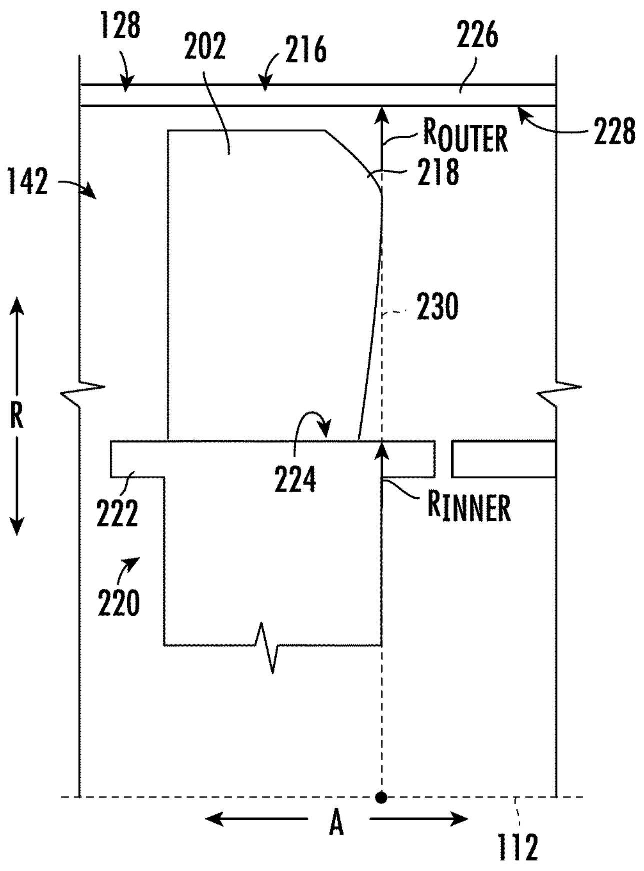
FIG. 3 is a close-up view of an aft-most stage of high pressure compressor rotor blades within the exemplary three-stream engine of FIG. 1.

Referring particularly to the HP compressor 128, the plurality of stages of HP compressor rotor blades 202 includes an aftmost stage 216 of HP compressor rotor blades 202. Referring briefly to FIG. 3, a close-up view of an HP compressor rotor blade 202 in the aftmost stage 216 of HP compressor rotor blades 202 is provided. As will be appreciated, the HP compressor rotor blade 202 includes a trailing edge 218 and the aftmost stage 216 of HP compressor rotor blades 202 includes a rotor 220 having a base 222 to which the HP compressor rotor blade 202 is coupled. The base 222 includes a flowpath surface 224 defining in part the working gas flow path 142 through the HP compressor 128. Moreover, the HP compressor 128 includes a shroud or liner 226 located outward of the HP compressor rotor blade 202 along the radial direction R. The shroud or liner 226 also includes a flowpath surface 228 defining in part the working gas flow path 142 through the HP compressor 128.

The engine 100 (FIG. 3) defines a reference plane 230 intersecting with an aft-most point of the trailing edge 218 of the HP compressor rotor blade 202 depicted, the reference plane 230 being orthogonal to the axial direction A. Further, the HP compressor 128 defines a high pressure compressor exit area ($A_{HPCExit}$) within the reference plane 230. More specifically, the HP compressor 128 defines an inner radius ($R_{INNER}$) extending along the radial direction R within the reference plane 230 from the longitudinal axis 112 to the flowpath surface 224 of the base 222 of the rotor 220 of the aftmost stage 216 of HP compressor rotor blades 202, as well as an outer radius ($R_{OUTER}$) extending along the radial direction R within the reference plane 230 from the longitudinal axis 112 to the flowpath surface 228 of the shroud or liner 226. The HP compressor 128 exit area is defined according to Expression (1):

$$A_{HPCExit} = \pi(R_{OUTER}^2 - R_{INNER}^2). \qquad \text{Expression (1)}$$

The inventors of the present disclosure have found that for a given total thrust output ($Fn_{Total}$), a decrease in size of the high pressure compressor exit area ($A_{HPCExit}$) may generally relate in an increase in a compressor exit temperature (i.e., a temperature of the airflow through the working gas flowpath 142 at the reference plane 230), a turbine inlet temperature (i.e., a temperature of the airflow through the working gas flowpath 142 provided to the first stage 214 of HP turbine rotor blades 206; see FIG. 2), and the redline exhaust gas temperature (EGT). In particular, the inventors of the present disclosure have found that the high pressure compressor exit area ($A_{HPCExit}$) may generally be used as an indicator of the above temperatures to be achieved by the engine 100 during operation for a given total thrust output ($Fn_{Total}$) of the engine 100.

Referring back to FIG. 2, the exemplary engine 100 depicted includes one or more technologies to accommodate the relatively small high pressure compressor exit area ($A_{HPCExit}$) for the total thrust output ($Fn_{Total}$) of the engine 100. In particular, for the embodiment depicted, the exemplary engine 100 includes a cooled cooling air system 250. The exemplary cooled cooling air system 250 is in fluid communication with the HP compressor 128 and the first stage 214 of HP turbine rotor blades 206. More specifically, for the embodiment depicted, the cooled cooling air system 250 includes a duct assembly 252 and a cooled cooling air (CCA) heat exchanger 254. The duct assembly 252 is in fluid communication with the HP compressor 128 for receiving an airflow from the HP compressor 128 and providing such airflow to the first stage 214 of HP turbine rotor blades 206 during operation of the engine 100. The CCA heat exchanger 254 is in thermal communication with the airflow through the duct assembly 252 for reducing a temperature of the airflow through the duct assembly 252 upstream of the first stage 214 of HP turbine rotor blades 206.

Briefly, as will be explained in more detail below, the engine 100 depicted further includes a thermal transport bus 300, with the CCA heat exchanger 254 of the cooled cooling air system 250 in thermal communication with, or integrated into, the thermal transport bus 300. For the embodiment depicted, the engine 100 further includes the heat exchanger 196 in the fan duct 172 in thermal communication with, or integrated into, the thermal transport bus 300, such that heat from the CCA heat exchanger 254 of the cooled cooling air system 250 may be transferred to the heat exchanger 196 in the fan duct 172 using the thermal transport bus 300.

Referring now to FIG. 4, a close-up, schematic view of the turbomachine 120 of the engine 100 of FIG. 2, including the cooled cooling air system 250, is provided.

As is shown, the turbine section includes a compressor casing 256, and the combustion section 130 of the turbomachine 120 generally includes an outer combustor casing 258, an inner combustor casing 260, and a combustor 262. The combustor 262 generally includes an outer combustion chamber liner 264 and an inner combustion chamber liner 266, together defining at least in part a combustion chamber 268. The combustor 262 further includes a fuel nozzle 270 configured to provide a mixture of fuel and air to the combustion chamber 268 to generate combustion gases.

The engine 100 further includes a fuel delivery system 272 including at least a fuel line 274 in fluid communication with the fuel nozzle 270 for providing fuel to the fuel nozzle 270.

The turbomachine 120 includes a diffuser nozzle 276 located downstream of the aftmost stage 216 of HP compressor rotor blades 202 of the HP compressor 128, within the working gas flowpath 142. In the embodiment depicted, the diffuser nozzle 276 is coupled to, or integrated with the inner combustor casing 260, the outer combustor casing 258, or both. The diffuser nozzle 276 is configured to receive compressed airflow from the HP compressor 128 and straighten such compressed air prior to such compressed air being provided to the combustion section 130. The combustion section 130 defines a diffusion cavity 278 downstream of the diffuser nozzle 276 and upstream of the combustion chamber 268.

As noted above, the exemplary engine 100 further includes the cooled cooling air system 250. The cooled cooling air system 250 includes the duct assembly 252 and the CCA heat exchanger 254. More specifically, the duct assembly 252 includes a first duct 280 in fluid communication with the HP compressor 128 and the CCA heat exchanger 254. The first duct 280 more specifically extends from the HP compressor 128, through the compressor casing 256, to the CCA heat exchanger 254. For the embodiment depicted, the first duct 280 is in fluid communication with the HP compressor 128 at a location in between the last two stages of HP compressor rotor blades 202. In such a manner, the first duct 280 is configured to receive a cooling airflow from the HP compressor 128 and to provide the cooling airflow to the CCA heat exchanger 254.

It will be appreciated, however, that in other embodiments, the first duct 280 may additionally or alternatively be in fluid communication with the HP compressor 128 at any other suitable location, such as at any other location closer to a downstream end of the HP compressor 128 than an upstream end of the HP compressor 128, or alternatively at a location closer to the upstream end of the HP compressor 128 than the downstream end of the HP compressor 128.

The duct assembly 252 further includes a second duct 282 extending from the CCA heat exchanger 254 to the outer combustor casing 258 and a third duct 284 extending from the outer combustor casing 258 inwardly generally along the radial direction R. The CCA heat exchanger 254 may be configured to receive the cooling airflow and to extract heat from the cooling airflow to reduce a temperature of the cooling airflow. The second duct 282 may be configured to receive cooling airflow from the CCA heat exchanger 254 and provide the cooling airflow to the third duct 284. The third duct 284 extends through the diffusion cavity generally along the radial direction R.

Moreover, for the embodiment depicted, the duct assembly 252 further includes a manifold 286 in fluid communication with the third duct 284 and a fourth duct 288. The manifold 286 extends generally along the circumferential direction C of the engine 100, and the fourth duct 288 is more specifically a plurality of fourth ducts 288 extending from the manifold 286 at various locations along the circumferential direction C forward generally along the axial direction A towards the turbine section. In such a manner, the duct assembly 252 of the cooled cooling air system 250 may be configured to provide cooling airflow to the turbine section at a variety of locations along the circumferential direction C.

Notably, referring still to FIG. 4, the combustion section 130 includes an inner stator assembly 290 located at a downstream end of the inner combustion chamber liner 266, and coupled to the inner combustor casing 260. The inner stator assembly 290 includes a nozzle 292. The fourth duct 288, or rather, the plurality of fourth ducts 288, are configured to provide the cooling airflow to the nozzle 292. The nozzle 292 may include a plurality of vanes spaced along the circumferential direction C configured to impart a circumferential swirl to the cooling airflow provided through the plurality of fourth ducts 288 to assist with such airflow being provided to the first stage 214 of HP turbine rotor blades 206.

In particular, for the embodiment depicted, the HP turbine 132 further includes a first stage HP turbine rotor 294, with the plurality of HP turbine rotor blades 206 of the first stage 214 coupled to the first stage HP turbine rotor 294. The first stage HP turbine rotor 294 defines an internal cavity 296 configured to receive the cooling airflow from the nozzle 292 and provide the cooling airflow to the plurality of HP turbine rotor blades 206 of the first stage 214. In such a manner, the cooled cooling air system 250 may provide cooling airflow to the HP turbine rotor blades 206 to reduce a temperature of the plurality HP turbine rotor blades 206 at the first stage 214 during operation of the engine 100.

For example, in certain exemplary aspects, the cooled cooling air system 250 may be configured to provide a temperature reduction of the cooling airflow equal to at least 15% of the EGT and up to 45% of the EGT. Further, in certain exemplary aspects, the cooled cooling air system 250 may be configured to receive between 2.5% and 35% of an airflow through the working gas flowpath 142 at an inlet to the HP compressor 128, such as between 3% and 20%, such as between 4% and 15%.

In addition, as briefly mentioned above, the cooled cooling air system 250 may utilize the thermal transport bus 300 to reject heat from the cooling air extracted from the compressor section of the turbomachine 120. In particular, for the embodiment shown the CCA heat exchanger 254 is in thermal communication with or integrated into the thermal transport bus 300. Notably, the thermal transport bus 300 further includes a fuel heat exchanger 302 in thermal communication with the fuel line 274. In such a manner, the thermal transport bus 300 may extract heat from the cooling air extracted from the compressor section through the cooled cooling air system 250 and provide such heat to a fuel flow through the fuel line 274 upstream of the fuel nozzle 270.

For the embodiment depicted, the thermal transport bus 300 includes a conduit having a flow of thermal transport fluid therethrough. More specifically, referring now briefly to FIG. 5, a schematic view of a thermal transport bus 300 as may be utilized with the exemplary engine 100 described above with reference to FIGS. 1 through 4 is provided.

The thermal transport bus 300 includes an intermediary heat exchange fluid flowing therethrough and is formed of one or more suitable fluid conduits 304. The heat exchange fluid may be an incompressible fluid having a high temperature operating range. Additionally, or alternatively, the heat exchange fluid may be a single phase fluid, or alternatively, may be a phase change fluid. In certain exemplary embodiments, the heat exchange fluid may be a supercritical fluid, such as a supercritical $CO_2$.

The exemplary thermal transport bus 300 includes a pump 306 in fluid communication with the heat exchange fluid in the thermal transport bus 300 for generating a flow of the heat exchange fluid in/through the thermal transport bus 300.

Moreover, the exemplary thermal transport bus 300 includes one or more heat source exchangers 308 in thermal communication with the heat exchange fluid in the thermal transport bus 300. Specifically, the thermal transport bus 300 depicted includes a plurality of heat source exchangers 308. The plurality of heat source exchangers 308 are configured to transfer heat from one or more of the accessory systems of an engine within which the thermal transport bus 300 is installed (e.g., engine 100 of FIGS. 1 through 4) to the heat exchange fluid in the thermal transport bus 300. For example, in certain exemplary embodiments, the plurality of heat source exchangers 308 may include one or more of: a CCA heat source exchanger (such as CCA heat exchanger 254 in FIGS. 2 and 4); a main lubrication system heat source exchanger for transferring heat from a main lubrication system; an advanced clearance control (ACC) system heat source exchanger for transferring heat from an ACC system; a generator lubrication system heat source exchanger for transferring heat from the generator lubrication system; an environmental control system (ECS) heat exchanger for transferring heat from an ECS; an electronics cooling system heat exchanger for transferring heat from the electronics cooling system; a vapor compression system heat source exchanger; an air cycle system heat source exchanger; and an auxiliary system(s) heat source exchanger.

For the embodiment depicted, there are three heat source exchangers 308. The heat source exchangers 308 are each arranged in series flow along the thermal transport bus 300. However, in other exemplary embodiments, any other suitable number of heat source exchangers 308 may be included and one or more of the heat source exchangers 308 may be arranged in parallel flow along the thermal transport bus 300 (in addition to, or in the alternative to the serial flow arrangement depicted). For example, in other embodiments there may be a single heat source exchanger 308 in thermal communication with the heat exchange fluid in the thermal transport bus 300, or alternatively, there may be at least two heat source exchangers 308, at least four heat source exchangers 308, at least five heat source exchangers 308, or at least six heat source exchangers 308, and up to twenty heat source exchangers 308 in thermal communication with heat exchange fluid in the thermal transport bus 300.

Figure 5:
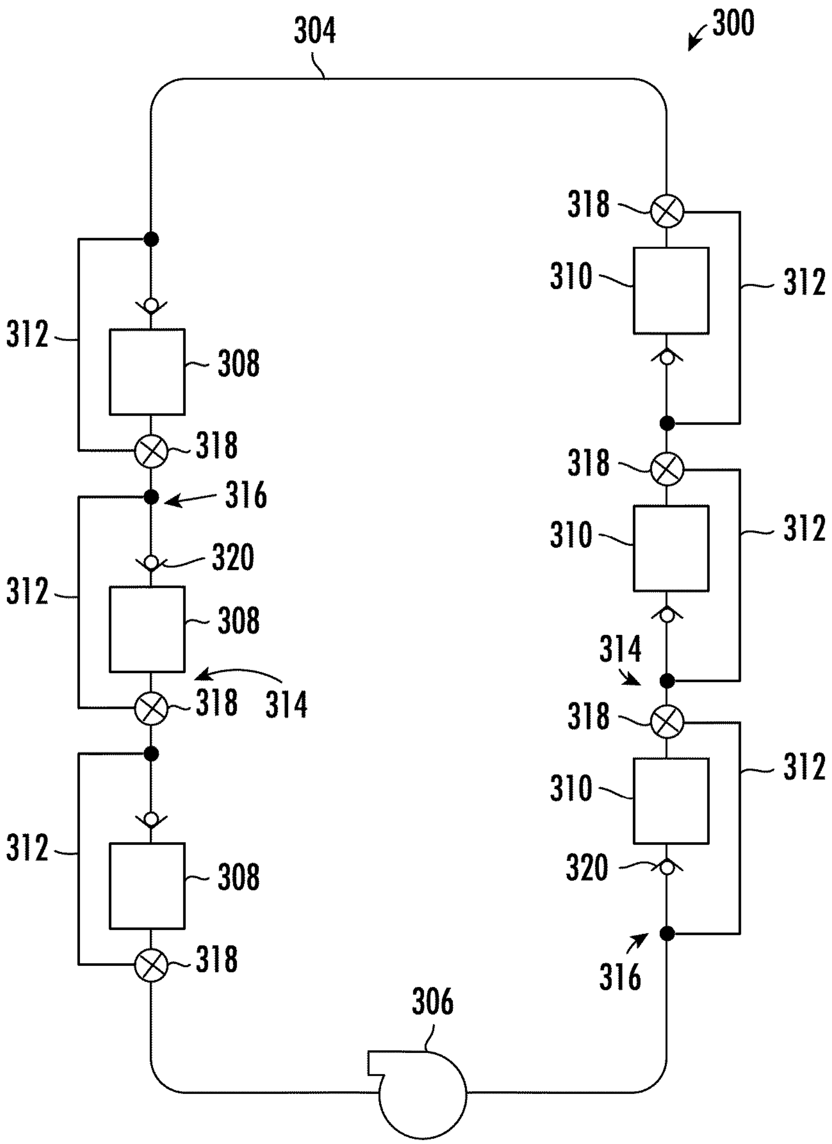
FIG. 5 is a schematic view of a thermal transport bus of the present disclosure.

Additionally, the exemplary thermal transport bus 300 of FIG. 5 further includes one or more heat sink exchangers 310 permanently or selectively in thermal communication with the heat exchange fluid in the thermal transport bus 300. The one or more heat sink exchangers 310 are located downstream of the plurality of heat source exchangers 308 and are configured for transferring heat from the heat exchange fluid in the thermal transport bus 300, e.g., to atmosphere, to fuel, to a fan stream, etc. For example, in certain embodiments the one or more heat sink exchangers 310 may include at least one of a RAM heat sink exchanger, a fuel heat sink exchanger, a fan stream heat sink exchanger, a bleed air heat sink exchanger, an engine intercooler heat sink exchanger, a bypass passage heat sink exchanger, or a cold air output heat sink exchanger of an air cycle system. The fuel heat sink exchanger is a "fluid to heat exchange fluid" heat exchanger wherein heat from the heat exchange fluid is transferred to a stream of liquid fuel (see, e.g., fuel heat exchanger 302 of the engine 100 of FIG. 4). Moreover, the fan stream heat sink exchanger is generally an "air to heat exchange fluid" heat exchanger which transfers heat from the heat exchange fluid to an airflow through the fan stream (see, e.g., heat exchanger 196 of FIGS. 1 and 2). Further, the bleed air heat sink exchanger is generally an "air to heat exchange fluid" heat exchanger which flows, e.g., bleed air from the LP compressor 126 over the heat exchange fluid to remove heat from the heat exchange fluid.

For the embodiment of FIG. 5, the one or more heat sink exchangers 310 of the thermal transport bus 300 depicted includes a plurality of individual heat sink exchangers 310. More particularly, for the embodiment of FIG. 5, the one or more heat sink exchangers 310 include three heat sink exchangers 310 arranged in series. The three heat sink exchangers 310 are configured as a bypass passage heat sink exchanger, a fuel heat sink exchanger, and a fan stream heat sink exchanger. However, in other exemplary embodiments, the one or more heat sink exchangers 310 may include any other suitable number and/or type of heat sink exchangers 310. For example, in other exemplary embodiments, a single heat sink exchanger 310 may be provided, at least two heat sink exchangers 310 may be provided, at least four heat sink exchangers 310 may be provided, at least five heat sink exchangers 310 may be provided, or up to twenty heat sink exchangers 310 may be provided. Additionally, in still other exemplary embodiments, two or more of the one or more heat sink exchangers 310 may alternatively be arranged in parallel flow with one another.

Referring still to the exemplary embodiment depicted in FIG. 5, one or more of the plurality of heat sink exchangers 310 and one or more of the plurality of heat source exchangers 308 are selectively in thermal communication with the heat exchange fluid in the thermal transport bus 300. More particularly, the thermal transport bus 300 depicted includes a plurality of bypass lines 312 for selectively bypassing each heat source exchanger 308 and each heat sink exchanger 310 in the plurality of heat sink exchangers 310. Each bypass line 312 extends between an upstream juncture 314 and a downstream juncture 316—the upstream juncture 314 located just upstream of a respective heat source exchanger 308 or heat sink exchanger 310, and the downstream juncture 316 located just downstream of the respective heat source exchanger 308 or heat sink exchanger 310.

Additionally, each bypass line 312 meets at the respective upstream juncture 314 with the thermal transport bus 300 via a three-way valve 318. The three-way valves 318 each include an inlet fluidly connected with the thermal transport bus 300, a first outlet fluidly connected with the thermal transport bus 300, and a second outlet fluidly connected with the bypass line 312. The three-way valves 318 may each be a variable throughput three-way valve, such that the three-way valves 318 may vary a throughput from the inlet to the first and/or second outlets. For example, the three-way valves 318 may be configured for providing anywhere between zero percent (0%) and one hundred percent (100%) of the heat exchange fluid from the inlet to the first outlet, and similarly, the three-way valves 318 may be configured for providing anywhere between zero percent (0%) and one hundred percent (100%) of the heat exchange fluid from the inlet to the second outlet.

Notably, the three-way valves 318 may be in operable communication with a controller of an engine including the thermal transport bus 300 (e.g., engine 100 of FIGS. 1 through 4).

Further, each bypass line 312 also meets at the respective downstream juncture 316 with the thermal transport bus 300. Between each heat source exchanger 308 or heat sink exchanger 310 and downstream juncture 316, the thermal transport bus 300 includes a check valve 320 for ensuring a proper flow direction of the heat exchange fluid. More particularly, the check valve 320 prevents a flow of heat exchange fluid from the downstream juncture 316 towards the respective heat source exchanger 308 or heat sink exchanger 310.

As alluded to earlier, the inventors discovered, unexpectedly during the course of gas turbine engine design—i.e., designing gas turbine engines having a variety of different high pressure compressor exit areas, total thrust outputs, redline exhaust gas temperatures, and supporting technology characteristics and evaluating an overall engine performance and other qualitative turbofan engine characteristics—a significant relationship between a total sea level static thrust output, a compressor exit area, and a redline exhaust gas temperature that enables increased engine core operating temperatures and overall engine propulsive efficiency. The relationship can be thought of as an indicator of the ability of a turbofan engine to have a reduced weight or volume as represented by a high pressure compressor exit area, while maintaining or even improving upon an overall thrust output, and without overly detrimentally affecting overall engine performance and other qualitative turbofan engine characteristics. The relationship applies to an engine that incorporates a cooled cooling air system, builds portions of the core using material capable of operating at higher temperatures, or a combination of the two. Significantly, the relationship ties the core size (as represented by the exit area of the higher pressure compressor) to the desired thrust and exhaust gas temperature associated with the desired propulsive efficiency and practical limitations of the engine design, as described below.

Referring to the case of an engine that utilizes cooled cooling air for operating at higher temperatures, the inventors discovered, unexpectedly, that the costs associated with achieving a higher compression, enabled by reducing gas temperatures used to cool core components to accommodate higher core gas temperatures, may indeed produce a net benefit, contrary to expectations in the art. Referring to the case of utilizing more temperature-resistant material, such as a Carbon Matrix Composite (CMC), it was found that certain aspects of the engine size, weight and operating characteristics can be positively affected while taking into account the complexities and/or drawbacks associated with such material. In either case, the relationship now described can apply to identify the interrelated operating conditions and core size—i.e., total sea level static thrust, redline exhaust gas temperature, and compressor exit area, respectively.

The inventors of the present disclosure discovered bounding the relationship between a product of total thrust output and redline exhaust gas temperature at a takeoff power level and the high pressure compressor exit area squared (corrected specific thrust) can result in a higher power density core. This bounded relationship, as described herein, takes into due account the amount of overall complexity and cost, and/or a low amount of reliability associated with implementing the technologies required to achieve the operating temperatures and exhaust gas temperature associated with the desired thrust levels. The amount of overall complexity and cost may be prohibitively high for gas turbine engines outside the bounds of the relationship as described herein, and/or the reliability may prohibitively low outside the bounds of the relationship as described herein. The relationship discovered, infra, can therefore identify an improved engine configuration suited for a particular mission requirement, one that takes into account efficiency, weight, cost, complexity, reliability, and other factors influencing the optimal choice for an engine configuration.

In addition to yielding an improved gas turbine engine, as explained in detail above, utilizing this relationship, the inventors found that the number of suitable or feasible gas turbine engine designs capable of meeting the above design requirements could be greatly diminished, thereby facilitating a more rapid down selection of designs to consider as a gas turbine engine is being developed. Such a benefit provides more insight to the requirements for a given gas turbine engine well before specific technologies, integration and system requirements are developed fully. Such a benefit avoids late-stage redesign.

The desired relationship providing for the improved gas turbine engine, discovered by the inventors, is expressed as:

$$CST = Fn_{Total} \times EGT/(A^2_{HPCExit} \times 1000), \quad \text{Expression (2)}$$

where CST is corrected specific thrust; $Fn_{Total}$ is a total sea level static thrust output of the gas turbine engine in pounds; EGT is redline exhaust gas temperature in degrees Celsius; and $A_{HPCExit}$ is a high pressure compressor exit area in square inches.

CST values of an engine defined by Expression (2) in accordance with various embodiments of the present disclosure are from 42 to 90, such as from 45 to 80, such as from 50 to 80. The units of the CST values may be pounds-degrees Celsius over square inches.

Figures 6, 7:
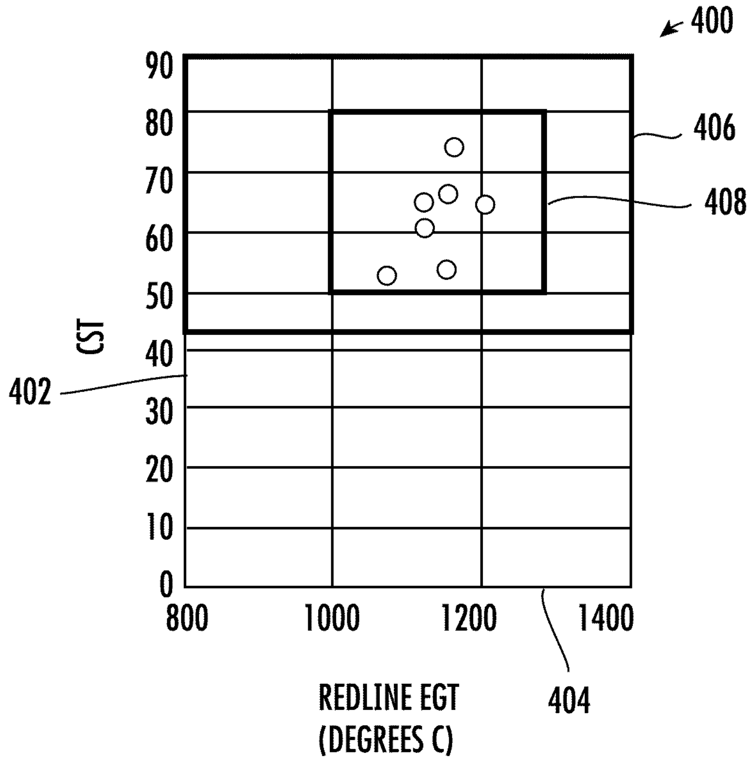
FIG. 6 is a table depicting numerical values showing the relationships between various parameters in accordance with various example embodiments of the present disclosure.
FIG. 7 is a graph depicting a range of corrected specific thrust values and redline exhaust gas temperature values of gas turbine engines in accordance with various example embodiments of the present disclosure.

Referring now to FIGS. 6 and 7, various exemplary gas turbine engines are illustrated in accordance with one or more exemplary embodiments of the present disclosure. In particular, FIG. 6 provides a table including numerical values corresponding to several of the plotted gas turbine engines in FIG. 7. FIG. 7 is a plot 400 of gas turbine engines in accordance with one or more exemplary embodiments of the present disclosure, showing the CST on a Y-axis 402 and the EGT on an X-axis 404.

As shown, the plot 400 in FIG. 7 depicts a first range 406, with the CST values between 42 and 90 and EGT values from 800 degrees Celsius to 1400 degrees Celsius. FIG. 7 additionally depicts a second range 408, with the CST values between 50 and 80 and EGT values from 1000 degrees Celsius to 1300 degrees Celsius. It will be appreciated that in other embodiments, the EGT value may be greater than 1100 degree Celsius and less than 1250 degrees Celsius, such as greater than 1150 degree Celsius and less than 1250 degrees Celsius, such as greater than 1000 degree Celsius and less than 1300 degrees Celsius.

It will be appreciated that although the discussion above is generally related to an open rotor engine having a particular cooled cooling air system 250 (FIG. 2), in various embodiments of the present disclosure, the relationship outlined above with respect to Expression (2) may be applied to any other suitable engine architecture, including any other suitable technology(ies) to allow the gas turbine engine to accommodate higher temperatures to allow for a reduction in the high pressure compressor exit area, while maintaining or even increasing the maximum turbofan engine thrust output without, e.g., prematurely wearing various components within the turbomachine exposed the working gas flowpath.

Figure 8:
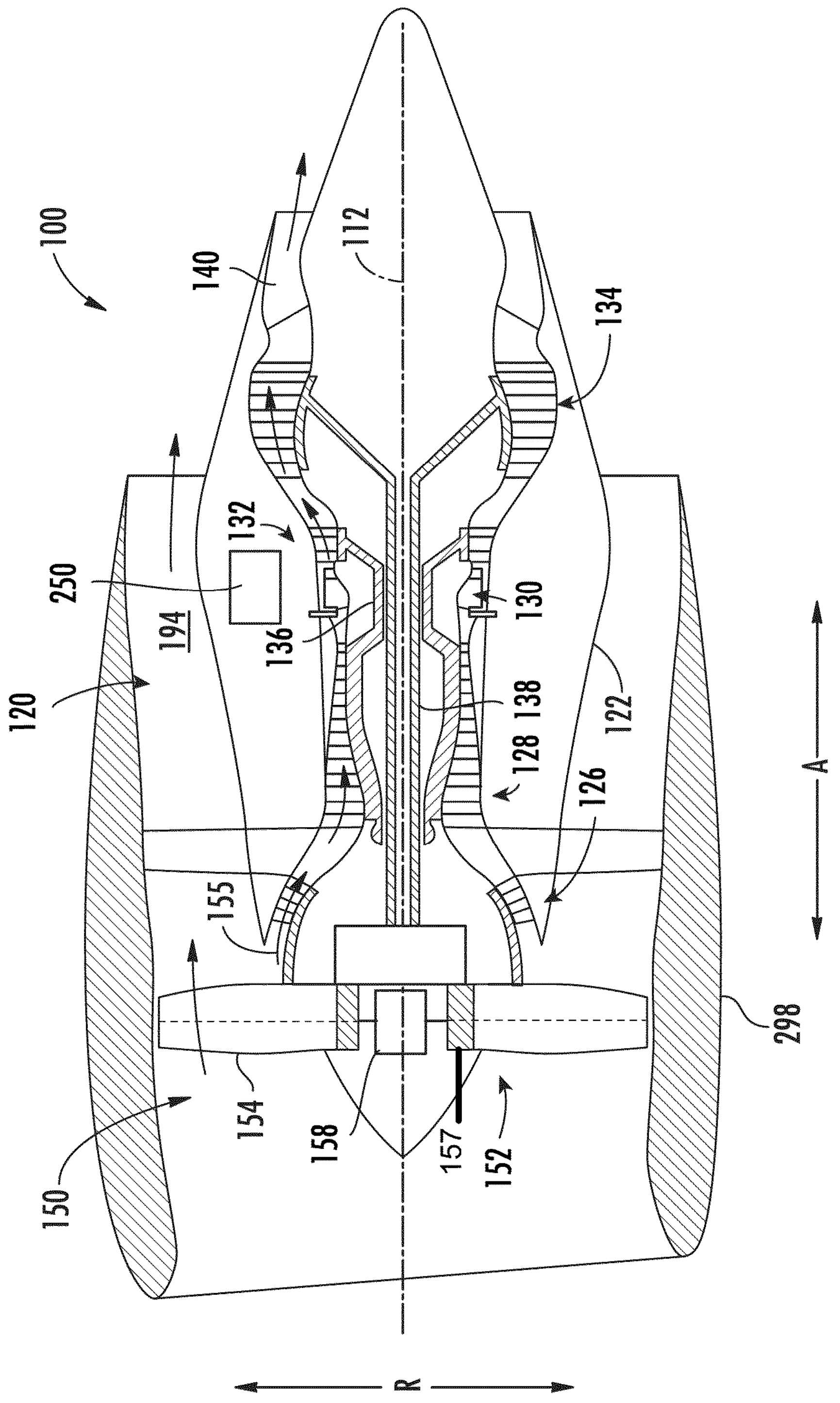
FIG. 8 is a schematic view of a ducted turbofan engine in accordance with an exemplary aspect of the present disclosure.

For example, reference will now be made to FIG. 8. FIG. 8 provides a schematic view of an engine 100 in accordance with another exemplary embodiment of the present disclosure. The exemplary embodiment of FIG. 8 may be configured in substantially the same manner as the exemplary engine 100 described above with respect to FIGS. 1 through 4, and the same or similar reference numerals may refer to the same or similar parts. However, as will be appreciated, for the embodiment shown, the engine 100 further includes an outer housing or nacelle 298 circumferentially surrounding at least in part a fan section 150 and a turbomachine 120. The nacelle 298 defines a bypass passage 194 between the nacelle 298 and the turbomachine 120.

Briefly, it will be appreciated that the exemplary engine 100 of FIG. 8 is configured as a two-stream engine, i.e., an engine without a third stream (e.g., fan stream 172 in the exemplary engine 100 of FIG. 2). With such a configuration, a total sea level static thrust output $Fn_{Total}$ of the engine 100 may generally be equal to a sum of: a fan stream thrust $Fn_{Fan}$ (i.e., an amount of thrust generated by a fan 152 through a bypass passage 194) and a turbomachine thrust $Fn_m$ (i.e., an amount of thrust generated by an airflow through a turbomachine exhaust nozzle 140), each during the static, sea level, standard day conditions.

Further, for the exemplary embodiment of FIG. 8, the engine 100 additionally includes a cooled cooling air system 250 configured to provide a turbine section with cooled cooling air during operation of the engine 100, to allow the engine 100 to accommodate higher temperatures to allow for a reduction in a high pressure compressor exit area, while maintaining or even increasing a maximum turbofan engine thrust output.

It will be appreciated that in other exemplary embodiments of the present disclosure, the cooled cooling air system 250 of the engine 100 may be configured in any other suitable manner. For example, the exemplary cooled cooling air system 250 described above with reference to FIGS. 2 and 3 is generally configured as a thermal bus cooled cooling air system. However, in other embodiments, the cooled cooling air system 250 may instead be a dedicated heat exchanger cooled cooling air system (i.e., a cooled cooling air system including a heat exchanger that transfers heat directly to a cooling medium). Additionally, in other embodiments, the cooled cooling air system 250 may be a bypass heat exchanger cooled cooling air system having a heat sink heat exchanger thermally coupled to an airflow through a bypass passage (see, e.g., FIG. 9, discussed below). Additionally, or alternatively, in other embodiments, the cooled cooling air system 250 may be one of an air-to-air cooled cooling air system (a cooled cooling air system having a heat sink heat exchanger configured to transfer heat to an airflow; see, e.g., FIG. 9, discussed below); an oil-to-air cooled cooling air system (a cooled cooling air system having a heat sink heat exchanger configured to transfer heat to an oil flow); or a fuel-to-air cooled cooling air system (a cooled cooling air system having a heat sink heat exchanger configured to transfer heat to a fuel flow, such as a Jet A fuel flow, a liquid hydrogen or hydrogen gas fuel flow, etc.; see, e.g., FIG. 4).

Figure 10:
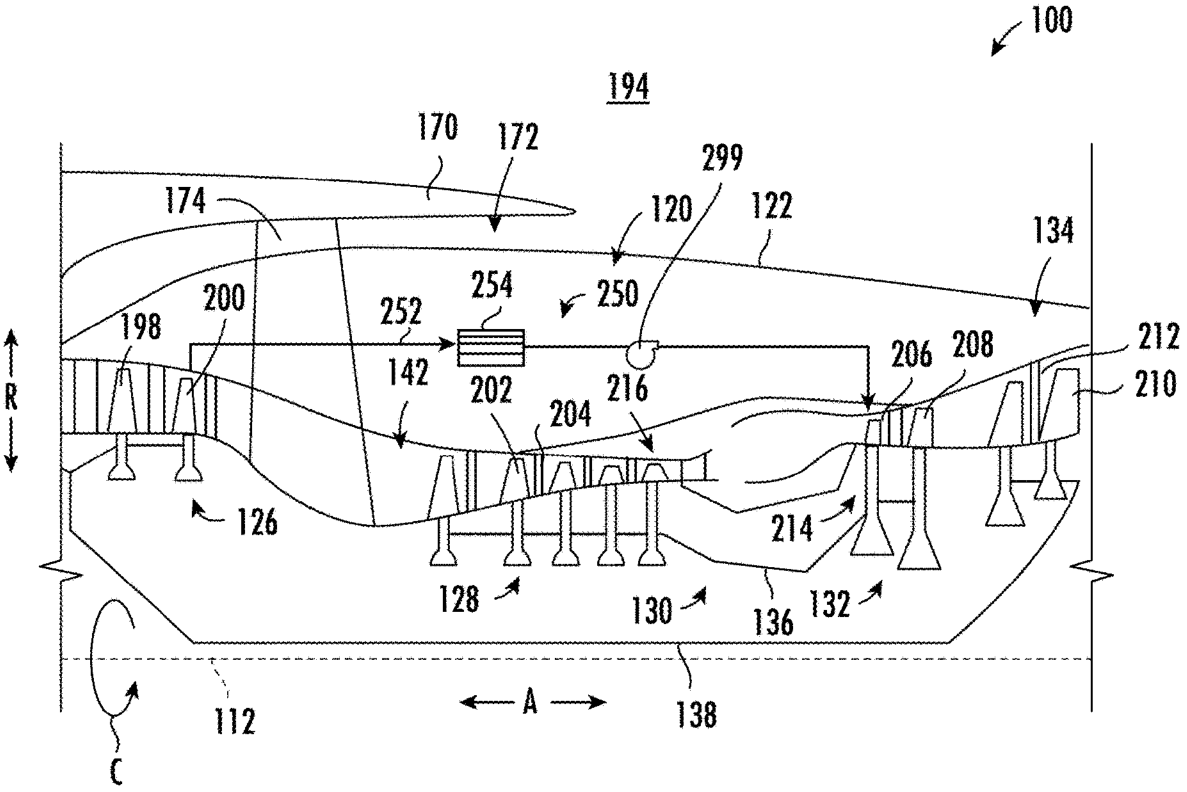
FIG. 10 is a schematic, close-up view of a gas turbine engine having a cooled cooling air system in accordance with yet another exemplary aspect of the present disclosure.
Figure 11:
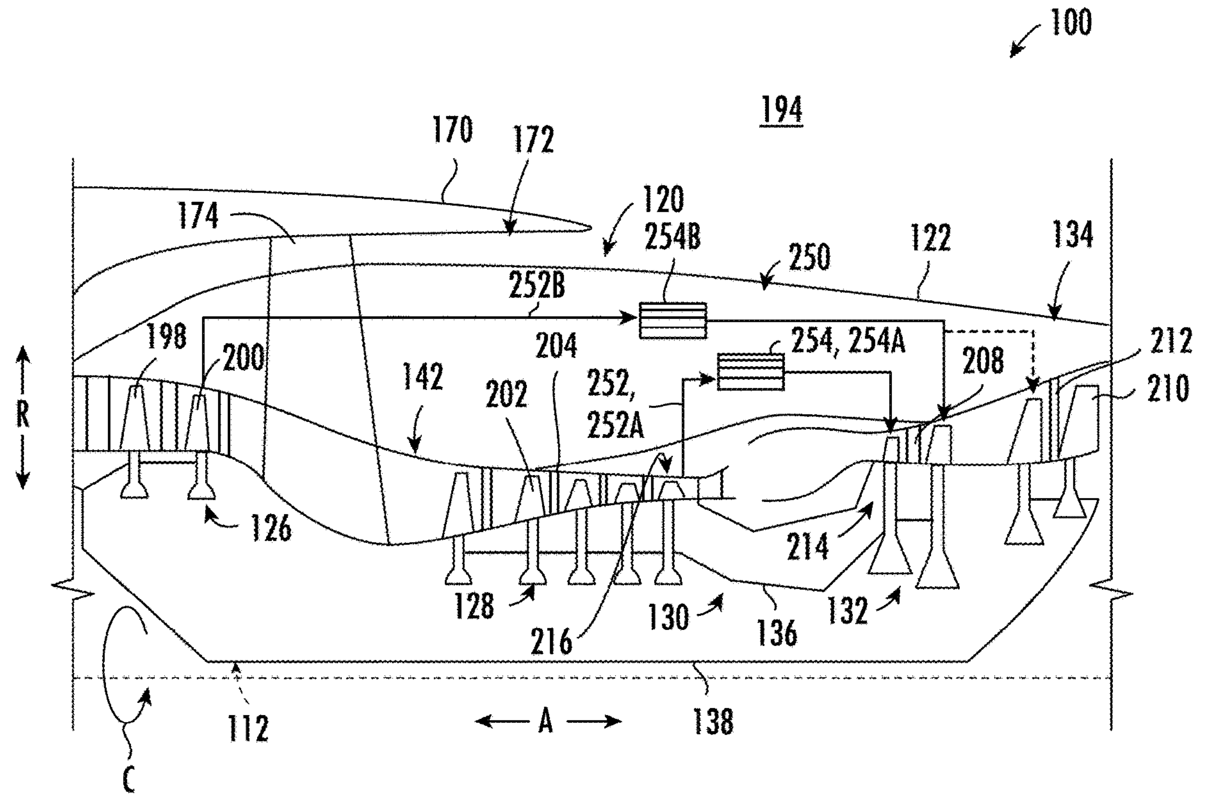
FIG. 11 is a schematic, close-up view of a gas turbine engine having a cooled cooling air system in accordance with still another exemplary aspect of the present disclosure.

More particularly, referring generally to FIGS. 9 through 11, in other exemplary embodiments, the cooled cooling air system 250 of the engine 100 may be configured in any other suitable manner. The exemplary engines 100 depicted in FIGS. 9 through 11 may be configured in a similar manner as exemplary engine 100 described above with reference to FIGS. 1 through 4, and the same or similar numbers may refer to the same or similar parts.

For example, each of the exemplary engines 100 depicted in FIGS. 9 through 11 generally includes a turbomachine 120 having an LP compressor 126, an HP compressor 128, a combustion section 130, an HP turbine 132, and an LP turbine 134 collectively defining at least in part a working gas flowpath 142 and arranged in serial flow order. The exemplary turbomachine 120 depicted additionally includes a core cowl 122, and the engine 100 includes a fan cowl 170. The engine 100 includes or defines a fan duct 172 positioned partially between the core cowl 122 and the fan cowl 170. Moreover, a bypass passage 194 is defined at least in part by the core cowl 122, the fan cowl 170, or both and extends over the turbomachine 120.

Moreover, the exemplary engines 100 depicted in FIGS. 9 to 11 additionally include a cooled cooling air system 250. The cooled cooling air system 250 generally includes a duct assembly 252 and a CCA heat exchanger 254.

However, referring particular to FIG. 9, it will be appreciated that for the exemplary embodiment depicted, the CCA heat exchanger 254 is positioned in thermal communication with the bypass passage 194, and more specifically, it is exposed to an airflow through or over the bypass passage 194. For the embodiment of FIG. 9, the CCA heat exchanger 254 is positioned on the core cowl 122. In such a manner, the CCA heat exchanger 254 may be an air-to-air CCA heat exchanger configured to exchange heat between an airflow extracted from the HP compressor 128 and the airflow through the bypass passage 194.

As is depicted in phantom, the cooled cooling air system 250 may additionally or alternatively be positioned at any other suitable location along the bypass passage 194, such as on the fan cowl 170. Further, although depicted in FIG. 9 as being positioned on the core cowl 122, in other embodiments, the CCA heat exchanger 254 may be embedded into the core cowl 122, and airflow through the bypass passage 194 may be redirected from the bypass passage 194 to the CCA heat exchanger 254.

As will be appreciated, a size of the CCA heat exchanger 254 may affect the amount of drag generated by the CCA heat exchanger 254 being positioned within or exposed to the bypass passage 194. Accordingly, sizing the cooled cooling air system 250 in accordance with the present disclosure may allow for a desired reduction in a HP compressor 128 exit area, while maintaining or even increasing a total thrust output for the engine 100, without creating an excess amount of drag on the engine 100 in the process.

Referring now particular to FIG. 10, it will be appreciated that for the exemplary embodiment depicted, the cooled cooling air system 250 is configured to receive the cooling airflow from an air source upstream of a downstream half of the HP compressor 128. In particular, for the exemplary embodiment of FIG. 10, the exemplary cooled cooling air system 250 is configured to receive the cooling airflow from a location upstream of the HP compressor 128, and more specifically, still, from the LP compressor 126. In order to allow for a relatively low pressure cooling airflow to be provided to a first stage 214 of HP turbine rotor blades 206 of the HP turbine 132, the cooled cooling air system 250 further includes a pump 299 in airflow communication with the duct assembly 252 to increase a pressure of the cooling airflow through the duct assembly 252. For the exemplary aspect depicted, the pump 299 is positioned downstream of the CCA heat exchanger 254. In such a manner, the pump 299 may be configured to increase the pressure of the cooling airflow through the duct assembly 252 after the cooling airflow has been reduced in temperature by the CCA heat exchanger 254. Such may allow for a reduction in wear on the pump 299.

Referring now particularly to FIG. 11, it will be appreciated that the cooled cooling air system 250 includes a high-pressure portion and a low-pressure portion operable in parallel. In particular, the duct assembly 252 includes a high-pressure duct assembly 252A and a low-pressure duct assembly 252B, and the CCA heat exchanger 254 includes a high-pressure CCA heat exchanger 254A and a low-pressure CCA heat exchanger 254B.

The high-pressure duct assembly 252A is in fluid communication with the HP compressor 128 at a downstream half of the high-pressure compressor and is further in fluid communication with a first stage 214 of HP turbine rotor blades 206. The high-pressure duct assembly 252A may be configured to receive a high-pressure cooling airflow from the HP compressor 128 through the high-pressure duct assembly 252A and provide such high-pressure cooling airflow to the first stage 214 of HP turbine rotor blades 206. The high-pressure CCA heat exchanger 254A may be configured to reduce a temperature of the high-pressure cooling airflow through the high-pressure duct assembly 252A at a location upstream of the first stage 214 of HP turbine rotor blades 206.

The low-pressure duct assembly 252B is in fluid communication with a location upstream of the downstream half of the high-pressure compressor 128 and is further in fluid communication with the HP turbine 132 and a location downstream of the first stage 214 of HP turbine rotor blades 206. In particular, for the embodiment depicted, the low-pressure duct assembly 252B is in fluid communication with the LP compressor 126 and a second stage (not labeled) of HP turbine rotor blades 206. The low-pressure duct assembly 252B may be configured to receive a low-pressure cooling airflow from the LP compressor 126 through the low-pressure duct assembly 252B and provide such low-pressure cooling airflow to the second stage of HP turbine rotor blades 206. The low-pressure CCA heat exchanger 254B may be configured to reduce a temperature of the low-pressure cooling airflow through the low-pressure duct assembly 252B upstream of the second stage of HP turbine rotor blades 206.

Inclusion of the exemplary cooled cooling air system 250 of FIG. 11 may reduce an amount of resources utilized by the cooled cooling air system 250 to provide a desired amount of cooling for the turbomachine 120.

Further, for the exemplary embodiment of FIG. 11, it will be appreciated that the cooled cooling air system 250 may further be configured to provide cooling to one or more stages of LP turbine rotor blades 210, and in particular to a first stage (i.e., upstream-most stage) of LP turbine rotor blades 210. Such may further allow for, e.g., the higher operating temperatures described herein.

Figure 12:
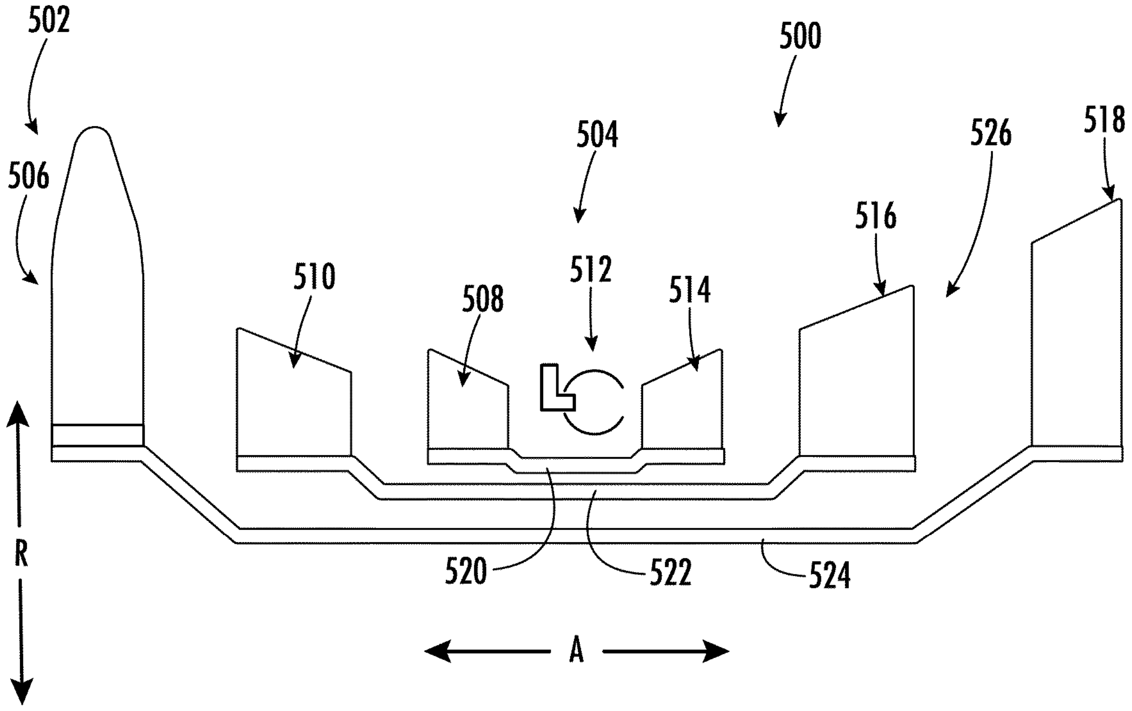
FIG. 12 is a schematic view of a turbofan engine in accordance with another exemplary aspect of the present disclosure.

Reference will now be made briefly to FIG. 12. FIG. 12 provides a schematic view of an engine 500 in accordance with another exemplary embodiment of the present disclosure. The exemplary embodiment of FIG. 12 may be configured in substantially the same manner as the exemplary engine 100 described above with respect to FIGS. 1 through 4, and the same or similar reference numerals may refer to the same or similar parts. However, as will be appreciated, for the embodiment shown, the engine 500 is configured as a three-spool engine, instead of a two-spool engine.

For example, the exemplary engine 500 includes a fan section 502 and a turbomachine 504. The fan section includes a fan 506. The turbomachine includes a first compressor 508, a second compressor 510, a combustion section 512, a first turbine 514, a second turbine 516, and a third turbine 518. The first compressor 508 may be a high pressure compressor, the second compressor 510 may be a medium pressure compressor (or intermediate pressure compressor), the first turbine 514 may be a high pressure turbine, the second turbine 516 may be a medium pressure turbine (or intermediate pressure turbine), and the third turbine 518 may be a low pressure turbine. Further, the engine 500 includes a first shaft 520 extending between, and rotatable with both of, the first compressor 508 and first turbine 514; a second shaft 522 extending between, and rotatable with both of, the second compressor 510 and second turbine 516; and a third shaft 524 extending between, and rotatable with both of, the third turbine 518 and fan 506. In such a manner, it will be appreciated that the engine 500 may be referred to as a three-spool engine.

For the embodiment of FIG. 12, the term redline EGT refers to a maximum temperature of an airflow after the first stator downstream of the last stage of rotor blades of the intermediate speed turbine, e.g., at location 526 in FIG. 12 (assuming the intermediate speed turbine 516 includes a stage of stator vanes downstream of the last stage of rotor blades).

It will further be appreciated that the exemplary cooled cooling air systems 250 described hereinabove are provided by way of example only. In other exemplary embodiments, aspects of one or more of the exemplary cooled cooling air systems 250 depicted may be combined to generate still other exemplary embodiments. For example, in still other exemplary embodiments, the exemplary cooled cooling air system 250 of FIGS. 2 through 4 may not be utilized with a thermal transport bus (e.g., thermal transport bus 300), and instead may directly utilize a CCA heat exchanger 254 positioned within the fan duct 172. Similarly, in other example embodiment, the exemplary cooled cooling air systems 250 of FIGS. 9 through 11 may be utilized with a thermal transport bus (e.g., thermal transport bus 300 of FIG. 2, 4 or 5) to reject heat for the CCA heat exchanger 254. Additionally, although the exemplary cooled cooling air systems 250 depicted schematically in FIGS. 9 through 11 depict the duct assembly 252 as positioned outward of the working gas flow path 142 along the radial direction R, in other exemplary embodiments, the duct assemblies 252 may extend at least partially inward of the working gas flow path 142 along the radial direction R (see, e.g., FIG. 4). In still other exemplary embodiments, the cooled cooling air system 250 may include duct assemblies 252 positioned outward of the working gas flow path 142 along the radial direction R and inward of the working gas flow path 142 along the radial direction R (e.g., in FIG. 11, the high-pressure duct assembly 252A may be positioned inwardly of the working gas flow path 142 along the radial direction R and the low-pressure duct assembly 252B may be positioned outwardly of the working gas flow path 142 along the radial direction R).

Moreover, it will be appreciated that in still other exemplary aspects, the gas turbine engine may include additional or alternative technologies to allow the gas turbine engine to accommodate higher temperatures while maintaining or even increasing the maximum turbofan engine thrust output, as may be indicated by a reduction in the high pressure compressor exit area, without, e.g., prematurely wearing on various components within the turbomachine exposed to the working gas flowpath.

For example, in additional or alternative embodiments, a gas turbine engine may incorporate advanced materials capable of withstanding the relatively high temperatures at downstream stages of a high pressure compressor exit (e.g., at a last stage of high pressure compressor rotor blades), and downstream of the high pressure compressor (e.g., a first stage of an HP turbine, downstream stages of the HP turbine, an LP turbine, an exhaust section, etc.).

In particular, in at least certain exemplary embodiments, a gas turbine engine of the present disclosure may include an airfoil (e.g., rotor blade or stator vane) in one or more of the HP compressor, the first stage of the HP turbine, downstream stages of the HP turbine, the LP turbine, the exhaust section, or a combination thereof formed of a ceramic-matrix-composite or "CMC." As used herein, the term CMC refers to a class of materials that include a reinforcing material (e.g., reinforcing fibers) surrounded by a ceramic matrix phase. Generally, the reinforcing fibers provide structural integrity to the ceramic matrix. Some examples of matrix materials of CMCs can include, but are not limited to, non-oxide silicon-based materials (e.g., silicon carbide, silicon nitride, or mixtures thereof), oxide ceramics (e.g., silicon oxycarbides, silicon oxynitrides, aluminum oxide (Al2O3), silicon dioxide (SiO2), aluminosilicates, or mixtures thereof), or mixtures thereof. Optionally, ceramic particles (e.g., oxides of Si, Al, Zr, Y, and combinations thereof) and inorganic fillers (e.g., pyrophyllite, wollastonite, mica, talc, kyanite, and montmorillonite) may also be included within the CMC matrix.

Some examples of reinforcing fibers of CMCs can include, but are not limited to, non-oxide silicon-based materials (e.g., silicon carbide, silicon nitride, or mixtures thereof), non-oxide carbon-based materials (e.g., carbon), oxide ceramics (e.g., silicon oxycarbides, silicon oxynitrides, aluminum oxide (Al2O3), silicon dioxide (SiO2), aluminosilicates such as mullite, or mixtures thereof), or mixtures thereof.

Generally, particular CMCs may be referred to as their combination of type of fiber/type of matrix. For example, C/SiC for carbon-fiber-reinforced silicon carbide; SiC/SiC for silicon carbide-fiber-reinforced silicon carbide, SiC/SiN for silicon carbide fiber-reinforced silicon nitride; SiC/SiC—SiN for silicon carbide fiber-reinforced silicon carbide/silicon nitride matrix mixture, etc. In other examples, the CMCs may include a matrix and reinforcing fibers comprising oxide-based materials such as aluminum oxide (Al2O3), silicon dioxide (SiO2), aluminosilicates, and mixtures thereof. Aluminosilicates can include crystalline materials such as mullite (3Al2O3 2SiO2), as well as glassy aluminosilicates.

In certain embodiments, the reinforcing fibers may be bundled and/or coated prior to inclusion within the matrix. For example, bundles of the fibers may be formed as a reinforced tape, such as a unidirectional reinforced tape. A plurality of the tapes may be laid up together to form a preform component. The bundles of fibers may be impregnated with a slurry composition prior to forming the preform or after formation of the preform. The preform may then undergo thermal processing, such as a cure or burn-out to yield a high char residue in the preform, and subsequent chemical processing, such as melt-infiltration with silicon, to arrive at a component formed of a CMC material having a desired chemical composition.

Such materials, along with certain monolithic ceramics (i.e., ceramic materials without a reinforcing material), are particularly suitable for higher temperature applications. Additionally, these ceramic materials are lightweight compared to superalloys, yet can still provide strength and durability to the component made therefrom. Therefore, such materials are currently being considered for many gas turbine components used in higher temperature sections of gas turbine engines, such as airfoils (e.g., turbines, and vanes), combustors, shrouds and other like components, that would benefit from the lighter-weight and higher temperature capability these materials can offer.

One or more of these components formed of a CMC material may include an environmental-barrier-coating or "EBC." The term EBC refers to a coating system including one or more layers of ceramic materials, each of which provides specific or multi-functional protections to the underlying CMC. EBCs generally include a plurality of layers, such as rare earth silicate coatings (e.g., rare earth disilicates such as slurry or APS-deposited yttrium ytterbium disilicate (YbYDS)), alkaline earth aluminosilicates (e.g., including barium-strontium-aluminum silicate (BSAS), such as having a range of BaO, SrO, $Al_2O_3$, and/or $SiO_2$ compositions), hermetic layers (e.g., a rare earth disilicate), and/or outer coatings (e.g., comprising a rare earth monosilicate, such as slurry or APS-deposited yttrium monosilicate (YMS)). One or more layers may be doped as desired, and the EBC may also be coated with an abradable coating.

In such a manner, it will be appreciated that the EBCs may generally be suitable for application to "components" found in the relatively high temperature environments noted above. Examples of such components can include, for example, combustor components, turbine blades, shrouds, nozzles, heat shields, and vanes.

Additionally, or alternatively still, in other exemplary embodiments, a gas turbine engine of the present disclosure may include an airfoil (e.g., rotor blade or stator vane) in one or more of an HP compressor, a first stage of an HP turbine, downstream stages of the HP turbine, an LP turbine, an exhaust section, or a combination thereof formed in part, in whole, or in some combination of materials including but not limited to titanium, nickel, and/or cobalt based superalloys (e.g., those available under the name Inconel® available from Special Metals Corporation). One or more of these materials are examples of materials suitable for use in an additive manufacturing processes.

Further, it will be appreciated that in at least certain exemplary embodiments of the present disclosure, a method of operating a gas turbine engine is provided. The method may be utilized with one or more of the exemplary gas turbine engines discussed herein, such as in FIGS. 1 through 4 and 8 through 11. The method includes operating the gas turbine engine at a takeoff power level, the gas turbine engine having a turbomachine with a high pressure compressor defining a high pressure compressor exit area ($A_{HPCExit}$) in square inches. The gas turbine engine further defines a redline exhaust gas temperature (EGT) in degrees Celsius, a total sea level static thrust output ($Fn_{Total}$) in pounds, and a corrected specific thrust. The corrected specific thrust is greater than or equal to 42 and less than or equal to 90, the corrected specific thrust determined as follows: $Fn_{Total} \times EGT/(A_{HPCExit}^2 \times 1000)$.

In certain exemplary aspects, operating the gas turbine engine at the takeoff power level further includes reducing a temperature of a cooling airflow provided to a high pressure turbine of the gas turbine engine with a cooled cooling air system. For example, in certain exemplary aspects, reducing the temperature of the cooling airflow provided to the high pressure turbine of the gas turbine engine with the cooled cooling air system comprises providing a temperature reduction of the cooling airflow equal to at least 15% of the EGT and up to 45% of the EGT.

As will be appreciated from the description herein, various embodiments of a gas turbine engine are provided. Certain of these embodiments may be an unducted, single rotor gas turbine engine (see FIG. 1), a turboprop engine, or a ducted turbofan engine (see FIG. 8). Another example of a ducted turbofan engine can be found in U.S. patent application Ser. No. 16/811,368 (Published as U.S. Patent Application Publication No. 2021/0108597), filed Mar. 6, 2020 (FIG. 10, Paragraph [0062], et al.; including an annular fan case 13 surrounding the airfoil blades 21 of rotating element 20 and surrounding vanes 31 of stationary element 30; and including a third stream/fan duct 73 (shown in FIG. 10, described extensively throughout the application)). Various additional aspects of one or more of these embodiments are discussed below. These exemplary aspects may be combined with one or more of the exemplary gas turbine engine(s) discussed above with respect to the FIGS.

For example, in some embodiments of the present disclosure, the engine may include a heat exchanger located in an annular duct, such as in a third stream. The heat exchanger may extend substantially continuously in a circumferential direction of the gas turbine engine (e.g., at least 300 degrees, such as at least 330 degrees).

In one or more of these embodiments, a threshold power or disk loading for a fan (e.g., an unducted single rotor or primary forward fan) may range from 25 horsepower per square foot ($hp/ft^2$) or greater at cruise altitude during a cruise operating mode. In particular embodiments of the engine, structures and methods provided herein generate power loading between 80 $hp/ft^2$ and 160 $hp/ft^2$ or higher at cruise altitude during a cruise operating mode, depending on whether the engine is an open rotor or ducted engine.

In various embodiments, an engine of the present disclosure is applied to a vehicle with a cruise altitude up to approximately 65,000 ft. In certain embodiments, cruise altitude is between approximately 28,000 ft and approximately 45,000 ft. In still certain embodiments, cruise altitude is expressed in flight levels based on a standard air pressure at sea level, in which a cruise flight condition is between FL280 and FL650. In another embodiment, cruise flight condition is between FL280 and FL450. In still certain embodiments, cruise altitude is defined based at least on a barometric pressure, in which cruise altitude is between approximately 4.85 psia and approximately 0.82 psia based on a sea level pressure of approximately 14.70 psia and sea level temperature at approximately 59 degrees Fahrenheit. In another embodiment, cruise altitude is between approximately 4.85 psia and approximately 2.14 psia. It should be appreciated that in certain embodiments, the ranges of cruise altitude defined by pressure may be adjusted based on a different reference sea level pressure and/or sea level temperature.

In various exemplary embodiments, the fan (or rotor) may include twelve (12) fan blades. From a loading standpoint, such a blade count may allow a span of each blade to be reduced such that the overall diameter of the primary fan may also be reduced (e.g., to twelve feet in one exemplary embodiment). That said, in other embodiments, the fan may have any suitable blade count and any suitable diameter. In certain suitable embodiments, the fan includes at least eight (8) blades. In another suitable embodiment, the fan may have at least twelve (12) blades. In yet another suitable embodiment, the fan may have at least fifteen (15) blades. In yet another suitable embodiment, the fan may have at least eighteen (18) blades. In one or more of these embodiments, the fan includes twenty-six (26) or fewer blades, such as twenty (20) or fewer blades. Alternatively, in certain suitable embodiments, the fan may only include at least four (4) blades, such as with a fan of a turboprop engine.

Further, in certain exemplary embodiments, the rotor assembly may define a rotor diameter (or fan diameter) of at least 10 feet, such as at least 11 feet, such as at least 12 feet, such as at least 13 feet, such as at least 15 feet, such as at least 17 feet, such as up to 28 feet, such as up to 26 feet, such as up to 24 feet, such as up to 18 feet.

In various embodiments, it will be appreciated that the engine includes a ratio of a quantity of vanes to a quantity of blades that could be less than, equal to, or greater than 1:1. For example, in particular embodiments, the engine includes twelve (12) fan blades and ten (10) vanes. In other embodiments, the vane assembly includes a greater quantity of vanes to fan blades. For example, in particular embodiments, the engine includes ten (10) fan blades and twenty-three (23) vanes. For example, in certain embodiments, the engine may include a ratio of a quantity of vanes to a quantity of blades between 1:2 and 5:2. The ratio may be tuned based on a variety of factors including a size of the vanes to ensure a desired amount of swirl is removed for an airflow from the primary fan.

Additionally, in certain exemplary embodiments, where the engine includes the third stream and a mid-fan (a ducted fan aft of the primary, forward fan), a ratio R1/R2 may be between 1 and 10, or 2 and 7, or at least 3.3, at least 3.5, at least 4 and less than or equal to 7, where R1 is the radius of the primary fan and R2 is the radius of the mid-fan.

It should be appreciated that various embodiments of the engine, such as the single unducted rotor engine depicted and described herein, may allow for normal subsonic aircraft cruise altitude operation at or above Mach 0.5. In certain embodiments, the engine allows for normal aircraft operation between Mach 0.55 and Mach 0.85 at cruise altitude. In still particular embodiments, the engine allows for normal aircraft operation between Mach 0.75 and Mach 0.85. In certain embodiments, the engine allows for rotor blade tip speeds at or less than 750 feet per second (fps). In other embodiments, the rotor blade tip speed at a cruise flight condition can be 650 to 900 fps, or 700 to 800 fps. Alternatively, in certain suitable embodiments, the engine allows for normal aircraft operation of at least Mach 0.3, such as with turboprop engines.

A fan pressure ratio (FPR) for the primary fan of the fan assembly can be 1.04 to 2.20, or in some embodiments 1.05 to 1.2, or in some embodiments less than 1.08, as measured across the fan blades of the primary fan at a cruise flight condition.

In order for the gas turbine engine to operate with a fan having the above characteristics to define the above FPR, a gear assembly may be provided to reduce a rotational speed of the fan assembly relative to a driving shaft (such as a low pressure shaft coupled to a low pressure turbine). In some embodiments, a gear ratio of the input rotational speed to the output rotational speed is between 3.0 and 4.0, between 3.2 and 3.5, or between 3.5 and 4.5. In some embodiments, a gear ratio of the input rotational speed to the output rotational speed is greater than 4.1. For example, in particular embodiments, the gear ratio is within a range of 4.1 to 14.0, within a range of 4.5 to 14.0, or within a range of 6.0 to 14.0. In certain embodiments, the gear ratio is within a range of 3.2 to 12 or within a range of 4.5 to 11.0.

With respect to a turbomachine of the gas turbine engine, the compressors and/or turbines can include various stage counts. As disclosed herein, the stage count includes the number of rotors or blade stages in a particular component (e.g., a compressor or turbine). For example, in some embodiments, a low pressure compressor may include 1 to 8 stages, a high-pressure compressor may include 4 to 15 stages, a high-pressure turbine may include 1 to 2 stages, and/or a low pressure turbine (LPT) may include 1 to 7 stages. In particular, the LPT may have 4 stages, or between 4 and 6 stages. For example, in certain embodiments, an engine may include a one stage low pressure compressor, an 11 stage high pressure compressor, a two stage high pressure turbine, and 4 stages, or between 4 and 7 stages for the LPT. As another example, an engine can include a three stage low-pressure compressor, a 10 stage high pressure compressor, a two stage high pressure turbine, and a 7 stage low pressure turbine.

A core engine is generally encased in an outer casing defining one half of a core diameter (Dcore), which may be thought of as the maximum extent from a centerline axis (datum for R). In certain embodiments, the engine includes a length (L) from a longitudinally (or axial) forward end to a longitudinally aft end. In various embodiments, the engine defines a ratio of L/Dcore that provides for reduced installed drag. In one embodiment, L/Dcore is at least 2. In another embodiment, L/Dcore is at least 2.5. In some embodiments, the L/Dcore is less than 5, less than 4, and less than 3. In various embodiments, it should be appreciated that the L/Dcore is for a single unducted rotor engine.

The reduced installed drag may further provide for improved efficiency, such as improved specific fuel consumption. Additionally, or alternatively, the reduced installed drag may provide for cruise altitude engine and aircraft operation at the above describe Mach numbers at cruise altitude. Still particular embodiments may provide such benefits with reduced interaction noise between the blade assembly and the vane assembly and/or decreased overall noise generated by the engine by virtue of structures located in an annular duct of the engine.

Additionally, it should be appreciated that ranges of power loading and/or rotor blade tip speed may correspond to certain structures, core sizes, thrust outputs, etc., or other structures of the core engine. However, as previously stated, to the extent one or more structures provided herein may be known in the art, it should be appreciated that the present disclosure may include combinations of structures not previously known to combine, at least for reasons based in part on conflicting benefits versus losses, desired modes of operation, or other forms of teaching away in the art.

Although depicted above as an unshrouded or open rotor engine, it should be appreciated that aspects of the disclosure provided herein may be applied to shrouded or ducted engines, partially ducted engines, aft-fan engines, or other gas turbine engine configurations, including those for marine, industrial, or aero-propulsion systems. Certain aspects of the disclosure may be applicable to turbofan, turboprop, or turboshaft engines. However, it should be appreciated that certain aspects of the disclosure may address issues that may be particular to unshrouded or open rotor engines, such as, but not limited to, issues related to gear ratios, fan diameter, fan speed, length (L) of the engine, maximum diameter of the core engine (Dcore) of the engine, L/Dcore of the engine, desired cruise altitude, and/or desired operating cruise speed, or combinations thereof.

In various exemplary aspects of the present disclosure, a three-stream gas turbine engine is provided that includes at least one component comprising a titanium alloy. Notably, the inventors of the present disclosure have found that certain architectural arrangements of the three-stream gas turbine engine with a component comprising a titanium alloy can provide advantages over conventional gas turbine engines.

Titanium alloys disclosed herein are particularly suitable for use in rotary machines, such as gas turbines as described above. For example, Ti-17 (Ti-5A1-4Mo-4Cr-2Sn-2Zr), Ti-6246 (Ti-6A1-2Sn-4Zr-6Mo), and Ti-64 (Ti-6A1-4V) can be utilized for rotary components within a gas turbine engine depending on the part's relative position within the engine. Components such as blisks or integrally bladed rotors can also be fabricated from one or more alloys using solid state welding joining processes, In the case of a bi-metallic blisk, the hub may be produced from one alloy such as beta processed Ti-6246 or beta processed Ti-17 having excellent thick section properties, while the airfoil may be produced from a second alloy such as alpha plus beta processed Ti-64 having excellent fatigue properties in relatively small section sizes and foreign object damage (FOD) properties. Thick section, as used herein, refers to sectional size of exemplary components made from titanium alloys, for example, larger than about one to two inches in section, or another example from about one inch to 3 inches, again another example up to six inches or more. The airfoil may be solid state welded to the hub utilizing processes such as translation friction welding or linear friction welding. Blisks may also be solid state welded using a hub and an airfoil of the same alloy such as alpha plus beta processed Ti-64, where the alpha plus beta processed Ti-64 hub properties are sufficient for the application. Components such as compressor rotor drums may also be fabricated from one or more alloys using solid state welding joining processes such as inertia welding. For an inertia welded rotor, it may be desirable to have a higher temperature alloy used in the later stages of the rotor.

For example, incorporating the component comprising a titanium alloy in the gas turbine engine can allow for the gas turbine engine to increase efficiency by, e.g., providing particular properties to the component or components within particular sections of the engine that may increase efficiency. For example, the properties of the component(s) comprising a titanium alloy may have reduced weight, tailored strength properties, tailored creep properties (particularly for rotatory components), tailored thermal properties (e.g., capable of use in hotter conditions), tailored stress properties, etc. The composition of the titanium alloy may also be tailored to the particular component. In one embodiment, for example, a component including the titanium alloy may have reduced weight compared to a component formed from another alloy.

Suitable titanium alloy compositions and microstructures for a given component are dependent on the particular temperatures, stresses, and other conditions to which the component is subjected.

In particular, the inventors of the present disclosure found that by incorporating the component(s) comprising a titanium alloy in the gas turbine engine, in combination with one or more of the embodiments described hereinabove can result in an engine being capable of operating within the desired parameters (e.g., temperature, pressure, rotational speeds, etc.).

Furthermore, disclosed hereinbelow are exemplary titanium alloys that may form a component or components within the engine. Thus, such a gas turbine engine can exhibit enhanced operability during certain mission requirements by designing the gas turbine engine to include the component(s) comprising a titanium alloy. However, other titanium alloys may be utilized for desired balance of properties for a particular component in the engine.

In embodiments, components may be formed of a titanium alloy. That is, the titanium alloy may be titanium-based (i.e., at least 50% by weight Ti). For example, the use of a titanium alloy to form components in a fan assembly, particularly at the hub, may address stress therein during use. That is, the composition of the titanium alloy, along with the processing methods utilized to form the component, particularly from the large billets utilized to form large parts (e.g., a hub) may benefit from resistance to formation of cracks under stress that can be provided from titanium alloy compositions.

In another example, a shaft (e.g., a LPT shaft 138) may be a Ti metal matrix composite that may help reduce frequency issues that may be seen in steel shafts. The metal matrix may include a titanium alloy, with continuous fibers embedded therein to provide a very high modulus to the material combined with low density. The continuous fibers may be any suitable material, such as SiC fibers, carbon fibers, or other fibers utilized in ceramic matrix composites, etc.

In embodiments, the titanium alloy may be Ti-6A1-4V (commonly referred to as "Ti64") which refers to a titanium alloy that includes 5.5 wt % to 6.75 wt % aluminum, 3.5 wt % to 4.5 wt % of vanadium, up to 3 wt % iron (e.g., greater than 0 to 3 wt % Fe), up to 2 wt % oxygen (e.g., greater than 0 to 2 wt % O), up to 0.08 wt % carbon (e.g., greater than 0 to 0.08 wt % C), up to 0.05 nitrogen (e.g., greater than 0 to 0.05 wt % N), up to 0.015 hydrogen (e.g., greater than 0 to 0.015 wt % H), up to 0.005 yttrium (e.g., greater than 0 to 0.005 wt % Y), up to 0.5 wt % of other residual elements, and a balance of titanium.

In embodiments, the titanium alloy may be a Ti-5A1-2Sn-2Zr-4Cr-4Mo alloy (commonly referred to as "Ti-17"), which refers to a titanium alloy that includes 4.5 wt % to 5.5 wt % aluminum, 1.5 wt % to 2.5 wt % of tin, 1.5 wt % to 2.5 wt % zirconium, 3.5 wt % to 4.5 wt % chromium, 3.5 wt % to 4.5 wt % molybdenum, up to 0.45 wt % iron (e.g., greater than 0 to 0.45 wt % Fe), up to 0.1 wt % oxygen (e.g., greater than 0 to 0.1 wt % O), up to 0.08 wt % carbon (e.g., greater than 0 to 0.08 wt % C), up to 0.04 nitrogen (e.g., greater than 0 to 0.04 wt % N), up to 0.0125 hydrogen (e.g., greater than 0 to 0.0125 wt % H), up to 0.5 wt % of other residual elements (e.g., boron, magnesium, sulfur, etc.), and a balance of titanium.

In embodiments, the titanium alloy may be a Ti-6A1-2Sn-4Zr-6Mo alloy (commonly referred to as "Ti 6246"), which refers to a titanium alloy that includes 5.5 wt % to 6.5 wt % aluminum, 1.75 wt % to 2.25 wt % of tin, 3.5 wt % to 4.5 wt % zirconium, 5.5 wt % to 6.5 wt % molybdenum, up to 0.15 wt % iron (e.g., greater than 0 to 0.15 wt % Fe), up to 0.15 wt % oxygen (e.g., greater than 0 to 0.15 wt % O), up to 0.04 wt % carbon (e.g., greater than 0 to 0.04 wt % C), up to 0.04 nitrogen (e.g., greater than 0 to 0.04 wt % N), up to 0.0125 hydrogen (e.g., greater than 0 to 0.0125 wt % H), up to 0.5 wt % of other residual elements, and a balance of titanium.

In embodiments, the titanium alloy may be a Ti-575 alloy, which refers to a titanium alloy that includes 5.0 wt % to 5.5 wt % aluminum, 7.5 wt % to 8.0 wt % of vanadium, 0.25 wt % to 1 wt % silicon, 0.1 wt % to 0.5 wt % iron, 0.1 wt % to 0.3 wt % oxygen, up to 0.08 wt % carbon (e.g., greater than 0 to 0.08 wt % C), up to 0.05 nitrogen (e.g., greater than 0 to 0.05 wt % N), up to 0.015 hydrogen (e.g., greater than 0 to 0.015 wt % H), up to 0.005 yttrium (e.g., greater than 0 to 0.005 wt % Y), up to 0.5 wt % of other residual elements, and a balance of titanium.

Ti-64 is an alpha/beta processed titanium alloy that is highly manufacturable, has relatively isotropic properties, has a relatively low density, is tolerant to foreign object damage (FOD), is relatively easy to repair, and is relatively low cost. However, Ti-64 has limited thick section strength and high-cycle fatigue (HCF) capability, especially at low A ratio (where A is the ratio of alternating stress divided by the mean stress), and deforms to a relatively high degree during FOD. In contrast, Ti-17 and Ti-6246 are beta processed, are not as easily manufacturable, have more anisotropic properties (especially ductility) as a result of beta processing, have higher density, are not as tolerant to FOD, are not as easily weldable or repairable, and have a higher cost. However, Ti-17 and Ti-6246 have good thick section strength, have good HCF capability, have a superior temperature capability than Ti-64, and deform relatively less than Ti-64 during FOD impact.

In embodiments, a component is provided that is formed from the titanium alloy modified from Ti-64 in order to preserve the desired properties of Ti-64 (e.g., relatively isotropic properties, a relatively low density, tolerance to FOD, repairability, and low cost) while improving the thick section strength, HCF capability, creep strength, and low deformation following FOD to approach those beneficial aspects of Ti-17 and Ti-6246. The cost of the modified Ti-64 alloy can be minimized by designing the composition such that a high percentage of widely available Ti-64 recycled materials can be used. Additionally, the billet and forge processing approach may be kept as close to Ti-64 as possible in order to minimize cost.

As stated, a component within a turbofan engine assembly, such as shown in FIG. 1, can be constructed from a titanium alloy. The titanium alloy includes, in one embodiment, about 5 wt % to about 8 wt % aluminum (e.g., about 6 wt % to about 7 wt % aluminum); about 2.5 wt % to about 5.5 wt % vanadium (e.g., about 3 wt % to about 5 wt % vanadium, such as about 3.5 wt % to about 4.5 wt % vanadium); about 0.1 wt % to about 2 wt % iron (e.g., about 0.1 wt % to about 1 wt % iron, such as about 0.1 wt % to about 0.6 wt % iron); about 0.01 wt % to about 0.2 wt % carbon (about 0.01 wt % to about 0.1 wt % carbon); at least one of silicon or copper, with the combined amount of silicon and copper being about 0.1 wt % to about 4 wt % (e.g., about 0.1 wt % to about 2 wt % silicon and/or about 0.5 wt % to about 4 wt % copper, such as about 0.5 wt % to about 2 wt % copper); optionally, up to about 0.3 wt % oxygen (e.g., up to about 0.2 wt % oxygen, such as about 0.1 wt % to about 0.2 wt %); optionally up to about 0.05 wt % nitrogen (e.g., up to about 0.01 wt % nitrogen, such as about 0.001 wt % to about 0.01 wt % nitrogen); optionally, up to about 2 wt % molybdenum (e.g., about 0.5 wt % to about 1.5 wt % molybdenum, such as about 0.5 wt % to about 1 wt %); optionally, up to about 2 wt % tin (e.g., about 0.5 wt % to about 2 wt % tin, such as about 0.5 wt % to about 1 wt % tin); optionally, up to about 2 wt % zirconium (e.g., about 0.5 wt % to about 2 wt % zirconium, such as about 0.5 wt % to about 1 wt % zirconium); optionally, up to about 2 wt % tungsten (e.g., about 0.1 wt % to about 2 wt % tungsten, such as about 0.1 wt % to about 1 wt % tungsten); and the balance titanium.

Stated differently, the titanium alloy includes, in one embodiment, titanium; about 5 wt % to about 8 wt % aluminum; about 2.5 wt % to about 5.5 wt % vanadium; about 0.1 wt % to about 2 wt % iron; about 0.01 wt % to about 0.2 wt % carbon; and at least one of silicon or copper, with the combined amount of silicon and copper being about 0.1 wt % to about 4 wt % (e.g., about 0.1 wt % to about 2 wt % silicon and/or about 0.5 wt % to about 2 wt % copper). The titanium alloy can also optionally include up to about 0.3 wt % oxygen (e.g., about 0.1 wt % to about 0.2 wt % oxygen), up to about 0.05 wt % nitrogen (e.g., about 0.001 wt % to about 0.05 wt % nitrogen); up to about 2 wt % molybdenum (e.g., about 0.5 wt % to about 1 wt % molybdenum); up to about 2 wt % tin (e.g., about 0.5 wt % to about 2 wt % tin); up to about 2 wt % zirconium (e.g., about 0.5 wt % to about 2 wt % zirconium), up to about 2 wt % tungsten (e.g, about 0.1 wt % to about 2 wt % tungsten), or combinations thereof.

For example, the compositional ranges set forth above can be summarized as shown in Table 1 below:

TABLE 1

| Exemplary Compositional Ranges | | | |
|---|---|---|---|
| Component | Range (wt %) | Range (wt %) | Range (wt %) |
| Al | 5-8 | 6-7 | 6-7 |
| V | 2.5-5.5 | 3-5 | 3.5-4.5 |
| Fe | 0.1-2 | 0.1-1 | 0.1-0.6 |
| C | 0.01-0.2 | 0.01-0.1 | 0.01-0.1 |
| without any Cu, Si | 0.1-2 | 0.5-2 | 0.5-1 |
| with Cu, Si | 0-2 | 0-1 | 0-1 |
| without any Si, Cu | 0.5-4 | 0.5-2 | 0.5-1 |
| with Si, Cu | 0-4 | 0-2 | 0-1 |
| O | 0-0.3 | 0-0.2 | 0.1-0.2 |
| N | 0-0.05 | 0-0.01 | 0.001-0.01 |
| Mo | 0-2 | 0.5-1.5 | 0.5-1 |
| Sn | 0-2 | 0.5-2 | 0.5-1 |
| Zr | 0-2 | 0.5-2 | 0.5-1 |
| W | 0-2 | 0.1-2 | 0.1-1 |
| Ti | Balance | Balance | Balance |

FIG. 2 shows an example of a component that may be constructed from a titanium alloy, depicting an isometric view of a single stage blisk 650, alternatively known as an integrally bladed rotor. The blisk 650 has a hub 652 that circumscribes the central rotational axis 12, reference also the axis 12 of turbofan engine assembly 10 of FIG. 1. Extending substantially radially from hub 652 are airfoils 760. In the high-pressure compressor 20 of FIG. 1, to optimize the blisk for performance parameters such as, for example, fatigue life, FOD tolerance, and creep strength, a bi-metallic blisk, where the hub 652 and airfoils 760 are different alloys, may be preferred. The airfoil 760 may be solid state welded to the hub 652 utilizing processes such as translation friction welding or linear friction welding. Therefore, it may be desirable to select a material that provides excellent thick section properties for the hub 652, and excellent fatigue properties in relatively small section sizes and FOD properties for the airfoil 760.

In the exemplary embodiment shown in FIG. 2, hub 652 is made from an exemplary alloy described herein, with the airfoil 760 being made from a commercially available, or conventional, materials with desirable fatigue life performance, such as, for example Ti-64. After welding, the interface between hub 652 and airfoil 760 can be referred to as the weld or heat affected zone 870. In this zone 870, a mix of hub and airfoil alloys are present, along with a wide range of microstructures. This mix of alloys and range of microstructures may compromise the thick section fatigue, FOD, etc. of the portion of the blisk 650.

In another exemplary embodiment, hub 652 and airfoil 760 are both made from the same exemplary alloy described herein, or made from separate exemplary alloys described herein. In the case of the hub 652 and airfoil 760 being the same alloy, in zone 870, no mix of hub and airfoil alloys are present, but a wide range of microstructures exists. This range of microstructures may again compromise the thick section fatigue, FOD, etc. of the portion of the blisk 650.

To optimize the mass of rotating components (via eliminating bolted joints), and to take advantage of higher temperature materials, in a high pressure compressor 20, shown in FIG. 1, adjacent stages of blisks may be inertia welded. Similar to the bi-metallic hub/airfoil, it may be desirable to have a front blisk stage made from a first material and an aft stage blisk made from a second material. As shown in FIG. 3, the front blisk stage 80 may be made from an exemplary alloy described herein and the aft blisk stage 1090 may be made from conventional material, such as, for example Ti-17. Again the weld zone or heat affected zone 870 is present and a mix of front blisk and aft blisk alloys are present, along with a wide range of microstructures in zone 870, representing an area of reduced material properties.

In other exemplary embodiments, adjacent front blisk stage 80 and aft blisk stage 1090 are both made from the same exemplary alloy described herein, or may be made from separate exemplary alloys described herein.

Furthermore, for the embodiments described by FIG. 2 and FIG. 3, any exemplary alloy described herein may be used alone or in combination with commercially available alloys for one or more of the airfoil 760, hub 652, blisk 650, front stage blisk 80 or back stage blisk 1090. Although FIG. 3 describes two stages, more than two stages of blisks may be contemplated.

While materials may be selected for these properties alone, consideration should be made for recovering material property loss due to the weld-induced thermal environment seen in a translation friction welding or linear friction welding via post treatment, such as, for example, furnace heat treatment. As will be discussed below, certain alloys pair well with commercially available titanium alloys, allowing manufacturers to take full advantage of this bi-metallic material property benefit by, for example, better matching heat treatment temperatures and processing between the hub 652 material and airfoil 760 material and between the materials of adjacent blisk stages 80 and 1090. These benefits can also be realized when the alloys are welded with itself, not only with commercially available titanium alloys.

Turning now to alloy manufacturing, in the ingot manufacturing process of these titanium alloys, the elements can be altered from Ti-64 to impact the microstructure and beta transus approach curves to refine the microstructure ($\alpha$p and lamellar morphology). For example, C, O, and N interstitials act as a stabilizers and can be present for solid solution strengthening. On the other hand, Cu, Mo, Fe, Si, and W act as $\beta$ stabilizers, and may serve to increase hardenability. However, too much of Mo, Fe, and/or W can increase the density to levels too high, and/or may have the potential to form deleterious phases during rapid cooling following solid state welding. For example, following solid-state welding of Ti-64 to itself (e.g., via inertia welding of one disk to another to form a spool, or translation friction welding of a blade to a disk to form a blisk), the weld zone may contain hexagonal martensitic alpha prime (hexagonal phase) that is relatively easy to decompose to alpha phase and precipitate out beta phase on subsequent stress-relief/aging treatment. It is useful to note that for Ti-64, the alpha prime martensite start and finish temperatures are above room temperature. In contrast to Ti-64, alloys with increased beta stabilizer content can have martensite start and finish temperatures which can be lowered toward and below room temperature. For example, Ti-6246 will have lower martensite start and finish temperatures than Ti-64, showing a tendency to retain higher amounts of beta (martensite finish is below room temperature) and may form a percentage of orthorhombic martensite (indicating martensite start is above room temperature). Further, the lower Al content and combination of Mo and Cr in Ti-17 produce a more heavily beta stabilized composition which may have both martensite start and martensite finish suppressed to below room temperature, so may show fully retained beta following rapid quenching from high temperatures, e.g. as may occur in a solid state weld. In the case of retained beta, it may be difficult to form alpha and beta phases of desired sizes and distribution following a conventional stress relief/age heat treatment. This occurs because retained beta may also contain fine metastable athermal omega (termed to refer to following rapid quenching) or metastable omega (termed to distinguish a modest maturation beyond athermal omega) that transforms readily at lower temperatures, e.g. well below those applied during conventional stress relief and age heat treatment temperatures. This transformation of omega phase can occur during reheating of a component on the rise to the final stress relief and age heat treatment temperature. Associated with the transformation of metastable omega is a parallel presentation of increasing amounts of equilibrium alpha precipitates, the number density of which is increased by the presence and maturation of omega. This early, lower temperature conditioning toward an increased number of alpha precipitates persists to the final stress relief and age heat treatment temperature, resulting in a very fine alpha+beta microstructure that is very strong, but also has less ductility and toughness. Higher temperature stress relief/age heat treatment temperatures can be used to coarsen the fine alpha+beta weld microstructure, but these may then affect the balance of properties that can be maintained in the base metal away from the weld, i.e. unacceptably lowering strength and fatigue capability away from the weld to gain toughness in the weld. In the case of orthorhombic martensite that may form in a Ti-6246 weld, it is again more difficult to decompose this phase to an acceptable size and distribution of equilibrium alpha and beta following a conventional stress relief/age heat treatment than it is when applying a similar stress relief/age heat treatment to hexagonal martensite in Ti-64. Thus, these facts teach that development of base alloy compositions must account for expected transient, non-equilibrium microstructures that will form following application of intended manufacturing methods, e.g. the martensitic and retained beta+omega microstructures mentioned above, that naturally form following solid state welding. Accordingly, lloy compositions are presented herein—where additional beta stabilizers (Fe, Cu, Si, and/or Mo) are added to levels that still result in formation of predominantly hexagonal, alpha prime martensite (thus solid state welds can be toughened with standard stress relief/age heat treatment without impacting base metal properties), while providing additional hardenability (refined microstructure) over Ti-64 to have better thick section properties than Ti-64. Further, if sufficient levels of beta stabilizing elements are added to the base composition, such that orthorhombic martensite and/or omega phases are produced in a solid state weld, the base alloy composition is designed such that it can be stress relieved and/or aged at a high temperature, for example at about 1300° F. or higher, enabling sufficiently high toughness in the weld to be achieved, whilst not adversely affecting the base alloy strength and fatigue. Stated differently, the compositions that are especially useful in thick section components, and do not rely predominantly on rapid cooling and aging to achieve higher strength via fine alpha precipitation such as Ti-6246 and Ti-17. Rather, they rely on alternative strengthening mechanisms that remain effective, even at slower cooling rates from solution heat treatment temperature that may be experienced in a large section size component.

In the case of a translation friction welded bi-metallic blisk, use of an exemplary alloy as the hub in place of beta processed Ti-17 or beta processed Ti-6246, and Ti-64 as the airfoil may result in a better matching of flow stresses and microstructures between the inventive alloy hub and the Ti-64 alloy airfoil. This may result in a solid state weld having a lower tendency to form defects during or following the welding process.

I. Processing with Silicon Present in the Alloy

As stated, the titanium alloy includes, in one embodiment, about 0.1 wt % to about 2 wt % silicon (e.g., about 0.5 wt % to about 2 wt %, such as about 0.5 wt % to about 1 wt %). The inclusion of Si in the titanium alloy leads to increased strength and potentially increased HCF strength due to solid solution strengthening and/or strengthening via the presence of particles containing Si. Additionally, Si can lead to a refined microstructure in the titanium alloy, which can result in increased strength and potentially increased HCF strength. During processing, depending upon the level of Si in the alloy, Si in solution can precipitate as a titanium silicide compound. The titanium silicide compound can be any compound containing both titanium and silicon (e.g., Ti5Si3, Ti3Si, etc.), with or without other elements (e.g., Sn and/or Zr) within the compound.

When Si is included as a component in the titanium alloy, the alloy composition can be designed with sufficient silicon such that the silicide solvus temperature of the titanium silicide compound is sufficiently above the beta transus temperature of the alloy. For example, the silicide solvus temperature of a titanium silicide compound can be at least about 50° F. greater than the beta transus temperature of the alloy (e.g., about 75° F. to about 400° F. greater than the beta transus temperature of the alloy).

The difference in the silicide solvus temperature and the beta transus temperature of the alloy can allow processing of the ingot/billet in the beta plus silicide phase field. However, if there is significant variation in silicon within the ingot as a result of segregation during solidification, during subsequent billet processing intended to be in the beta plus silicide phase field, it is possible that in local regions that are depleted in silicon relative to the overall composition, this local region may actually be above the local silicide solvus. These areas with different silicon content can be reduced via a homogenization treatment (as discussed below) to produce a volume fraction and size of the silicide particles that are sufficiently small and spaced apart to lead to a finer beta grain structure after subsequent processing. On the other hand, if the silicide particle volume fraction and/or size are not appropriate, even though the billet is recrystallized in the beta plus silicide phase field, a uniform, very refined beta structure may not be achievable. Regions enriched in silicon content due to segregation may also result locally in material being above the beta transus during treatments intended to be below the beta transus. If this occurs, it is believed (without wishing to be bound by any particular theory) that in these silicon-enriched regions, silicide particles will form with these particles pinning the beta grains. Thus, even though these silicon-enriched regions may be above the local beta tranus, a refined microstructure may be retained during alpha beta processing, such as billet forging, component forging and/or solution heat treatment.

The retardation of grain growth by the presence of second phase particles was originally investigated theoretically by Zener. This problem has not been resolved completely, with specific alloy system solutions being quite complex, having to take into consideration many factors describing the interaction of particles with the moving grain boundaries.

Still, a generic description comes down to a form of $P_Z=C_3$ $(\gamma_s f/d)$ where $P_z$=Zener drag pressure, $C_3$=geometrical constant that can vary substantially, up to 5×, $\gamma_s$=grain boundary interfacial energy, f=volume fraction of second phase particles, d=mean diameter of particles, indicating finer particles at higher volume fractions provide increased drag effects. Reference to drag influences from second phase particles in the 1-10% volume fraction and 1-10 micron mean diameter are common. There is significant disagreement within the art as to how the grain boundary interacts with and wraps around the second phase particle, which moves the value of $C_3$ around.

Figure 15:
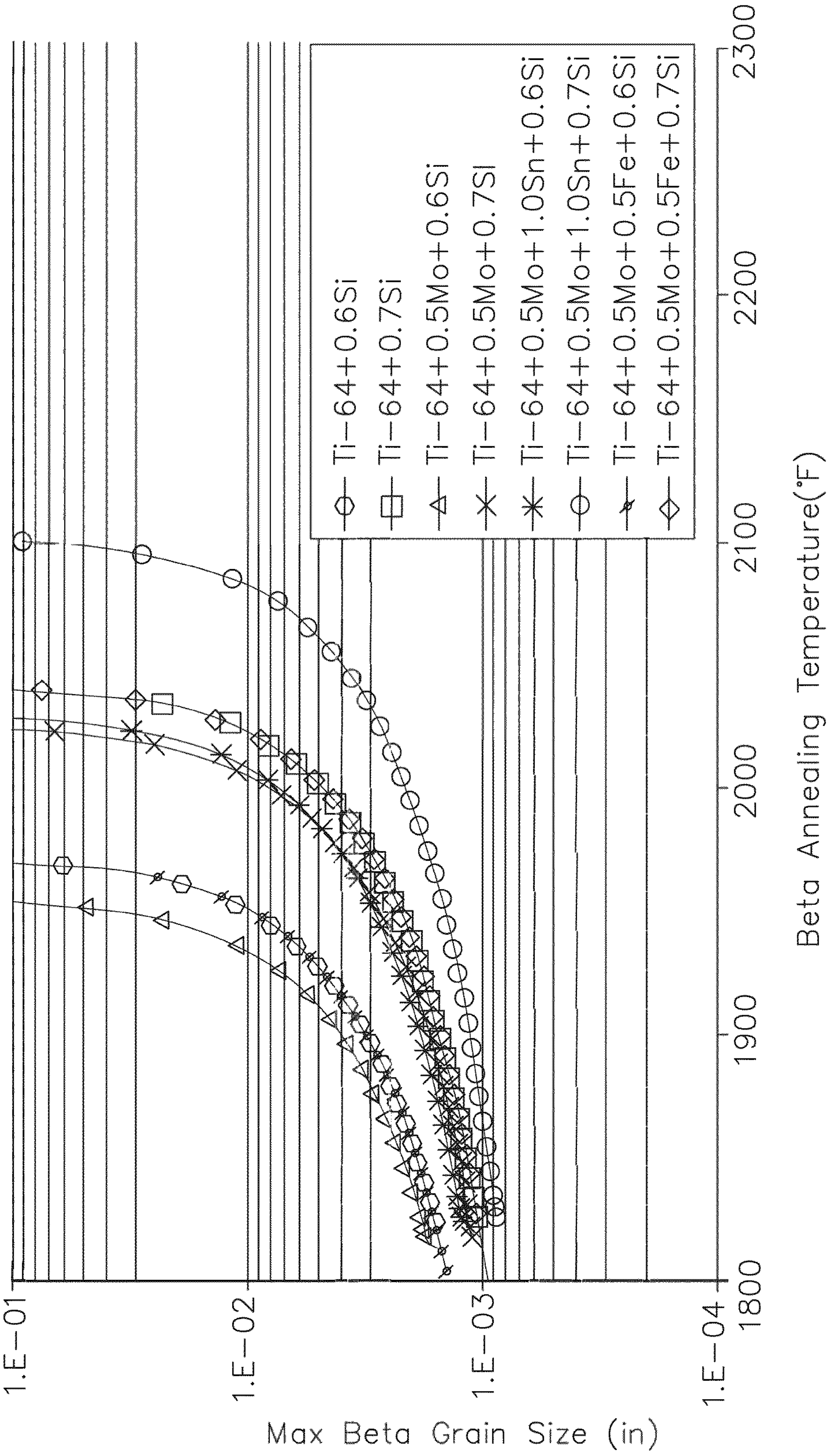
FIG. 15 shows a chart of the maximum beta grain size for certain alloy compositions with respect to the beta annealing temperature.
Figure 16:
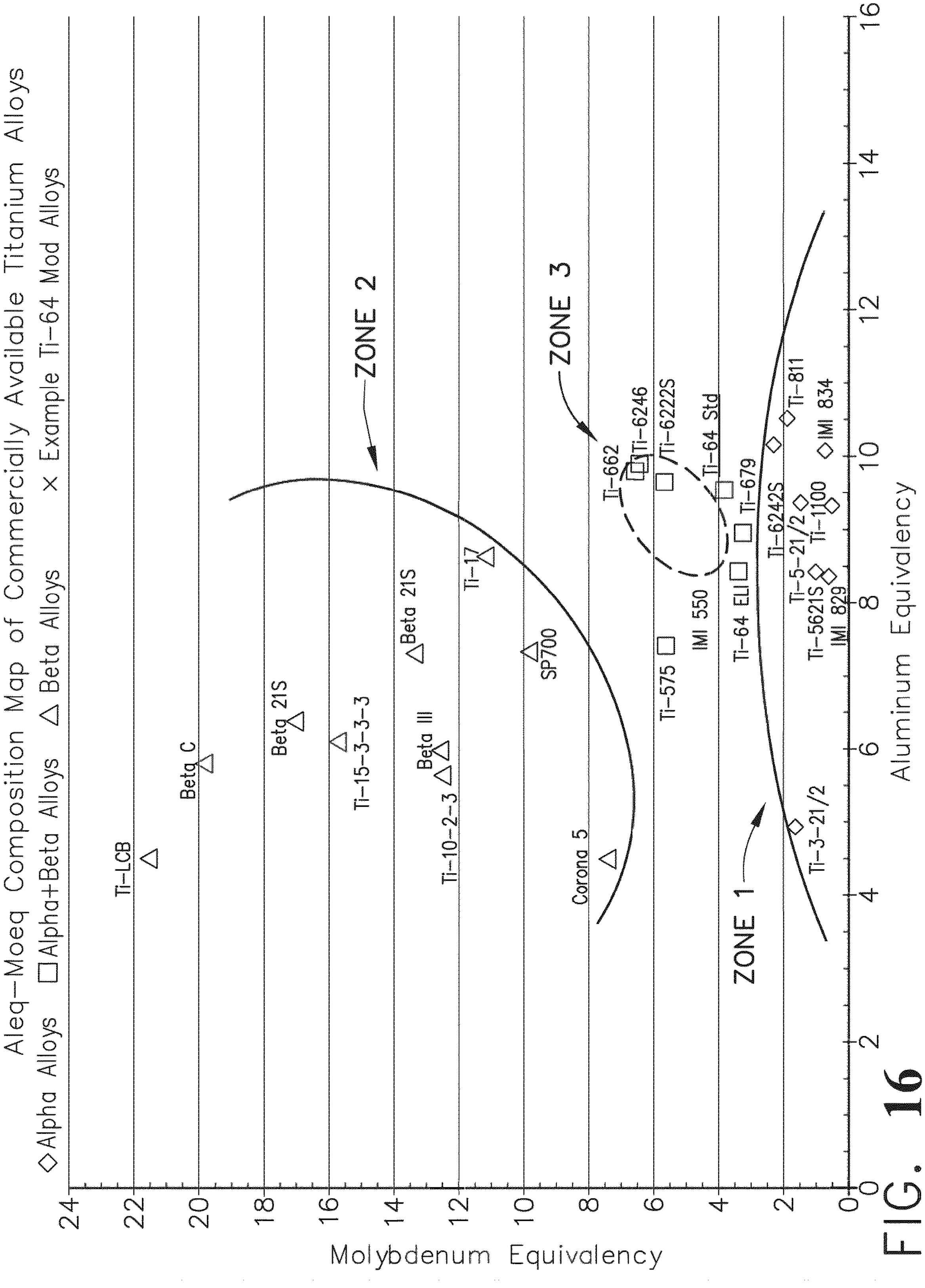
FIG. 16 shows a plot of a wide range of commercial alloys based on their calculated aluminum equivalence and molybdenum equivalence.
Figure 17:
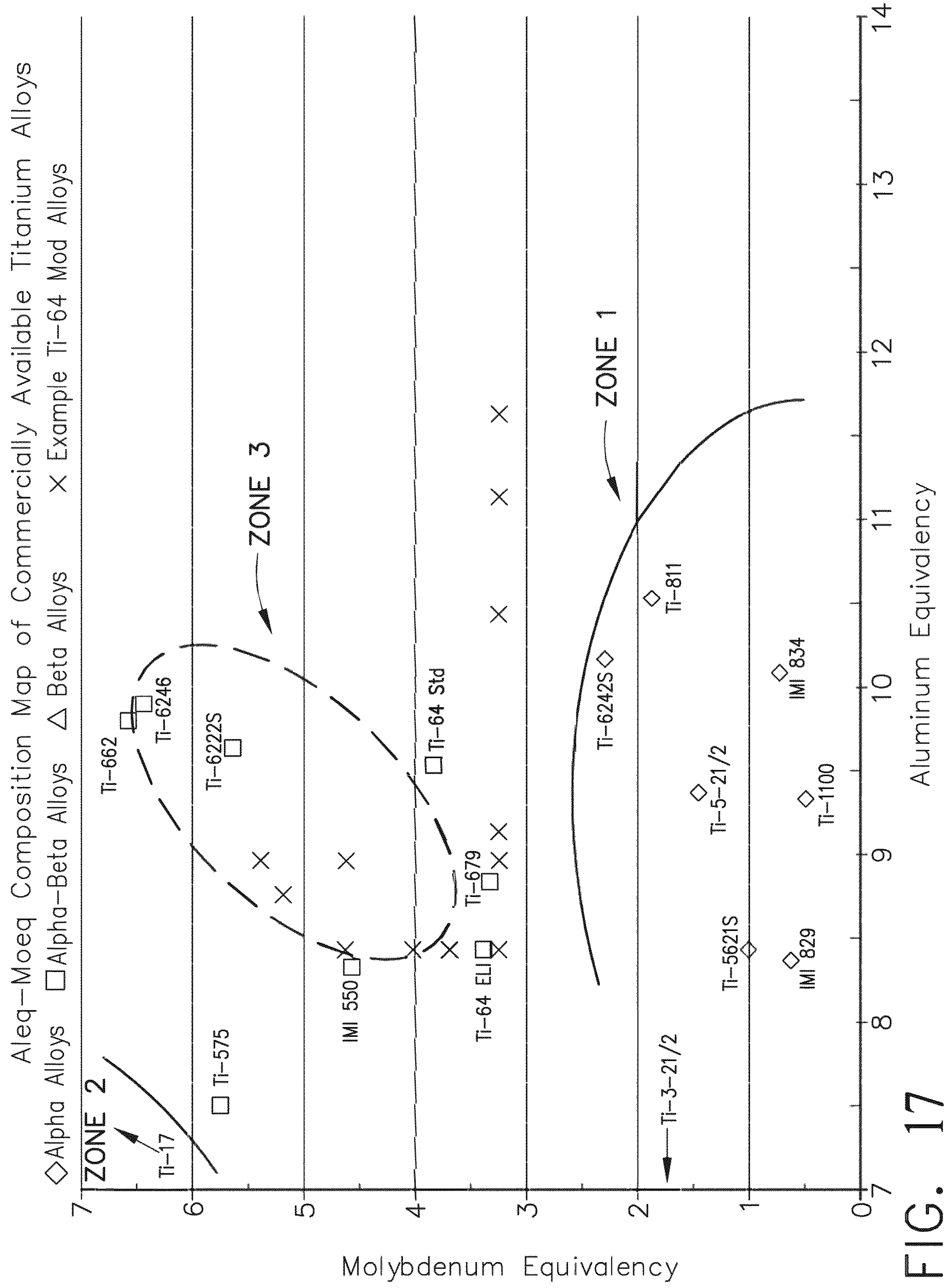
FIG. 17, expanded from FIG. 16, shows a portion of aluminum equivalence and molybdenum equivalence of selected commercial alloys and includes example alloys of the present invention.

Referring to FIG. 15, a maximum predicted recrystallized beta grain size as a function of annealing temperature in a two phase material may be represented by the equation: $D_{max}=r_p/f$ with $r_p$=particle radius and f=initial volume fraction. Calculations for several alloys with assumed particle sizes and volume fractions suggest a recrystallized beta grain sizes on the order of about 1 to about 100 mils may be expected.

Thus, the alloy composition is, in one particular embodiment, formed with the silicide solvus sufficiently higher than the beta transus such that the processing scheme described below is practical. For example, in certain embodiments, the titanium alloys disclosed herein can have a beta transus temperature of about 1700° F. to about 1950° F. and a silicide solvus temperature of about 1775° F. to about 2200° F.

During processing of the alloy, Si tends to segregate during solidification. As such, a homogenization treatment can optionally be performed prior to any subsequent processing steps in order to smooth out the local peak/trough in the Si composition in the ingot. That is, a more uniform distribution of Si in the alloy with smaller sizes can be formed to create the potential for finer beta grain recrystallization when recrystallized in the beta plus silicide phase field. For example, a homogenization treatment can be performed at a treatment temperature that is above both the beta transus temperature of the alloy and the silicide solvus temperature of the titanium silicide compounds. The diffusivity of Si in Ti-64 appears to be faster than that determined from the binary Ti—Si system, resulting in a potentially lower homogenization temperature and/or shorter homogenization time, reference Iijima, Y., Lee, S. Y., Hirano, K.

(1993) Phil. Mag. A 68: pp. 901-14, the disclosure of which is also incorporated by reference herein. Alternatively, the homogenization treatment may be performed after a portion of the hot working billet operations. A further potential advantage of a homogenization treatment is as follows: if during solidification, the local silicon concentration is above a certain level, and/or the cooling rate is below a certain rate, silicon-rich particles may precipitate. Above a certain size range in the final heat treated condition, these particles may reduce mechanical properties such as fatigue, ductility, impact resistance and weldability. Use of a homogenization treatment and optionally a controlled cooling above a certain rate will result in either complete dissolution of these particles, or precipitation of a finer particle during cooling, resulting in improvements in properties such as fatigue, ductility, impact resistance and weldability. During subsequent processing steps, additional silicon-rich particles may be expected to form, however, the size of these particles will likely be smaller than those produced during initial solidification and cooling.

Whether or not any homogenization treatment is performed, the alloy is subjected to high temperature beta processing at beta processing temperatures that are above both the beta transus temperature of the alloy and the silicide solvus temperature of the titanium silicide particles. For example, the high temperature beta processing can be carried out from just above to several hundred degrees above the silicide solvus temperature (e.g., about 10° F. above to about 400° F. above). This high temperature beta processing can help assure that the alloy is substantially all in the beta phase.

Following the high temperature beta processing, the alloy billet can then be subjected to lower temperature alpha/beta work at temperatures below both the beta transus temperature of the alloy and the silicide solvus temperature. This alpha/beta work is at least partially retained, and leads to recrystallization in the following or subsequent step.

Following the alpha/beta work, the alloy billet can then be subjected to beta processing (e.g., an annealing operation or a beta forging operation, see Lütjering, G., Williams, J. C. (2003) Titanium. Springer-Verlag, Berlin, and Semiatin S. L., et. Al, (1997) JOM 49(6), 33-39, the disclosures of which are also incorporated by reference herein at a beta processing temperature that is above the beta transus temperature of the alloy but below the silicide solvus temperature of the titanium silicide compounds. Thus, this beta processing can recrystallize the beta grains to a finer size. As discussed above, the volume fraction and particle size of the titanium silicide compounds can impact the beta grain size recrystallized here. Upon completion of this beta processing step, the alloy billet can be subjected to a post-beta processing cooling process using a variety of cooling techniques known to those skilled in the art, such as, but not limited to, fan air, oil, gas, and water quenching, to produce a post-forged cooled article. In one embodiment, the alloy billet is cooled as fast as possible to minimize the size of the microstructure formed at room temperature. During quenching, the beta phase begins to transform to alpha phase below the beta transus temperature. However, fast quenching leads to thinner alpha platelets formed, which later transforms into smaller alpha particles in subsequent alpha/beta work and, in turn, controls HCF in the resulting article.

A subsequent alpha/beta work step is then typically performed, which is designed to convert the alpha platelets into primary (or equiaxed) alpha particles with as small of a size as possible, at temperatures below both the beta transus temperature of the alloy and the silicide solvus temperature. This alpha/beta work, in combination with the beta processing steps above, leads to much smaller prior beta grain sizes, which in turn results in significantly finer alpha colony size (with each colony being an organization of plates having a similar crystal orientation). Following the second alpha/beta processing step, the primary alpha grain size can be smaller because it started out with thinner platelets (compared to that in alpha/beta processed Ti-64), which leads to improved strength and HCF properties. It should also be noted that the much finer colony sizes result in improved ultrasonic inspectability at the billet and component stage.

The processed billet can then be alpha/beta forged at forging temperatures below both the beta transus temperature of the alloy and the silicide solvus temperature. It should be noted that the cooling rate used for the post-forged cooling process can be dependent on several factors.

The post-forged cooled article can then be solution heat treated to a temperature below the beta transus and the silicide solvus temperature (e.g., a temperature from about 50° F. to about 250° F. below the beta transus) but at a temperature above the alpha/beta component forged processing temperature, and held for a certain time to ensure that the entire part is at the heat treatment temperature (e.g., up to about 4 hours) to produce a solution heat-treated article containing particles of primary alpha in a matrix of beta phase.

This solution heat-treated article can then be subjected to a controlled post-solution cooling process to produce a post-solution cooled article. The cooling rate following post solution heat treatment is generally desired to be as quick as possible. For example, the controlled post solution-cooling rate in articles having a cross-section size on the order of 6 inches or more may be faster than about 100° F./minute, calculated from an approximately linear cooling rate (e.g., from about 25-50° F. below the solution temperature to the beginning of the secondary alpha precipitation). For example, by water quenching, the cooling occurs as quickly as possible. However, in the thicker sections of the article, there are inevitably slower cooling rates, particularly within the thickness of the article. Thus, in one embodiment, the alloy structure is designed (e.g., via pre-machining) such that the slower cooling rates (associated with these thicker parts) are minimized and/or controlled such that improvements in strength/HCF with good ductility are realized.

Methods suitable for use in the solution heating process will be known to those skilled in the art. Examples of solution heat-treating methods can include heat-treating in air, vacuum, or inert (i.e. argon) atmospheres. The controlled post-solution cooling process can have the most significant impact on achieving the strength (particularly HCF) and desired ductility and may again involve a variety of cooling techniques known to those skilled in the art, such as fan air, oil, gas, polymer, salt and water quenching.

Alternatively, solution heat treatment can be conducted above the beta transus, but below the silicide solvus. This processing method results in a fine-grained, beta-annealed structure (e.g., good for airframe components) in that the resultant structure has similar fatigue crack growth properties to a Ti-64 beta annealed structure, but because the beta grain size is smaller, and the presence of Si and/or Cu, and Fe and/or Mo, thick section strength and HCF will be better. The billet and forge processing can be streamlined, for example, including initial beta hot work followed by alpha-beta hot work to form the forging from the billet prior to solution heat treatment of the forging above the beta transus but below the silicide solvus.

Optionally, prior to solution heat treatment, the forging can be pre-machined in order to increase the cooling rate to further increase strength and HCF properties. Additionally or alternatively, the configuration of the post forged cooled article, which may involve rough machining after the final forge operation, and the specific cooling method, may be selected to achieve the desired controlled post-solution cooling rate range. In portions of the article where ductility may be of less concern, controlled post-solution cooling rates above the desired range are acceptable. Similarly, controlled post-solution cooling rates that fall below the desired range are acceptable in portions of the article where lower strength or HCF is allowable.

After the controlled post-solution cooling, the post-solution cooled article may be subjected to an aging and/or stress relief heat treatment at a temperature of from about 1100° F. (about 593° C.) to about 1350° F. (about 732° C.) or higher for a period of about 1 hour to about 8 hours, followed by uncontrolled cooling to about room temperature, to produce a final article. A temperature less than 1100° F. may be used, but may require a longer time. It is known that the addition of too high a level of Si may result in reduced ductility and/or toughness due to the presence of silicide particles and/or a greater tendency to form ordered $Ti_3Al$ particles in the alpha phase, see, for example, Woodfield, A. P. et. al (1988) Acta Metallurgica, 36(3), 507-515, the disclosure of which is also incorporated by reference herein. For a given composition, the volume fraction of primary alpha present during solution heat treatment will set the local primary alpha composition, and therefore its tendency to form ordered $Ti_3Al$ particles during subsequent age and/or stress relief treatments. If ordered $Ti_3Al$ particles have a tendency to form during the aging and/or stress relief heat treatment, the temperature can be increased to above the $Ti_3Al$ solvus. In this case, it may be necessary to control the cooling rate after heat treatment to minimize the formation of $Ti_3Al$ particles. If a subsequent aging and/or stress relief temperature is required, then the degree of formation of $Ti_3Al$ particles and impact to properties such as ductility and toughness needs to be considered when selecting the subsequent heat treatment.

When Si is included in the Ti alloy, the alloy composition may be designed with a level of Si such that the silicide solvus is below the beta transus, or Si may be entirely in solution, Billet and component forging and heat treatment approaches for this range of alloy compositions may be conducted in a similar manner to conventional Ti-64 processing. Thus, the ingot may be optionally homogenized, then beta forged followed by an alpha-beta pre-strain, followed by a beta anneal or beta forge, with final billet processing performed below the beta transus. All subsequent component forge and heat treatment steps may then be conducted below the beta transus. Any silicides present at alpha beta processing and/or heat treatment temperatures may prevent local beta grain coarsening, and primary alpha coarsening during thermomechanical processing and/or heat treatment. As noted above, it is possible that even with lower levels of Si, ordering of the alpha matrix may still occur, depending on the volume fraction of primary alpha and levels of other elements such as Al, O, C and/or N added to the alloy. If this occurs, then aging and/or stress relief heat treatment temperatures and/or times may need to be adjusted.

II. Processing with Copper Present in the Alloy

When Cu is included as a component in the alloy composition, with or without Si present, Cu may form a titanium copper compound precipitate (e.g., Ti2Cu) at relatively low temperatures (e.g., about 800° F. to about 1000° F. or higher, depending upon the level of Cu in the alloy) in the titanium alloys, which may strengthen the alpha phase resulting in improved strength and HCF properties. The addition of Cu may also lead to refinement of both primary and secondary alpha phases which may also result in improved strength and HCF properties.

Like Si, Cu also tends to segregate during solidification, so the optional homogenization treatment described above (above the beta transus temperature) may be utilized to smooth out the peak/trough of the Cu composition in the ingot, or may be performed following a portion of the billet hot working operations to covert the ingot into a billet. The optional homogenization treatment may also dissolve any primary titanium copper compound precipitates that may be relatively large in size.

When copper is present in the alloy, without Si present, then the process for forming the alloy article can be similar to that of the alloy Ti-64 (e.g., initial beta work, alpha/beta pre-strain, beta forging or annealing to recrystallize the beta grains, and final alpha/beta billet processing), with an optional homogenization process (such as described above) prior to processing or after a portion of the billet processing, and an aging treatment after all billet and component processing (including any welding operations, such as inertia welding) to bring out the strength properties from Cu.

With Cu present, the alloy can then be designed such that following billet conversion and part forging plus heat treatment and quenching (such as described above), an additional lower temperature age treatment can be employed to precipitate out $Ti_2Cu$ or other titanium-copper-containing particles, leading to improved strength and HCF properties.

For example, the copper containing titanium alloy ingot can be high temperature beta processed above the beta transus temperature of the alloy, followed by lower temperature alpha/beta processing at temperatures below the beta transus temperature of the alloy, and then processed through a subsequent high temperature beta process followed by water quenching. The final alpha/beta work can then be performed at temperatures below the beta transus temperature of the alloy. Component forging can then be performed at temperatures below the beta transus of the alloy. Finally, solution heat treatment can then be performed at temperatures below the beta transus temperature of the alloy, but slightly above the alpha/beta forge temperature, followed by quenching (e.g., fast quenching as described above). After typical aging/stress relief operations following solution heat treatment quenching and any additional stress relief operations associated with component manufacture (e.g. inertia, translation friction or other solid state or fusion welding), a low temperature age treatment to precipitate the titanium-copper particles can then be performed.

For alloys Cu-containing alloys with Si, billet and component processing and heat treatment approach would follow earlier discussions of Si-containing alloys, depending upon the level of Si additions, with the exception that a final precipitation age heat treatment would be necessary to bring out Cu-containing precipitates. This low temperature heat treatment to precipitate the titanium-copper particles might be combined with, or performed after any additional stress relief operations associated with component manufacture (e.g. inertia, translation friction or other solid state or fusion welding). As noted earlier, it is possible that with Si additions, ordering of the primary alpha matrix may occur, depending on the levels of primary alpha volume fraction, Si and other elements such as Al, O, C and/or N added to the alloy. If this ordering occurs, aging and/or stress relief heat treatment temperatures and/or times may need to be adjusted.

III. Other Alloy Constituents

Sn can optionally be included in the alloy composition, as stated above, and can potentially serve to stabilize the titanium silicide (e.g., $Ti_5Si_3$) phase in Si-containing alloys to higher temperatures. Thus, Sn may act to keep the silicide solvus temperature sufficiently higher than the beta transus temperature to allow for a wider process field for billet conversion during processing, particularly during the beta processing at a beta processing temperature that is above the beta transus temperature of the alloy but below the silicide solvus temperature of the titanium silicide solvus.

Similarly, Zr may be optionally included within the alloy composition to potentially serve as a stabilizing component for the titanium silicide phase (e.g., $Ti_5Si_3$) in Si-containing alloys, particularly at elevated temperatures.

As stated, carbon can optionally be present in the alloy composition in an amount of about 0.01 wt % to about 0.2 wt % (about 0.01 wt % to about 0.1 wt %). In one embodiment, the amount of carbon can be increased from a nominal level typically found in Ti-64 to about 1000 wppm or greater (but below the titanium carbon containing compound solvus, e.g., $Ti_2C$) in order to increase strength and HCF properties. Alternatively, the amount of C in the alloy can be increased above the titanium carbon containing compound solvus where the titanium carbon containing compound solvus temperature is above the beta transus temperature. In this case, the titanium carbon containing compound particles can be used and processed similar to that described above with respect to Si. That is, the titanium carbon containing compound particles can be used to control the beta crystallization during billet conversion in order to obtain as fine a prior beta grain size as possible. This use of C in the alloy can be used in conjunction with Si (to control the prior beta grain size) and/or Cu (for precipitate strengthening). It is known that additions of C to Ti alloys tend to increase the beta transus and result in a relatively shallow beta approach curve. This allows a relatively low volume fraction of primary alpha to be present at temperatures relatively far below the beta transus, increasing the range of microstructures that can be achieved on a practical scale. The C addition, when below the solid solubility limit in the alpha phase may result in increased properties such as strength and HCF due to a combination of C in solid solution in the primary and secondary alpha phases and refined primary alpha grain size. As in the case of Si additions, too high a level of C may also result in reduced ductility and/or toughness possibly due to a greater tendency to form ordered $Ti_3Al$ particles in the primary alpha phase. If ordered $Ti_3Al$ particles have a tendency to form during the aging and/or stress relief heat treatment, the temperature can be increased to above the $Ti_3Al$ solvus. In this case, it may be necessary to control the cooling rate after heat treatment to minimize the formation of $Ti_3Al$ particles. If a subsequent aging and/or stress relief temperature is required, then the degree of formation of $Ti_3Al$ particles and impact to properties such as ductility and toughness needs to be considered when selecting the subsequent heat treatment.

As stated, oxygen can optionally be present in the alloy composition up to about 0.3 wt %, or alternatively about 0.1 wt % to about 0.2 wt. As in the case of Si additions, too high a level of O may also result in reduced ductility and/or toughness due to a greater tendency to form ordered $Ti_3Al$ particles in the primary alpha phase. If ordered $Ti_3Al$ particles have a tendency to form during the aging and/or stress relief heat treatment, the temperature can be increased to above the $Ti_3Al$ solvus. In this case, it may be necessary to control the cooling rate after heat treatment to minimize the formation of $Ti_3Al$ particles. If a subsequent aging and/or stress relief temperature is required, then the degree of formation of $Ti_3Al$ particles and impact to properties such as ductility and toughness needs to be considered when selecting the subsequent heat treatment.

As stated, Fe and Mo can optionally be present in the alloy singly, or in combination in an amount of [for Fe about 0.1 wt % to about 2 wt % iron (e.g., about 0.1 wt % to about 1 wt %, such as about 0.1 wt % to about 0.6 wt %), and for Mo up to about 2 wt % (e.g., about 0.5 wt % to about 1.5 wt %, such as about 0.5 wt % to about 1 wt %)]. Fe and Mo are both beta stabilizers and will tend to reduce the beta transus of the alloy.

Alpha stabilizers (expressed as 'Aluminum Equivalence', defined by $Aleq=Al+1/3*Sn+1/6*Zr+10*O+20*N+20/3*C$, where each element is expressed in weight percent) and beta stabilizers (expressed in terms of 'Molybdenum Equivalence' defined by $Moeq=Mo+2/3*V+2.9*Fe+1.6*Cr+0.28*Nb+10/13*Cu$, where each element is expressed in weight percent) can be included in the titanium alloy. While no coefficient exists for Si in either Aluminum Equivalence or Molybdenum Equivalence, it is likely that Si should be incorporated into the Aluminum Equivalence based on the increased tendency to form ordered Ti3A1 particles in the primary alpha matrix. FIG. 5 shows a wide range of commercial titanium alloys plotted based on aluminum equivalence and molybdenum equivalence definitions noted above. Zone 1 contains near alpha commercial alloys that have low beta stabilizer content and are not typically very hardenable in thick section size. These alloys may be used as hub materials for blisks, however, their application may be limited as a result of limited hardenability and relatively poor fatigue properties in thick section size. Zone 1 alloys may form a predominantly hexagonal martensite structure following quenching as a result of solid state welding. The solid state welds can typically be toughened by aging at a temperature that will not degrade the base alloy properties away from the weld and heat affected zone. Note, the solid state weld could be toughened by a local heat treatment affecting only material in the vicinity of the weld, however, there are control issues surrounding this approach, including residual stress control. Therefore, it may be more desirable to heat treat the entire welded component.

Zone 2 contains beta or near-beta commercial alloys that have high beta stabilizer content and are typically hardenable in thick section size following quenching and aging. Alloys such as Ti-17 in zone 2 may be used as hub materials for blisks as a result of their excellent hardenability. Zone 2 alloys may form retained beta following quenching as a result of solid state welding. The retained beta welds may be lower strength than the base alloy away from the weld, and require post weld aging to increase the strength of the weld. Aging at lower temperatures may result in excessive hardening in the weld as a result of ultra-fine alpha or omega phase precipitation. Aging at higher temperatures may result in a tough weld, however, depending on the base alloy composition, the higher aging temperature used to toughen the weld may result in a reduction in strength and fatigue in the base alloy material away from the weld.

Zone 3 contains alpha plus beta alloys having intermediate levels of beta stabilizer content and are hardenable up to intermediate section sizes following quenching and aging. Note, Zone 3 in FIGS. 5 and 6 is shown as a dotted line, and may extend up to the boundaries shown delineating Zones 1 and 2. Alloys such as Ti-6246 in zone 3 may be used as a hub material for blisks as a result of their hardenability. Zone 3 alloys may form a combination of orthorhombic martensite, hexagonal martensite and/or retained beta following quenching as a result of solid state welding. The welds may have higher strength than the base alloy away from the weld, and require post weld heat treatment to reduce the strength of the weld. Aging at high temperature may be required in order to reduce the strength and toughen the weld, however, depending on the base alloy composition, the high aging temperature used to toughen the weld may result in a reduction in strength and fatigue in the base alloy material away from the weld. As noted above, the solid state weld could be toughened by a local heat treatment affecting only material in the vicinity of the weld, however, there are control issues surrounding this approach, including residual stress control. Therefore, it may be more desirable to heat treat the entire welded component.

FIG. 6 shows the lower portion of FIG. 5, centered on zones 1 and 3 and also shows the experimental alloys from Table 2 below. The experimental alloys may have increased hardenability over Ti-64 as a result of increased beta stabilizer content, but to also have a high age temperature, allowing heat treatment of a solid state welded component to toughen the solid state weld without reducing the base alloy properties away from the weld.

In the case that the experimental alloy has insufficient strength and fatigue properties for thick section applications such as large section size blisks, additional processing steps can be added to refine the primary alpha grain size, regardless of whether the alloy contains silicon, copper, or both silicon and copper. Table 2 summarizes room temperature, HCF smooth bar, A ratio=1, run out stresses at 10 million cycles for thick section Ti-64 forgings processed to two different primary alpha grain sizes of approximately 15 microns and approximately 2 microns as measured by a linear intercept method. Forging methods to reduce primary alpha grain size include, but are not limited to, processing at a lower final alpha/beta forge temperature, or forging in multiple directions, see, for example, US2014/0261922, EP1546429B1, and US2012/0060981. Table 2 shows that the reduction in primary alpha grain size of approximately seven-fold results in an approximate 30% increase in HCF strength. Therefore, additional processing to refine primary alpha grain size may result in a component with an enhanced balance of properties.

TABLE 2

| 10^7 Runout High Cycle Fatigue Stresses for Ti-64 Thick Section Pancakes Processed to Two Primary Alpha Grain Sizes | |
|---|---|
| Approximately 15 microns | 32.5 ksi |
| Approximately 2 microns | 42.5 ksi |

IV. Alloy Components

It will be appreciated by a person skilled in the art that titanium alloy components in forms of a rotary machine parts would be useful useful in operating rotary machines such as shown in FIG. 1. Exemplary rotary machine parts include, for example, a disk, blisk, airfoil, blade, vane, integral bladed rotor, frame, fairing, seal, gearbox, case, mount, shaft, and the like.

Similarly, it will be appreciated by a person skilled in the art that practicing the invention would including making and using components in form of an airframe part including, for example, a spar, rib, frame, box, pylon, fuselage, stabilizer, undercarriage, wing, seat track, and fairing, and the like.

Also, a component having an article, such as the airfoil 760 of FIG. 2, may be made from a titanium alloy. Example articles may have a thick section, be cast and wrought, or be a structural aerospace casting, or the like.

EXAMPLES

Table 3 compares exemplary titanium alloys, both comparison alloys and exemplary alloys, with Ti-64:

TABLE 3

(wt %) Chemical Compositions of Selected Experimental Alloys

| | Measured Composition - All elements in wt % | | | | | | | | | | |
|---|---|---|---|---|---|---|---|---|---|---|---|
| | Ti | Al | V | Fe | O | N | C | Mo | Si | Cu | W |
| A Avg. | 88.918 | 6.715 | 3.980 | 0.178 | 0.159 | 0.009 | 0.014 | 0.003 | 0.021 | 0.004 | 0.000 |
| B Avg. | 88.453 | 6.943 | 4.130 | 0.210 | 0.206 | 0.008 | 0.026 | 0.002 | 0.020 | 0.002 | 0.000 |
| C Avg. | 87.975 | 7.293 | 3.918 | 0.173 | 0.201 | 0.387 | 0.018 | 0.002 | 0.031 | 0.003 | 0.000 |
| D Avg. | 87.555 | 7.573 | 3.993 | 0.195 | 0.227 | 0.415 | 0.019 | 0.002 | 0.019 | 0.003 | 0.000 |
| E Avg. | 88.922 | 6.638 | 4.028 | 0.180 | 0.159 | 0.008 | 0.044 | 0.002 | 0.019 | 0.003 | 0.000 |
| F Avg. | 88.812 | 6.693 | 4.003 | 0.183 | 0.179 | 0.008 | 0.102 | 0.003 | 0.016 | 0.003 | 0.000 |
| G Avg. | 87.941 | 6.693 | 3.910 | 0.360 | 0.180 | 0.009 | 0.039 | 0.358 | 0.508 | 0.004 | 0.000 |
| H Avg. | 87.190 | 6.423 | 3.765 | 0.443 | 0.184 | 0.019 | 0.082 | 0.465 | 0.673 | 0.758 | 0.000 |
| I Avg. | 88.181 | 6.603 | 3.913 | 0.520 | 0.157 | 0.009 | 0.025 | 0.560 | 0.028 | 0.005 | 0.000 |
| J Avg. | 87.541 | 6.610 | 3.850 | 0.455 | 0.173 | 0.010 | 0.074 | 0.495 | 0.022 | 0.770 | 0.000 |
| K Avg. | 88.406 | 6.683 | 3.923 | 0.175 | 0.153 | 0.009 | 0.014 | 0.003 | 0.635 | 0.002 | 0.000 |
| L Avg. | 88.773 | 6.605 | 3.930 | 0.173 | 0.159 | 0.009 | 0.019 | 0.002 | 0.023 | 0.308 | 0.000 |
| M Avg. | 88.562 | 6.708 | 3.890 | 0.188 | 0.143 | 0.009 | 0.019 | 0.003 | 0.020 | 0.004 | 0.455 |

TABLE 4

Room Temperature Tensile Properties of Selected Alloys from Table 3

| | UTS (ksi) 75 F. | | | 0.2% Yield (ksi) 75 F. Approx. Cooling Rate | | | % El 75 F. | | |
|---|---|---|---|---|---|---|---|---|---|
| Composition↓ | 600 F./min | 200 F./min | 130 F./min | 600 F./min | 200 F./min | 130 F./min | 600 F./min | 200 F./min | 130 F./min |
| A | 144.6 | 141 | 140.3 | 128.6 | 124.9 | 124.2 | 19.5 | 17 | 19 |
| B | 153.3 | 146.8 | | 138.9 | 130.5 | | 17 | 17 | |
| F | 157.8 | 155.8 | | 140.1 | 136.3 | | 17 | 17 | |
| G | 167.1 | 164 | 164.6 | 155.1 | 151.1 | 152.2 | 16.5 | 17 | 17 |
| H | 183.1 | 185.9 | | 176.1 | 174.4 | | 3.9 | 9.5 | |
| I | 161.7 | | | 137.4 | | | 19 | | |
| J | 170.6 | 166.1 | 164.2 | 159.7 | 155.2 | 152.1 | 11.7 | 17 | 18 |
| K | 166 | 160.2 | 159.7 | 152 | 145.9 | 145.6 | 15 | 17 | 16 |
| L | 149.5 | 145.8 | | 138.9 | 132.5 | | 18 | 19 | |
| M | 149 | 145.4 | | 134.4 | 128.4 | | 17 | 19 | |

TABLE 5

300 F. Tensile Properties of Selected Alloys from Table 3

| | UTS (ksi) 300 F. | | | 0.2% Yield (ksi) 300 F. Approx. Cooling Rate | | | % El 300 F. | | |
|---|---|---|---|---|---|---|---|---|---|
| Composition↓ | 600 F./min | 200 F./min | 130 F./min | 600 F./min | 200 F./min | 130 F./min | 600 F./min | 200 F./min | 130 F./min |
| A | 122.8 | | 122.6 | 101.7 | | 102.1 | 19.7 | | 20.5 |
| B | 132.8 | | | 110.4 | | | 18 | | |
| F | 133.4 | | | 110.7 | | | 18.5 | | |
| G | 145.5 | | 145.2 | 126.6 | | 127.3 | 19 | | 18 |
| H | 166.5 | | | 149.4 | | | 13.2 | | |
| I | 132.8 | | | 111.4 | | | 22 | | |
| J | 150.0 | | 146.0 | 131.8 | | 128.2 | 18 | | 18 |
| K | 150.3 | | 140.8 | 125.1 | | 121.6 | 17 | | 17 |
| L | 128.3 | | | 108.5 | | | 19.7 | | |
| M | 130.7 | | | 109.0 | | | 18 | | |

TABLE 6

600 F. Tensile Properties of Selected Experimental Alloys from Table 3

| | UTS (ksi) 600 F. | | | 0.2% Yield (ksi) 600 F. Approx. Cooling Rate | | | % El 600 F. | | |
|---|---|---|---|---|---|---|---|---|---|
| Composition↓ | 600 F./min | 200 F./min | 130 F./min | 600 F./min | 200 F./min | 130 F./min | 600 F./min | 200 F./min | 130 F./min |
| A | 105.6 | 101 | 102.5 | 83.4 | 78.8 | 79.2 | 19 | 19 | 20 |
| B | 108.2 | 105.5 | | 85.1 | 82.1 | | 19.7 | 19 | |
| F | 112.9 | 111 | | 88.5 | 87 | | 18 | 17 | |
| G | 127.4 | 123.4 | 125.9 | 104.9 | 100.8 | 103.2 | 17 | 17 | 18 |
| H | 148.9 | 149.1 | | 128.8 | 127.4 | | 15.5 | 17 | |
| I | 115.1 | | | 90.7 | | | 16.5 | | |
| J | 133.0 | 127.3 | 127.2 | 111.2 | 105.9 | 104.2 | 19 | 17 | 17 |
| K | 126.5 | 122.5 | 122.1 | 103.5 | 99.6 | 99.8 | 16.2 | 17 | 16 |
| L | 108.5 | 108.4 | | 85.7 | 83.8 | | 19.7 | 22 | |
| M | 108.2 | 107.6 | | 85.0 | 83.8 | | 18 | 20.5 | |

Tables 4, 5, and 6, show room temperature, 300° F., and 600° F. tensile properties as a function of cooling rate from solution heat treatment for some of the alloys listed in Table 3. Compared with the Ti-64 baseline, Alloy A, it is seen that at a slow cooling rate of approximately 130° F. per minute, Alloys G (Ti-64 plus Fe, Mo and Si) and J (Ti-64 plus Fe, Mo, Si and Cu) tested at room temperature have slightly lower plastic elongations, but ultimate and 0.2% yield strengths on the order of 25-30 ksi higher.

Table 7 shows the effect of alloying on tensile modulus properties for in increased room temperature through 600 F modulus. When C, Fe and Mo are added in conjunction with Si, there is a smaller increase in tensile modulus at room temperature and 600 F. Similarly for C, Fe, Mo and Cu are added to the Ti-64 base, there is a small increase in room temperature and 600 F tensile modulus. Increased modulus results in a potential reduction in airfoil stresses in the case of blisk applications, potentially enabling thinner airfoils to be designed having lower weight and improved performance.

TABLE 7

Elastic Modulus (Msi) of Selected Experimental Alloys from Table 3

| Alloy | Temperature (° F.) 75 | 300 | 600 |
|---|---|---|---|
| A | 16.4 | 16 | 13 |
| G | 16.7 | 15.7 | 13.7 |
| J | 16.9 | 15.6 | 14.1 |
| K | 17.1 | 16.6 | 14.2 |

Table 8 shows 10 million cycle, room temperature HCF runout stresses for notched bars with a stress concentration (Kt) of approximately 2, A ratio=infinity and 0.5. At A=infinity, an approximate 45% improvement is seen in the 10 million cycle HCF runout stress, while at A=0.5, the 10 million cycle HCF runout stress improvement is approximately 10%.

TABLE 8

10^7 Runout High Cycle Fatigue Stresses for Selected Experimental Alloys from Table

| Alloy | A Ratio | Runout Stress (ksi) |
|---|---|---|
| Alloy A | A = Infinity | 62.0 ksi |
| Alloy A | A = 0.5 | 33.5 ksi |
| Alloy G | A = Infinity | 88.0 ksi |
| Alloy G | A = 0.5 | 36.5 ksi |
| Alloy J | A = Infinity | 91.0 ksi |
| Alloy J | A = 0.5 | 37.0 ksi |
| Alloy K | A = Infinity | 91.0 ksi |
| Alloy K | A = 0.5 | 35.0 ksi |

The resistance to foreign object damage (FOD) was assessed using a compressed gas ballistic rig, firing approximately 0.175" steel ball bearings at Alloy A, G, J and K coupons at speeds ranging from approximately 600 to approximately 1000 feet per second.

Baseline Ti-64 (Alloy A) showed no plugging at approximately 800 ft/s and below. At approximately 1000 ft/s, plugging occurred, but no radial cracks were observed. Alloys G, J and K showed equivalent or better results at all speeds tested, with similar or less deformation around the impact area. In the case Alloy J, the ball did not plug at approximately 1000 ft/s, implying a superior combination of strength and ductility at the high impact strain rates involved.

Figure 13:
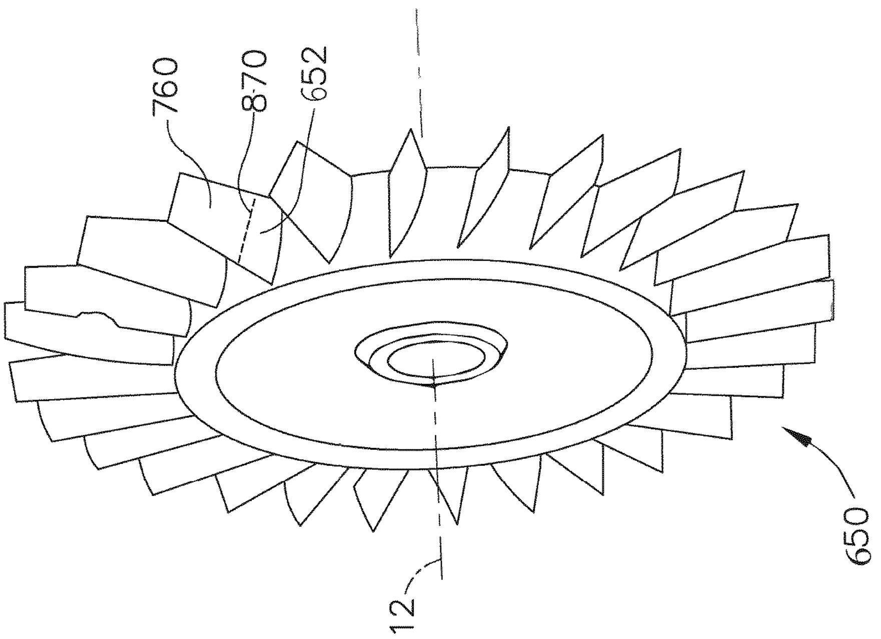
FIG. 13 is an isometric view of a bladed disk (i.e., "blisk").

For example, a hub or a mid-fan blisk typically demands certain properties, such as high strength, high fatigue strength, high impact resistance to foreign object impact. A titanium alloy can provide these desired properties, such as in a hub 157 (FIG. 1 or FIG. 8) or a monolithic blisk 650 (FIG. 13). For instance, a modified Ti64 titanium alloy may be utilized for such a component.

A turbine component is generally provided that is comprised of a titanium alloy that has been modified from Ti-64 in order to preserve the desired properties of Ti-64 (e.g., relatively isotropic properties, a relatively low density, tolerance to FOD, repairability, and low cost) while improving the thick section strength, HCF capability, creep strength, and low deformation following FOD to approach those beneficial aspects of Ti-17 and Ti-6246. These properties make such a titanium alloy particularly useful for a hub (e.g., hub 157 of FIG. 1 or FIG. 8) or vane in the engine, such as described above. The cost of the new modified Ti-64 alloy can be minimized by designing the composition such that a high percentage of widely available Ti-64 recycled materials can be used. Additionally, the billet and forge processing approach may be kept as close to Ti-64 as possible in order to minimize cost, while allowing for a large scale production of such turbine components from the titanium alloy.

As stated, a turbine component within a turbofan engine, such as shown in FIG. 1, can be constructed from a titanium alloy. The titanium alloy includes 5.50 wt % to 6.90 wt % aluminum; 3.50 wt % to 4.50 wt % vanadium; 0.01 wt % to 0.03 wt % carbon; 0.20 wt % to 0.70 wt % iron; 1.00 wt % to 1.50 wt % molybdenum; 0.10 wt % to 0.30 wt % silicon; up to 0.21 wt % oxygen; up to 0.016 wt % nitrogen (e.g., up to 0.015 wt % nitrogen); and a balance of titanium. In particular embodiments, the titanium alloy has a 0.2% yield strength of 1000 MPa or greater (e.g., 1000 MPa to 1380.0 MPa), an ultimate tensile strength of 1060 MPa or greater (e.g., 1060 MPa to 1450 MPa), a plastic elongation of 15.0% or greater (e.g., 15.0% to 30.0%), a ballistic impact resistance measured by a crack length of 3.048 mm or less (e.g., 0 mm to 3.048 mm), a reduction in area that is 45% RA or greater (e.g., 45% RA to 75% RA), or any combination of these properties.

Silicon (Si) is included within the titanium alloy to increase strength. It has been found that less than 0.10 wt % of Si does not impart sufficient strength to the titanium alloy. Additionally, it was found that more than 0.30 wt % Si results in poorer ballistic impact resistance, poorer plastic elongation, poorer reduction in area, or a combination thereof. Additionally, it was found that increased levels of Si above 0.30 wt % may result in Si segregation issues during large diameter ingot solidification that would be necessary for large scale production and manufacturing processes.

Iron (Fe) is included within the titanium alloy to enhance high-temperature strength and to increase the temperature width of the alpha+beta phase field, thereby increasing the hot working processing flexibility. It has been found that at least 0.20 wt % of Fe, in conjunction with 1.00 wt % to 1.50 wt % Mo, leads to a desired balance of strength and plastic elongation. However, Fe segregates strongly during solidification of large diameter ingots, and it was found that a maximum of 0.70 wt % of Fe avoids production issues in large scale production and manufacturing processes.

Molybdenum (Mo) is included within the titanium alloy to enhance high-temperature strength and creep resistance and to increase the temperature width of the alpha+beta phase field, thereby increasing the hot working processing flexibility. It has been found that at least 1.00 wt % Mo, in conjunction with 0.20 wt % to 0.70 wt % Fe, leads to a desired balance of strength and plastic elongation. However, the presence of too much Mo within the titanium alloy may degrade the plastic elongation, reduction in area and/or ballistic impact resistance of the titanium alloy. Thus, it has been found that more than 1.50 wt % degrades the plastic elongation, reduction in area and/or ballistic impact resistance of the titanium alloy beyond what would be desirable. Increased levels of Mo also lead to an increase in the titanium alloy density.

Nitrogen (N) is present in the titanium alloys due to inevitable pick-up during vacuum melting step(s) in the production of the titanium alloy. N will increases the strength and hardness of a titanium alloy. However, too much N present in the titanium alloy, such as above 0.016 wt % (e.g., above 0.015 wt %), leads to lower plastic elongation, lower reduction in area, and/or lower ballistic impact resistance.

Oxygen (O) is naturally present in titanium alloys due to titanium's high oxidation rate and can be intentionally added to meet a desired chemistry. However, the amount of O present is minimized in the titanium alloys presently disclosed, as it has been found that more than 0.21 wt % O in the titanium alloy would lead to reduced plastic elongation, reduction in area, and/or ballistic impact resistance.

Carbon (C) is naturally present in titanium alloys due to low levels in the input materials used in formulation and can be intentionally added to meet a desired chemistry. A certain amount of C above 0.01 wt % is beneficial to 0.2% yield strength and ultimate tensile strength without degrading plastic elongation, reduction in area and/or ballistic impact resistance; however, above 0.03 wt % of carbon present in the alloy leads to a reduction in plastic elongation, reduction in area and/or ballistic impact resistance.

In particular embodiments, other elements may be avoided from inclusion within the titanium alloy so as to avoid undesired characteristics. For example, the inclusion of certain elements may hinder large scale use, such as in a large scale manufacturing production of such turbine components.

While copper (Cu) may provide increased strength to a titanium alloy, it has been found that the presence of Cu results in severe segregation during large diameter ingot solidification and may lead to production chemistry and microstructural control issues at large-scale. Thus, the presence of Cu in the titanium alloy may form a non-homogeneous titanium alloy material that would not be suitable for manufacturing of turbine components with consistent composition within each component and across all the components. As such, the titanium alloy is substantially free from Cu to avoid these issues that would hinder use of the titanium alloy in large scale manufacturing settings.

While chromium (Cr) may provide increased strength to the titanium alloy, it has been found that the presence of Cr results in segregation during solidification and may lead to production chemistry and microstructural control issues at large-scale. Thus, the presence of Cr in the titanium alloy may form a non-homogeneous titanium alloy material that would not be suitable for manufacturing of turbine components with consistent composition within each component and across all the components. As such, the titanium alloy is substantially free from Cr (e.g., no more than any residual amount of Cr present due to Cr presence in the Ti sponge, such as no more than 500 wppm, e.g., no more than 200 wppm), in certain embodiments, to avoid these issues that would hinder use of the titanium alloy in large scale manufacturing settings.

While tin (Sn) may provide increased strength to the alloy, particularly at elevated temperatures, it was found that the presence of Sn results in decrease plastic elongation, a decrease in reduction in area, and a decrease in ballistic impact resistance. Thus, the titanium alloy is substantially free from Sn, in certain embodiments, to avoid these issues.

While nickel (Ni) may provide increased strength to the alloy, it was found that the presence of Ni results in segregation during solidification and may lead to production chemistry and microstructural control issues at large-scale. Thus, the presence of Ni in the titanium alloy may form a non-homogeneous titanium alloy material that would not be suitable for manufacturing of turbine components with consistent composition within each component and across all the components. As such, the titanium alloy is substantially free from Ni (e.g., no more than any residual amount of Ni present due to Ni presence in the Ti sponge, such as no more than 500 wppm, e.g., no more than 200 wppm), in certain embodiments, to avoid these issues that would hinder use of the titanium alloy in large scale manufacturing settings.

While zirconium (Zr) may provide increased strength to the titanium alloy, particularly at elevated temperatures, it has been found that the presence of Zr and Si in the titanium alloy forms a mixed $(TiZr)_6Si_3$ silicide particle that will rapidly degrade plastic elongation, decrease the reduction in area, and decrease the ballistic impact resistance. Thus, the titanium alloy is substantially free from Zr, in certain embodiments, to avoid these issues.

While tungsten (W) may provide increased strength and creep strength to the titanium alloy, the inclusion of W may lead to a non-homogeneous alloy material because of W's relatively high density compared to Ti. Thus, the titanium alloy is substantially free from W, in certain embodiments, to avoid this issue.

In particular embodiments, the titanium alloy described herein may be forged from a section of cylindrical billet to a shape closer to the finished turbine component in one or more steps below the beta transus, which is the temperature on heating at which all the low temperature alpha, close-packed hexagonal phase disappears and the high temperature beta, body-centered cubic phase is present. The forging temperature may be below the beta transus temperature of the titanium alloy, and may be varied from 14° C. to 83° C. below the beta transus temperature.

The forged shape may be solution heat treated at a temperature closer to the beta transus than the forging temperature to control the volume fractions of primary alpha phase and the beta phase. For example, the solution temperature may be varied typically from 17° C. to 69° C. below the beta transus temperature and the solution time should be for at least 1 hour.

It is well known that increasing the cooling rate following solution heat treatment may result in an increase in 0.2% yield strength and ultimate tensile strength. For the purposes of this application, all alloys were solution heat treated and cooled at a rate of approximately 208° C./min corresponding to about 80 mm section size in a component that is water quenched from solution heat treatment. Accordingly, all the tensile properties measured and reported here correspond to those tensile properties expected in large section size components, on the order of 101.6 mm, that would be liquid quenched (e.g. water, oil, polymer, etc.) or gas cooled (e.g. air, helium, etc.) following solution heat treatment. It is well known that higher strengths may be achieved via increasing cooling rate following solution heat treatment. The post-solution cooling rate at any location in a heat treated component may be directly measured using embedded thermocouples, or estimated using a finite element model, or some combination of both. The post-solution cooling rate may be measured and/or calculated between a temperature of approximately 28° C. below the solution temperature to 83° C. below the solution temperature.

Following solution heat treatment and cooling, the component may be overaged at 537.8° C. to 760° C. for at least 1.5 hours (e.g., 2 hours) in order to minimize remaining residual stresses from the solution heat treatment and cooling while retaining the balance of 0.2% yield strength, ultimate tensile strength, plastic elongation, reduction in area and ballistic impact resistance. Through these processing methods, the desired characteristics of the titanium alloy may be achieved, such as a 0.2% yield strength of 1000 MPa or greater (e.g., 1000 MPa to 1380 MPa), an ultimate tensile strength of 1060 MPa or greater (e.g., 1060 MPa to 1450 MPa), a plastic elongation of 15.0% or greater (e.g., 15.0% to 30.0%), a ballistic impact resistance measured by a crack length of 3.048 mm or less (e.g., 0 mm to 3.048 mm), a reduction in area that is 45% RA or greater (e.g., 45% RA to 75% RA), or any combination of these properties discussed above.

The turbine component formed of the titanium alloy described herein may be in form of a rotary machine part(s) useful in operating such rotary machines. Exemplary rotary machine parts include, for example, a disk, bladed disk, airfoil, blade, vane, integral bladed rotor, frame, fairing, seal, gearbox, case, mount, shaft, and the like.

Figure 14:
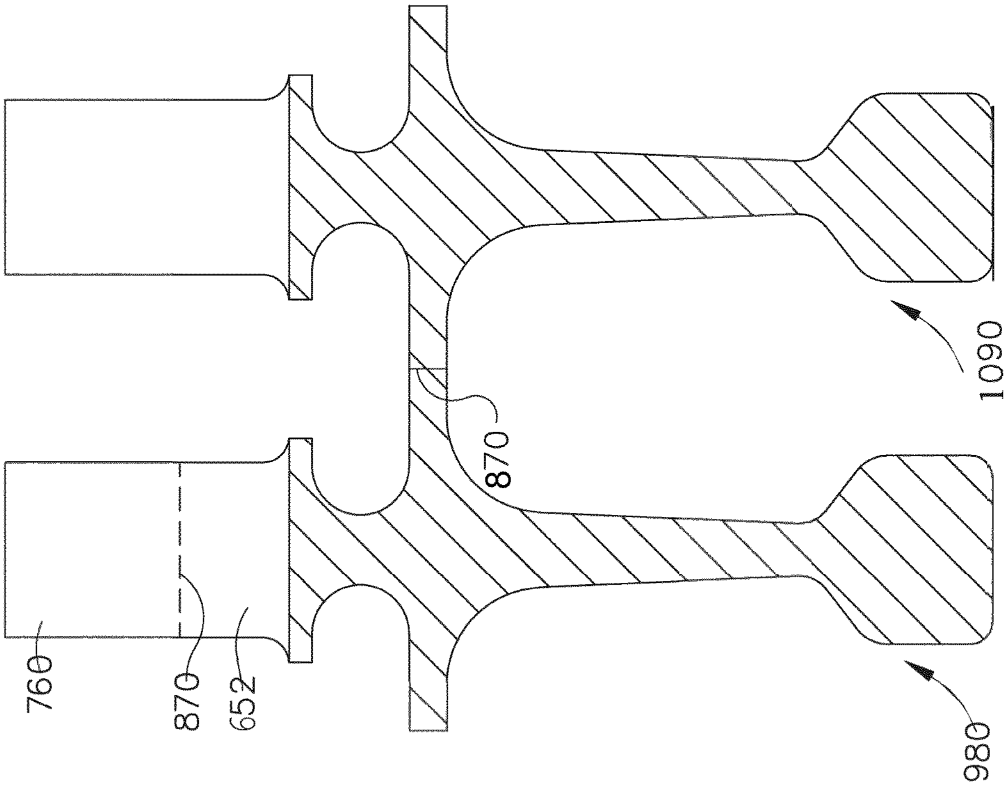
FIG. 14 is sectional view through two stages of blisks depicting optional location for weld zones.

To minimize the mass of rotating components (via eliminating bolted joints), and to take advantage of higher temperature materials, in a high pressure compressor 20, shown in FIG. 1, adjacent stages of bladed disks may be inertia welded. Similar to the bi-metallic hub/airfoil, it may be desirable to have a front bladed disk stage made from a first material and an aft stage bladed disk made from a second material. As shown in FIG. 14, the front bladed disk stage 980 may be made from an example titanium alloy of the present disclosure and the aft bladed disk stage 1090 may be made from conventional material, such as, for example Ti-17. Again the weld zone or heat affected zone 870 is present and a mix of front bladed disk and aft bladed disk alloys are present, along with a wide range of microstructures in zone 870, representing an area of reduced material properties.

In other exemplary embodiments, adjacent front bladed disk stage 980 and aft bladed disk stage 1090 are both made from the same titanium alloy of the present disclosure, or may be made from separate example titanium alloy of the present disclosure.

Furthermore, for the embodiments described by FIG. 13 and FIG. 14, any exemplary titanium alloy of the present disclosure may be used alone or in combination with commercially available alloys for one or more of the airfoil 760, hub 652, bladed disk 650, front stage bladed disk 980 or back stage bladed disk 1090. Although FIG. 14 describes two stages, more than two stages of bladed disks may be contemplated.

While materials may be selected for these properties alone, consideration should be made for recovering material property loss due to the weld-induced thermal environment seen in a translation friction welding or linear friction welding via post treatment, such as, for example, furnace heat treatment. As will be discussed below, the titanium alloy of the present disclosure pairs well with commercially available titanium alloys, allowing manufacturers to take full advantage of this bi-metallic material property benefit by, for example, better matching heat treatment temperatures and processing between the hub 652 material and airfoil 760 material and between the materials of adjacent bladed disk stages 980 and 1090. These benefits can also be realized when the titanium alloy of the present disclosure is welded with itself, not only with commercially available titanium alloys. In the case of a translation friction welded bi-metallic bladed disk, use of the titanium alloy of the present disclosure as the hub in place of beta processed Ti-17 or beta processed Ti-6246, and Ti-64 as the airfoil will result in a better matching of flow stresses and microstructures between the titanium alloy of the hub and the Ti-64 alloy airfoil. This may result in a solid state weld having a lower tendency to form defects during or following the welding process.

Example components may have a thick section, be cast and wrought, or be a structural aerospace casting, or the like.

Examples

Exemplary alloys (E-1 to E-20) were created according to the chemistries shown in FIG. 18 (Table 9). These Exemplary Alloys were formed via an open die forge process designed to re-create a typical production billet conversion process; first hot working the as-cast ingot above the beta transus, followed by sub-transus hot working that resulted in beta recrystallization as the material was subsequently reheated above the beta transus and further hot worked, followed by water quenching. Finally, the material was re-heated to below the beta transus and hot worked to final diameter. All hot working was accomplished using open die forging, like that used in large-scale production ingot to billet processing, with the intent that the microstructure and texture of the sub-scale materials was representative of larger, production-scale material.

Comparative alloys are discussed below and shown in FIGS. 5, 6, and 7 (Tables 10, 11A, and 11B, respectively). The alloys of Table 9 (FIG. 18), Table 10 (FIG. 19), Table 11A (FIG. 20), and Table 11B (FIG. 21) were cooled from alpha+beta solution heat treatment at 208° C./minute. These alloys were measured to determine the 0.2% YS, the UTS, the % plastic elongation, and the % reduction in area, according to ASTM E8/E8M at 23° C.

The 23° C. 0.2% YS data from the alloys shown in FIG. 18 (Table 9) were input into a multiple linear regression statistical model using commercially available statistical analysis package (MiniTab V. 20.2). The following elements were determined to be statistically significant using a p-test with a >95% confidence level for each element's statistical significance: Al, O, Fe, Si, Mo. The model for yield strength prediction is shown in Equation 1:

$$0.2\%\ YS\ (\text{MPa}) = 469.3 + 48.8 * \text{Al (wt \%)} + 748 * \text{O (wt \%)} + 96.1 * \text{Fe (wt \%)} + 188 * \text{Si (wt \%)} + 57.7 * \text{Mo (wt \%)} \quad \text{Equation 1}$$

For high strength Ti alloy applications, it is desirable for a candidate alloy to have 0.2% YS 1000 MPa at 23° C.

The 23° C. UTS data from the alloys shown in FIG. 18 (Table 9) were input into a multiple linear regression statistical model using commercially available statistical analysis package (MiniTab V. 20.2). The following elements were determined to be statistically significant using a p-test with a >95% confidence level for each element's statistical significance: Al, O, Fe, Si, Mo. The model for Ultimate tensile strength prediction is shown in Equation 2:

$$UTS\ (\text{Mpa}) = 612.1 + 39.2 * \text{Al (wt \%)} + 666 * \text{O (wt \%)} + 74.6 * \text{Fe (wt \%)} + 202 * \text{Si (wt \%)} + 41.6\ \text{Mo (wt \%)} \quad \text{Equation 2}$$

For high strength Ti alloy applications, it is desirable for a candidate alloy to have UTS ≥1060 MPa at 23° C.

The 23° C. % Plastic Elongation (% EL) from the alloys shown in FIG. 18 (Table 9) were input into a multiple linear regression statistical model using commercially available statistical analysis package (MiniTab V20.2). Note, the statistical analysis was performed using Log(10) transformation of the % plastic elongation values, as is standard practice for lognormally distributed data (J Chen, Z Wang et al., Int. J. Plast. 152 (2022) 103260). The following elements were determined to be statistically significant using a p-test with a >95% confidence level for each element's statistical significance: Fe, Si, Mo. The model for yield strength prediction is shown in Equation 3:

$$EL\ (\%) = 10^{\wedge}(1.149 + 0.211 * \text{Fe (wt \%)} - 0.514 * \text{Si (wt \%)} + 0.076 * \text{Mo (wt \%)}) \quad \text{Equation 3}$$

For high strength Ti alloy applications, it is desirable for a candidate alloy to have % plastic elongation ≥15.0% at 23° C.

The 23° C. % Reduction in Area (% RA) from the alloys shown in FIG. 18 (Table 9) were input into a multiple linear regression statistical model using commercially available statistical analysis package (MiniTab V20.2). Note, the statistical analysis was performed using Log(10) transformation of the % reduction in area values, as is standard practice for lognormally distributed data (J Chen, Z Wang et al., Int. J. Plast. 152 (2022) 103260). The following elements were determined to be statistically significant using a p-test with a >95% confidence level for each element's statistical significance: Fe, Si, Mo. The model for yield strength prediction is shown in Equation 4:

$$RA\ (\%) = 10^{\wedge}(1.560 + 0.195 * \text{Fe (wt \%)} - 0.663 * \text{Si (wt \%)} + 0.139 * \text{Mo (wt \%)}) \quad \text{Equation 4}$$

For high strength Ti alloy applications, it is desirable for a candidate alloy to have % reduction in area ≥45.0% at 23° C.

In certain embodiments, it is desirable for high strength Ti alloys to have both high strength (≥1000 MPa 0.2% YS, according to Equation 1) as well as high % plastic elongation (≥15.0%, according to Equation 3).

Comparative alloys (C-1 to C-20) were also created according to the chemistries shown in FIG. 19 (Table 10). These Comparative Alloys were open die forged as with the exemplary alloys of FIG. 18 (Table 9). The alloys of FIG. 19 (Table 10) were measured for their respective properties according to ASTM E8/E8M at 23° C. As shown in the results of FIG. 19 (Table 10), these comparative alloys did not meet the specifications of the desired titanium alloy.

Comparative alloys (C-21 to C-50) were also created according to the chemistries shown in FIG. 20 (Table 11A), and comparative alloys (C-51 to C-66) were also created according to the chemistries shown in FIG. 21 (Table 11B). As shown in the results of FIG. 20 (Table 11A) and FIG. 21 (Table 11B), these comparative alloys did not meet the specifications of the desired titanium alloy.

The alloy data from U.S. Patent Publication Number 2017/0268091 is shown recreated in FIG. 22 (Table 12), as comparative alloys (Comp-A to Comp-M). The alloys of FIG. 22 (Table 12) were cast as ingots and then extruded down to final size in the alpha/beta phase field, not following a typical open-die forge billet process. It is likely that this extrusion process resulted in a different combination of 0.2% yield strength, ultimate tensile strength, % plastic elongation and % reduction in area due to differences in texture induced by the extrusion process. This process is completely different than what could be used in large scale manufacturing production. Thus, while alloy Comp-G meets some of the targeted alloy characteristics, the predicted elongation is low for an alloy that would be processed according to an open die forge process, as utilized with the Exemplary Alloys of FIG. 18 (Table 9). Thus, it is believed that the alloy Comp-G would lead to an alloy with reduced elongation than shown in FIG. 22 (Table 12) during large-scale processes. While alloy Comp-J meets some of the targeted alloy characteristics, the presence of copper is problematic for the alloy Comp –J's use in a large scale manner. That is, the presence of copper would result in severe segregation during large diameter ingot solidification and would lead to production chemistry and microstructural control issues at large-scale.

This written description uses examples to disclose the present disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

Further aspects are provided by the subject matter of the following clauses:

A gas turbine engine comprising: a turbomachine comprising a compressor section, a combustion section, and a turbine section arranged in serial flow order, the compressor section having a high pressure compressor defining a high pressure compressor exit area ($A_{HPCExit}$) in square inches; wherein the gas turbine engine defines a redline exhaust gas temperature (EGT) in degrees Celsius, a total sea level static thrust output ($Fn_{Total}$) in pounds, and a corrected specific thrust, wherein the corrected specific thrust is greater than or equal to 42 and less than or equal to 90, the corrected specific determined as follows: $Fn_{Total} \times EGT/(A_{HPCExit}^2 \times 1000)$.

The gas turbine engine of the preceding clauses wherein the corrected specific thrust is from 42 to 90, such as from 45 to 80, such as from 50 to 80.

The gas turbine engine of the preceding clauses, wherein the EGT is greater than 1000 degrees Celsius and less than 1300 degrees Celsius.

The gas turbine engine of any preceding clause, wherein the EGT is greater than 1100 degree Celsius and less than 1250 degrees Celsius.

The gas turbine engine of any preceding clause, wherein the EGT is greater than 1150 degree Celsius and less than 1250 degrees Celsius.

The gas turbine engine of any preceding clause, wherein the EGT is greater than 1000 degree Celsius and less than 1300 degrees Celsius, and wherein the corrected specific thrust is greater than or equal to 45.

The gas turbine engine of any preceding clause, wherein the EGT is greater than 1000 degree Celsius and less than 1300 degrees Celsius, and wherein the corrected specific thrust is greater than or equal to 50.

The gas turbine engine of any preceding clause, wherein the turbine section comprises a high pressure turbine having a first stage of high pressure turbine rotor blades, and wherein the gas turbine engine further comprises: a cooled cooling air system in fluid communication with the first stage of high pressure turbine rotor blades.

The gas turbine engine of one or more of the preceding clause, wherein the cooled cooling air system is further in fluid communication with the high pressure compressor for receiving an airflow from the high pressure compressor, and wherein the cooled cooling air system further comprises a heat exchanger in thermal communication with the airflow for cooling the airflow.

The gas turbine engine of any preceding clause, wherein when the gas turbine engine is operated at a takeoff power level, the cooled cooling air system is configured to provide a temperature reduction of a cooling airflow equal to at least 15% of the EGT and up to 45% of the EGT.

The gas turbine engine of any preceding clause, wherein when the gas turbine engine is operated at a takeoff power level, the cooled cooling air system is configured to receive between 2.5% and 35% of an airflow through a working gas flowpath of the turbomachine at an inlet to a compressor of the compressor section.

The gas turbine engine of any preceding clause, further comprising a primary fan driven by the turbomachine.

The gas turbine engine of any preceding clause, further comprising an inlet duct downstream of the primary fan and upstream of the compressor section of the turbomachine; and a secondary fan located within the inlet duct.

The gas turbine engine of any preceding clause, wherein the gas turbine engine defines a bypass passage over the turbomachine, and wherein the gas turbine engine defines a third stream extending from a location downstream of the secondary fan to the bypass passage.

The gas turbine engine of any preceding clause, wherein the secondary fan is a single stage secondary fan.

A method of operating a gas turbine engine, comprising: operating the gas turbine engine at a takeoff power level, the gas turbine engine having a turbomachine with a high pressure compressor defining a high pressure compressor exit area ($A_{HPCExit}$) in square inches, the gas turbine engine defining a redline exhaust gas temperature (EGT) in degrees Celsius, a total sea level static thrust output ($Fn_{Total}$) in pounds, and a corrected specific thrust; wherein the corrected specific thrust is greater than or equal to 42 and less than or equal to 90, the corrected specific determined as follows: $Fn_{Total} \times EGT/(A_{HPCExit}{}^2 \times 1000)$.

The method of any preceding clause, wherein the EGT defined by the gas turbine engine is greater than 1000 degree Celsius and less than 1300 degrees Celsius.

The method of any preceding clause, wherein the EGT defined by the gas turbine engine is greater than 1100 degree Celsius and less than 1300 degrees Celsius.

The method of any preceding clause, wherein the EGT defined by the gas turbine engine is greater than 1000 degree Celsius and less than 1300 degrees Celsius, and wherein the corrected specific thrust defined by the gas turbine engine is greater than or equal to 45.

The method of any preceding clause, wherein operating the gas turbine engine at the takeoff power level further comprises reducing a temperature of a cooling airflow provided to a high pressure turbine of the gas turbine engine with a cooled cooling air system.

The method of any preceding clause, wherein reducing the temperature of the cooling airflow provided to the high pressure turbine of the gas turbine engine with the cooled cooling air system comprises providing a temperature reduction of the cooling airflow equal to at least 15% of the EGT and up to 45% of the EGT.

The gas turbine engine of any preceding clause, wherein the cooled cooling air systems includes a thermal bus cooled cooling air system (see, e.g., FIGS. 4 and 5).

The gas turbine engine of any preceding clause, wherein the cooled cooling air systems includes a dedicated heat exchanger cooled cooling air system (i.e., a cooled cooling air system including a heat exchanger dedicated to the cooled cooling air system).

The gas turbine engine of any preceding clause, wherein the cooled cooling air systems includes a bypass heat exchanger cooled cooling air system having a heat sink heat exchanger thermally coupled to an airflow through a bypass passage (see, e.g., FIG. 9).

The gas turbine engine of any preceding clause, wherein the cooled cooling air systems includes an air-to-air cooled cooling air system (a cooled cooling air system having a heat sink heat exchanger configured to transfer heat to an airflow; see, e.g., FIG. 9.

The gas turbine engine of any preceding clause, wherein the cooled cooling air systems includes an oil-to-air cooled cooling air system (a cooled cooling air system having a heat sink heat exchanger configured to transfer heat to an oil flow).

The gas turbine engine of any preceding clause, wherein the cooled cooling air systems includes a fuel-to-air cooled cooling air system (a cooled cooling air system having a heat sink heat exchanger configured to transfer heat to a fuel flow, such as a Jet A fuel flow, a liquid hydrogen or hydrogen gas fuel flow, etc.; see, e.g., FIG. 4). or a combination thereof. In one or more of the exemplary cooled cooling air systems described herein, the The gas turbine engine of any preceding clause, wherein the cooled cooling air systems is configured to receive the cooling air from a downstream end of a high pressure compressor.

The gas turbine engine of any preceding clause, wherein the cooled cooling air systems is configured to receive the cooling air from an upstream end of the high pressure compressor.

The gas turbine engine of any preceding clause, wherein the cooled cooling air systems is configured to receive the cooling air from a downstream end of a low pressure compressor.

The gas turbine engine of any preceding clause, wherein the cooled cooling air systems is configured to receive the cooling air from an upstream end of the low pressure compressor.

The gas turbine engine of any preceding clause, wherein the cooled cooling air systems is configured to receive the cooling air from a location between compressors.

The gas turbine engine of any preceding clause, wherein the cooled cooling air systems is configured to receive the cooling air from a bypass passage.

A titanium alloy comprising: about 5 wt % to about 8 wt % aluminum; about 2.5 wt % to about 5.5 wt % vanadium; about 0.1 wt % to about 2 wt % of one or more elements selected from the group consisting of iron and molybdenum; about 0.01 wt % to about 0.2 wt % carbon; up to about 0.3 wt % oxygen; silicon and/or copper; and titanium.

The titanium alloy of any preceding clause, comprising about 5.5 wt % to about 6.75 wt % aluminum.

The titanium alloy of any preceding clause, comprising about 3.5 wt % to about 4.5 wt % vanadium.

The titanium alloy of any preceding clause, comprising about 0.1 wt % to about 1 wt % iron.

The titanium alloy of any preceding clause, comprising up to 1 wt % molybdenum.

The titanium alloy of any preceding clause, comprising about 0.01 wt % to about 0.1 wt % carbon.

The titanium alloy of any preceding clause, further comprising up to 2 wt % of one or more element selected from the group consisting of zirconium and tin.

A component comprising: the titanium alloy any preceding clause.

A component comprising: an article made from a titanium alloy having about 5 wt % to about 8 wt % aluminum; about 2.5 wt % to about 5.5 wt % vanadium; about 0.1 wt % to about 2 wt % of one or more elements selected from the group consisting of iron and molybdenum; about 0.01 wt % to about 0.2 wt % carbon; up to about 0.3 wt % oxygen; at least one of silicon or copper; and titanium.

The component of any preceding clause, the article further comprising a thick section.

The component of any preceding clause, the article being cast and wrought.

The component of any preceding clause, the article being a structural aerospace casting.

The component of any preceding clause, the titanium alloy, when copper is not present, comprising about 0.01 wt % to about 2 wt % silicon.

The component of any preceding clause, the titanium alloy, when copper is present, comprising up to 1 wt % silicon.

The component of any preceding clause, the titanium alloy, when silicon is not present, comprising about 0.5 wt % to about 2 wt % copper.

The component of any preceding clause, the titanium alloy, when silicon is present, comprising up to 2 wt % copper.

The component of any preceding clause, the titanium alloy further comprising up to 2 wt % of one or more element selected from the group consisting of zirconium and tin.

The component of any preceding clause, the article made in the form of a rotary machine part selected from the group consisting of a disk, blisk, airfoil, blade, vane, integral bladed rotor, frame, fairing, gearbox, seal, case, mount, and shaft.

The component of any preceding clause, the article made in the form of an airframe part selected from the group consisting of a spar, rib, frame, box, pylon, fuselage, stabilizer, undercarriage, wing, seat track, and fairing.

A turbine component comprising a titanium alloy, wherein the titanium alloy comprises: 5.50 wt % to 6.90 wt % aluminum; 3.50 wt % to 4.50 wt % vanadium; 0.01 wt % to 0.03 wt % carbon; 0.20 wt % to 0.70 wt % iron; 1.00 wt % to 1.50 wt % molybdenum; 0.10 wt % to 0.30 wt % silicon; up to 0.21 wt % oxygen; up to 0.016 wt % nitrogen (e.g., up to 0.015 wt % nitrogen); and a balance of titanium, wherein the titanium alloy is substantially free from copper.

A turbine component comprising a titanium alloy, wherein the titanium alloy comprises: 5.50 wt % to 6.90 wt % aluminum; 3.50 wt % to 4.50 wt % vanadium; 0.01 wt % to 0.03 wt % carbon; 0.20 wt % to 0.70 wt % iron; 1.00 wt % to 1.50 wt % molybdenum; 0.10 wt % to 0.30 wt % silicon; up to 0.21 wt % oxygen; up to 0.016 wt % nitrogen (e.g., up to 0.015 wt % nitrogen); and a balance of titanium, wherein the Al, O, Fe, Si, Mo are present in amounts that result in a predicted 23° C. 0.2% yield strength ≥1000 MPa according to the formula: 469.3+48.8*Al (wt %)+748*O (wt %)+96.1*Fe (wt %)+188*Si (wt %)+57.7*Mo (wt %), and/or wherein the Fe, Si, Mo are present in amounts that result in a predicted 23° C. % plastic elongation ≥15.0% according to the formula: 10^(1.149+0.211*Fe (wt %)−0.514*Si (wt %)+0.076*Mo (wt %)).

The turbine component as in any preceding clause, wherein the titanium alloy is substantially free from copper.

The turbine component as in any preceding clause, wherein the titanium alloy has a 0.2% yield strength of 1000 MPa or greater.

The turbine component as in any preceding clause, wherein the titanium alloy has a 0.2% yield strength of 1000 MPa to 1380 MPa.

The turbine component as in any preceding clause, wherein the titanium alloy has an ultimate tensile strength of 1060 MPa or greater.

The turbine component as in any preceding clause, wherein the titanium alloy has an ultimate tensile strength of 1060 MPa to 1450 MPa.

The turbine component as in any preceding clause, wherein the titanium alloy has a plastic elongation of 15.0% or greater.

The turbine component as in any preceding clause, wherein the titanium alloy has a plastic elongation of 15.0% to 30.0%.

The turbine component as in any preceding clause, wherein the titanium alloy has a ballistic impact resistance measured by a crack length of 3.048 mm or less.

The turbine component as in any preceding clause, wherein the titanium alloy has a ballistic impact resistance measured by a crack length of 0 mm to 3.048 mm.

The turbine component as in any preceding clause, wherein the turbine component has a reduction in area that is 45% RA or greater.

The turbine component as in any preceding clause, wherein the turbine component has a reduction in area that is 45% RA to 75% RA.

The turbine component as in any preceding clause, wherein the titanium alloy has a 0.2% yield strength of 1000 MPa or greater, an ultimate tensile strength of 1060 MPa or greater, a plastic elongation of 15.0% or greater and a reduction in area that is 45% RA or greater.

The turbine component as in any preceding clause, wherein the titanium alloy has a 0.2% yield strength of 1000 MPa to 1380 MPa, an ultimate tensile strength of 1060 MPa to 1450 MPa, a ductility of 15.0% to 30.0%, and a reduction in area that is 45% RA to 75% RA.

The turbine component as in any preceding clause, wherein the titanium alloy is substantially free from chromium.

The turbine component as in any preceding clause, wherein the titanium alloy is substantially free from tin.

The turbine component as in any preceding clause, wherein the titanium alloy is substantially free from nickel.

The turbine component as in any preceding clause, wherein the titanium alloy is substantially free from zirconium.

The turbine component as in any preceding clause, wherein the titanium alloy is substantially free from tungsten.

The turbine component as in any preceding clause, wherein the titanium alloy is substantially free from any other elements.

The turbine component as in any preceding clause, wherein the Al, O, Fe, Si, Mo are present in amounts that result in a predicted 23° C. 0.2% yield strength ≥1000 MPa according to the formula: 469.3+48.8*Al (wt %)+748*O (wt %)+96.1*Fe (wt %)+188*Si (wt %)+57.7*Mo (wt %).

The turbine component as in any preceding clause, wherein the Fe, Si, Mo are present in amounts that result in a predicted 23° C. % plastic elongation ≥15.0% according to the formula: 10^(1.149+0.211*Fe (wt %)−0.514*Si (wt %)+0.076*Mo (wt %)).

The turbine component as in any preceding clause, wherein the Al, O, Fe, Si, Mo are present in amounts that result in a predicted 23° C. 0.2% yield strength ≥1000 MPa according to the formula: 469.3+48.8*Al (wt %)+748*O (wt %)+96.1*Fe (wt %)+188*Si (wt %)+57.7*Mo (wt %), and wherein the Fe, Si, Mo are present in amounts that result in a predicted 23° C. % plastic elongation ≥15.0% according to the formula: 10^(1.149+0.211*Fe (wt %)−0.514*Si (wt %)+0.076*Mo (wt %)).

The turbine component as in any preceding clause, wherein the titanium alloy comprises 3.80 wt % to 4.43 wt % vanadium.

The turbine component as in any preceding clause, wherein the titanium alloy comprises 0.45 wt % to 0.57 wt % iron.

The turbine component as in any preceding clause, wherein the titanium alloy comprises 0.14 wt % to 0.28 wt % silicon.

The turbine component as in any preceding clause, wherein the titanium alloy consists essentially of: 5.50 wt % to 6.90 wt % aluminum; 3.50 wt % to 4.50 wt % vanadium; 0.01 wt % to 0.03 wt % carbon; 0.20 wt % to 0.70 wt % iron; 1.00 wt % to 1.50 wt % molybdenum; 0.10 wt % to 0.30 wt % silicon; up to 0.21 wt % oxygen; up to 0.016 wt % nitrogen (e.g., up to 0.015 wt % nitrogen); and a balance of titanium.

The turbine component as in any preceding clause, wherein the titanium alloy consists of: 5.50 wt % to 6.90 wt % aluminum; 3.50 wt % to 4.50 wt % vanadium; 0.01 wt % to 0.03 wt % carbon; 0.20 wt % to 0.70 wt % iron; 1.00 wt % to 1.50 wt % molybdenum; 0.10 wt % to 0.30 wt % silicon; up to 0.21 wt % oxygen; up to 0.016 wt % nitrogen (e.g., up to 0.015 wt % nitrogen); and a balance of titanium.

A turbine component comprising a titanium alloy, wherein the titanium alloy consists essentially of: 5.50 wt % to 6.90 wt % aluminum; 3.50 wt % to 4.50 wt % vanadium; 0.01 wt % to 0.03 wt % carbon; 0.20 wt % to 0.70 wt % iron; 1.00 wt % to 1.50 wt % molybdenum; 0.10 wt % to 0.30 wt % silicon; up to 0.21 wt % oxygen; up to 0.016 wt % nitrogen (e.g., up to 0.015 wt % nitrogen); and a balance of titanium.

A turbine component comprising a titanium alloy, wherein the titanium alloy consists of: 5.50 wt % to 6.90 wt % aluminum; 3.50 wt % to 4.50 wt % vanadium; 0.01 wt % to 0.03 wt % carbon; 0.20 wt % to 0.70 wt % iron; 1.00 wt % to 1.50 wt % molybdenum; 0.10 wt % to 0.30 wt % silicon; up to 0.21 wt % oxygen; up to 0.016 wt % nitrogen (e.g., up to 0.015 wt % nitrogen); and a balance of titanium.

The turbine component as in any preceding clause, wherein the titanium alloy has a 0.2% yield strength of 1000 MPa or greater.

The turbine component as in any preceding clause, wherein the titanium alloy has a 0.2% yield strength of 1000 MPa to 1380 MPa.

The turbine component as in any preceding clause, wherein the titanium alloy has an ultimate tensile strength of 1060 MPa or greater.

The turbine component as in any preceding clause, wherein the titanium alloy has an ultimate tensile strength of 1060 MPa to 1450 MPa.

The turbine component as in any preceding clause, wherein the titanium alloy has a plastic elongation of 15.0% or greater.

The turbine component as in any preceding clause, wherein the titanium alloy has a plastic elongation of 15.0% to 30.0%.

The turbine component as in any preceding clause, wherein the titanium alloy has a ballistic impact resistance measured by a crack length of 3.048 mm or less.

The turbine component as in any preceding clause, wherein the titanium alloy has a ballistic impact resistance measured by a crack length of 0 mm to 3.048 mm.

The turbine component as in any preceding clause, wherein the turbine component has a reduction in area that is 45% RA or greater.

The turbine component as in any preceding clause, wherein the turbine component has a reduction in area that is 45% RA to 75% RA.

The turbine component as in any preceding clause, wherein the titanium alloy has a 0.2% yield strength of 1000 MPa or greater, an ultimate tensile strength of 1060 MPa or greater, a plastic elongation of 15.0% or greater, a crack length of 3.048 mm or less, and a reduction in area that is 45% RA or greater.

The turbine component as in any preceding clause, wherein the titanium alloy has a 0.2% yield strength of 1000 MPa to 1380 MPa, an ultimate tensile strength of 1060 MPa to 1450 MPa, a ductility of 15.0% to 30.0%, a ballistic impact resistance measured by a crack length of 0 to 3.048 mm, and a reduction in area that is 45% RA to 75% RA.

A gas turbine engine comprising: a turbomachine comprising a compressor section, a combustion section, and a turbine section arranged in serial flow order, the compressor section having a high pressure compressor defining a high pressure compressor exit area ($A_{HPCExit}$) in square inches; and a component within the turbomachine, wherein the component comprises a titanium alloy, wherein the gas turbine engine defines a redline exhaust gas temperature (EGT) in degrees Celsius, a total sea level static thrust output ($Fn_{Tot}al$) in pounds, and a corrected specific thrust, wherein the corrected specific thrust is greater than or equal to 42 and less than or equal to 90, the corrected specific thrust determined as follows: $Fn_{Total} \times EGT/(A_{HPCExit}^2 \times 1000)$.

The gas turbine engine of any preceding clause, wherein the component is a disk or a bladed disk.

The gas turbine engine of any preceding clause, wherein the titanium alloy comprises: 5 wt % to 8 wt % aluminum; 2.5 wt % to 5.5 wt % vanadium; 0.1 wt % to 2 wt % of one or more elements selected from the group consisting of iron and molybdenum; 0.01 wt % to 0.2 wt % carbon; up to about 0.3 wt % oxygen; silicon and/or copper, with the combined amount of silicon and copper being about 0.1 wt % to about 4 wt %; and titanium.

The gas turbine engine of any preceding clause, wherein the titanium alloy comprises: 5 wt % to 8 wt % aluminum; 2.5 wt % to 5.5 wt % vanadium; 0.1 wt % to 2 wt % molybdenum; 0.01 wt % to 0.2 wt % carbon; up to about 0.3 wt % oxygen; 0.1 wt % to 2 wt % silicon; and titanium.

The gas turbine engine of any preceding clause, wherein the titanium alloy comprises 5.5 wt % to 6.75 wt % aluminum, 3.5 wt % to 4.5 wt % vanadium, and 0.01 wt % to 0.1 wt % carbon.

The gas turbine engine of any preceding clause, wherein the titanium alloy further comprises up to 2 wt % of one or more elements selected from the group consisting of zirconium and tin.

The gas turbine engine of any preceding clause, wherein the titanium alloy comprises: 6 wt % to 7 wt % aluminum; 2.5 wt % to 5.5 wt % vanadium; 0.1 wt % to 2 wt % iron; 0.01 wt % to 0.2 wt % carbon; 0.1 wt % to 2 wt % silicon; up to 0.3 wt % oxygen; up to 0.05 wt % nitrogen; 0.5 wt % to 1.5 wt % molybdenum; up to 2 wt % tin; up to 2 wt % zirconium; up to 2 wt % tungsten; and the balance titanium.

The gas turbine engine of any preceding clause, wherein the titanium alloy comprises: 6 wt % to 7 wt % aluminum; 3 wt % to 5 wt % vanadium; 0.1 wt % to 1 wt % iron; 0.01 wt % to 0.1 wt % carbon; 0.5 wt % to 2 wt % silicon; up to 0.2 wt % oxygen; up to 0.01 wt % nitrogen; 0.5 wt % to 1.5 wt % molybdenum; up to 2 wt % tin; up to 2 wt % zirconium; up to 2 wt % tungsten; and the balance titanium.

The gas turbine engine of any preceding clause, wherein the titanium alloy comprises: 5.50 wt % to 6.90 wt % aluminum; 3.50 wt % to 4.50 wt % vanadium; 0.01 wt % to 0.03 wt % carbon; 0.20 wt % to 0.70 wt % iron; 1.00 wt % to 1.50 wt % molybdenum; 0.10 wt % to 0.30 wt % silicon; up to 0.21 wt % oxygen; up to 0.016 wt % nitrogen; and a balance of titanium.

The gas turbine engine of any preceding clause, wherein the Al, O, Fe, Si, Mo in the titanium alloy are present in amounts that result in a predicted 23° C. 0.2% yield strength ≥1000 MPa according to the formula: 469.3+48.8*Al (wt %)+748*O (wt %)+96.1*Fe (wt %)+188*Si (wt %)+57.7*Mo (wt %).

The gas turbine engine of any preceding clause, wherein the Fe, Si, Mo om the titanium alloy are present in amounts that result in a predicted 23° C. % plastic elongation ≥15.0% according to the formula: 10^(1.149+0.211*Fe (wt %)−0.514*Si (wt %)+0.076*Mo (wt %)).

The gas turbine engine of any preceding clause, wherein the titanium alloy has a 0.2% yield strength of 1000 MPa to 1380 MPa, and wherein the titanium alloy has a plastic elongation of 15.0% to 30.0%.

The gas turbine engine of any preceding clause, wherein the titanium alloy has an ultimate tensile strength of 1060 MPa to 1450 MPa.

The gas turbine engine of any preceding clause, wherein the titanium alloy has a ballistic impact resistance measured by a crack length of 3.048 mm or less.

The gas turbine engine of any preceding clause, wherein the turbine component has a reduction in area that is 45% RA or greater.

The gas turbine engine of any preceding clause, wherein the turbine component has a reduction in area that is 45% RA to 75% RA.

The gas turbine engine of any preceding clause, wherein the titanium alloy has a 0.2% yield strength of 1000 MPa to 1380 MPa, an ultimate tensile strength of 1060 MPa to 1450 MPa, a ductility of 15.0% to 30.0%, and a reduction in area that is 45% RA to 75% RA.

The gas turbine engine of any preceding clause, wherein the titanium alloy is substantially free from copper.

The gas turbine engine of any preceding clause, wherein the titanium alloy is substantially free from chromium, tin, nickel, zirconium, and tungsten.

The gas turbine engine of any preceding clause, wherein the titanium alloy is substantially free from any other elements.

The gas turbine engine of any preceding clause, wherein the Al, O, Fe, Si, Mo are present in the titanium alloy in amounts that result in a predicted 23° C. 0.2% yield strength ≥1000 MPa according to the formula: 469.3+48.8*Al (wt %)+748*O (wt %)+96.1*Fe (wt %)+188*Si (wt %)+57.7*Mo (wt %), and wherein the Fe, Si, Mo are present in amounts that result in a predicted 23° C. % plastic elongation ≥15.0% according to the formula: 10^(1.149+0.211*Fe (wt %)−0.514*Si (wt %)+0.076*Mo (wt %)).

The gas turbine engine of any preceding clause, wherein the titanium alloy comprises 3.80 wt % to 4.43 wt % vanadium.

The gas turbine engine of any preceding clause, wherein the titanium alloy comprises 0.45 wt % to 0.57 wt % iron.

The gas turbine engine of any preceding clause, wherein the titanium alloy comprises 0.14 wt % to 0.28 wt % silicon.

The gas turbine engine of any preceding clause, wherein the titanium alloy consists of: 5.50 wt % to 6.90 wt % aluminum; 3.50 wt % to 4.50 wt % vanadium; 0.01 wt % to 0.03 wt % carbon; 0.20 wt % to 0.70 wt % iron; 1.00 wt % to 1.50 wt % molybdenum; 0.10 wt % to 0.30 wt % silicon; up to 0.21 wt % oxygen; up to 0.016 wt % nitrogen; and a balance of titanium.

The gas turbine engine of any preceding clause, wherein the EGT is greater than 1000 degrees Celsius and less than 1300 degrees Celsius.

The gas turbine engine of any preceding clause, wherein the EGT is greater than 1000 degree Celsius and less than 1300 degrees Celsius, and wherein the corrected specific thrust is greater than or equal to 45.

The gas turbine engine of any preceding clause, wherein the turbine section comprises a high pressure turbine having a first stage of high pressure turbine rotor blades, and wherein the gas turbine engine further comprises: a cooled cooling air system in fluid communication with the first stage of high pressure turbine rotor blades.

The gas turbine engine of any preceding clause, further comprising a primary fan driven by the turbomachine.

A method of operating a gas turbine engine, comprising: operating the gas turbine engine at a takeoff power level, the gas turbine engine having a turbomachine with a high pressure compressor defining a high pressure compressor exit area ($A_{HPCExit}$) in square inches, the gas turbine engine defining a redline exhaust gas temperature (EGT) in degrees Celsius, a total sea level static thrust output ($Fn_{Total}$) in pounds, and a corrected specific thrust; wherein the corrected specific thrust is greater than or equal to 42 and less than or equal to 90, the corrected specific thrust determined as follows: $Fn_{Total} \times EGT/(A_{HPCExit}^2 \times 1000)$, and wherein the gas turbine engine comprises a component comprising a titanium alloy.

We claim:

1. A gas turbine engine comprising:

an unducted fan including an array of fan blades coupled to a hub, wherein the hub comprises a titanium alloy;

a turbomachine downstream of the unducted fan comprising a compressor section, a combustion section, and a turbine section arranged in serial flow order, the compressor section having a high pressure compressor defining a high pressure compressor exit area ($A_{HPCExit}$) in square inches; and wherein the gas turbine engine defines a redline exhaust gas temperature (EGT) in degrees Celsius, a total sea level static thrust output ($Fn_{Total}$) in pounds, and a corrected specific thrust, wherein the corrected specific thrust is greater than or equal to 42 and less than or equal to 90, the corrected specific thrust determined as follows: $Fn_{Total} \times EGT/(A_{HPCExit}^2 \times 1000)$.

2. The gas turbine engine of claim 1, wherein the unducted fan defines a fan diameter of at least 10 feet and up to 28 feet.

3. The gas turbine engine of claim 1, wherein the unducted fan defines a fan diameter of at least 10 feet and up to 18 feet.

4. The gas turbine engine of claim 1, wherein the titanium alloy is Ti-17 or Ti-6246.

5. The gas turbine engine of claim 1, wherein the titanium alloy comprises:

5.50 wt % to 6.90 wt % aluminum;
3.50 wt % to 4.50 wt % vanadium;
0.01 wt % to 0.03 wt % carbon;
0.20 wt % to 0.70 wt % iron;
1.00 wt % to 1.50 wt % molybdenum;
0.10 wt % to 0.30 wt % silicon;
up to 0.21 wt % oxygen;
up to 0.016 wt % nitrogen; and
a balance of titanium.

6. The gas turbine engine of claim 5, wherein the Al, O, Fe, Si, Mo in the titanium alloy are present in amounts that result in a predicted 23° C. 0.2% yield strength ≥1000 MPa according to the formula: 469.3+48.8*Al (wt %)+748*O (wt %)+96.1*Fe (wt %)+188*Si (wt %)+57.7*Mo (wt %).

7. The gas turbine engine of claim 5, wherein the Fe, Si, Mo in the titanium alloy are present in amounts that result in a predicted 23° C. % plastic elongation ≥15.0% according to the formula: 10^(1.149+0.211*Fe (wt %)−0.514*Si (wt %)+0.076*Mo (wt %)).

8. The gas turbine engine of claim 5, wherein the titanium alloy has a 0.2% yield strength of 1000 MPa to 1380 MPa, and wherein the titanium alloy has a plastic elongation of 15.0% to 30.0%.

9. The gas turbine engine of claim 5, wherein the titanium alloy has an ultimate tensile strength of 1060 MPa to 1450 MPa.

10. The gas turbine engine of claim 5, wherein the titanium alloy has a ballistic impact resistance measured by a crack length of 3.048 mm or less.

11. The gas turbine engine of claim 5, wherein the hub has a reduction in area that is 45% RA or greater.

12. The gas turbine engine of claim 5, wherein the hub has a reduction in area that is 45% RA to 75% RA.

13. The gas turbine engine of claim 5, wherein the titanium alloy has a 0.2% yield strength of 1000 MPa to 1380 MPa, an ultimate tensile strength of 1060 MPa to 1450 MPa, a ductility of 15.0% to 30.0%, and a reduction in area that is 45% RA to 75% RA.

14. The gas turbine engine of claim 5, wherein the titanium alloy is substantially free from copper.

15. The gas turbine engine of claim 5, wherein the titanium alloy is substantially free from chromium, tin, nickel, zirconium, and tungsten.

16. The gas turbine engine of claim 15, wherein the titanium alloy is substantially free from any other elements.

17. The gas turbine engine of claim 5, wherein the Al, O, Fe, Si, Mo are present in the titanium alloy in amounts that result in a predicted 23° C. 0.2% yield strength ≥1000 MPa according to the formula: 469.3+48.8*Al (wt %)+748*O (wt %)+96.1*Fe (wt %)+188*Si (wt %)+57.7*Mo (wt %), and wherein the Fe, Si, Mo are present in amounts that result in a predicted 23° C. % plastic elongation ≥15.0% according to the formula: 10^(1.149+0.211*Fe (wt %)−0.514*Si (wt %)+0.076*Mo (wt %)).

18. The gas turbine engine of claim 5, wherein the titanium alloy comprises 3.80 wt % to 4.43 wt % vanadium.

19. The gas turbine engine of claim 5, wherein the titanium alloy comprises 0.45 wt % to 0.57 wt % iron.

20. The gas turbine engine of claim 5, wherein the titanium alloy comprises 0.14 wt % to 0.28 wt % silicon.

* * * * *